(12) United States Patent
Davies et al.

(10) Patent No.: US 6,950,959 B2
(45) Date of Patent: *Sep. 27, 2005

(54) TECHNIQUES FOR FACILITATING CONVERSION BETWEEN ASYNCHRONOUS AND SYNCHRONOUS DOMAINS

(75) Inventors: Michael I. Davies, Santa Monica, CA (US); Andrew Lines, Calabasas, CA (US); Robert Southworth, Pasadena, CA (US)

(73) Assignee: Fulcrum Microystems Inc., Calabasas, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 10/212,574

(22) Filed: Aug. 1, 2002

(65) Prior Publication Data

US 2003/0159078 A1 Aug. 21, 2003

Related U.S. Application Data

(60) Provisional application No. 60/357,201, filed on Feb. 12, 2002.

(51) Int. Cl.$^7$ .............................................. H04L 12/56
(52) U.S. Cl. .................. 713/500; 713/400; 709/250; 709/232; 710/105; 370/401; 370/395.1; 375/355; 375/354
(58) Field of Search ............................. 713/500, 400; 709/232, 250; 370/401, 395.1; 375/355, 354; 710/105

(56) References Cited

U.S. PATENT DOCUMENTS

| | | | |
|---|---|---|---|
| 4,773,066 A | 9/1988 | Kirkman | 370/85 |
| 4,849,751 A | 7/1989 | Barber et al. | 340/825.02 |
| 5,752,070 A | 5/1998 | Martin et al. | 395/800.33 |
| 5,802,055 A | 9/1998 | Krein et al. | 370/402 |
| 5,949,791 A * | 9/1999 | Byers et al. | 370/466 |
| 5,991,686 A * | 11/1999 | Oguro et al. | 701/115 |
| 6,002,861 A | 12/1999 | Butts et al. | 395/500.37 |
| 6,038,656 A | 3/2000 | Martin et al. | 712/211 |
| 6,065,082 A * | 5/2000 | Blair et al. | 710/105 |
| 6,163,584 A * | 12/2000 | Weng et al. | 375/354 |
| 6,216,170 B1 * | 4/2001 | Giovannoni et al. | 709/250 |
| 6,219,711 B1 * | 4/2001 | Chari | 709/232 |
| 6,230,228 B1 | 5/2001 | Eskandari et al. | 710/129 |
| 6,246,733 B1 * | 6/2001 | Hutchins | 375/355 |
| 6,279,065 B1 | 8/2001 | Chin et al. | 710/129 |
| 6,301,630 B1 | 10/2001 | Chen et al. | 710/129 |
| 6,336,135 B1 * | 1/2002 | Niblett et al. | 709/215 |
| 6,374,307 B1 | 4/2002 | Ristau et al. | 709/249 |
| 6,735,208 B1 * | 5/2004 | Riemann et al. | 370/401 |
| 2002/0021694 A1 | 2/2002 | Benayoun et al. | 370/386 |

OTHER PUBLICATIONS

U.S. Appl. No. 09/501,638, filed on Feb. 10, 2000, entitled, "Reshuffled Communications Process in Pipelined Asynchronous Circuits".

Andrew Matthew Lines, *Pipelined Asynchronous Circuits*, Jun. 1995, revised Jun. 1998, pp. 1–37.

(Continued)

*Primary Examiner*—A. Elamin
(74) *Attorney, Agent, or Firm*—Beyer Weaver & Thomas LLP

(57) ABSTRACT

An interface for use between an asynchronous domain and a synchronous domain is described. The asynchronous domain is characterized by transmission of data in accordance with a delay-insensitive handshake protocol. The synchronous domain is characterized by transmission of data in accordance with transitions of a clock signal. The interface includes a datapath operable to transfer a data token between the domains. The interface also includes control circuitry operable to enable transfer of the data token via the datapath in response to a transition of the clock signal and at least one completion of the handshake protocol.

59 Claims, 44 Drawing Sheets

OTHER PUBLICATIONS

Alain J. Martin, *Compiling Communicating Processes into Delay–Insensitive VLSI Circuits*, Dec. 31, 1985, Department of Computer Science California Institute of Technology, Pasandea, California, pp. 1–16.

Alain J. Martin, *Erratum: Synthesis of Asynchronous VLSI Circuits*, Mar. 22, 2000, Department of Computer Science California Institute of Technology, Pasadena, California, pp. 1–143.

U.V. Cummings, et al. *An Asynchronous Pipelined Lattice Structure Filter*, Department of Computer Science California Institute of Technology, Pasadena, California, pp. 1–8.

Alain J. Martin, et al. *The Design of an Asynchronous MIPS R3000 Microprocessor*, Department of Computer Science California Institute of Technology, Pasadena, California, pp. 1–18.

C.L. Seitz, *System Timing*, chapter 7, pp. 218–262.

F.U. Rosemberger et al., *Internally Clocked Delay–Insensitive Modules*, IEEE Trans., Computers, vol. 37, No. 9, pp. 1005–1018, Sep. 1998.

* cited by examiner

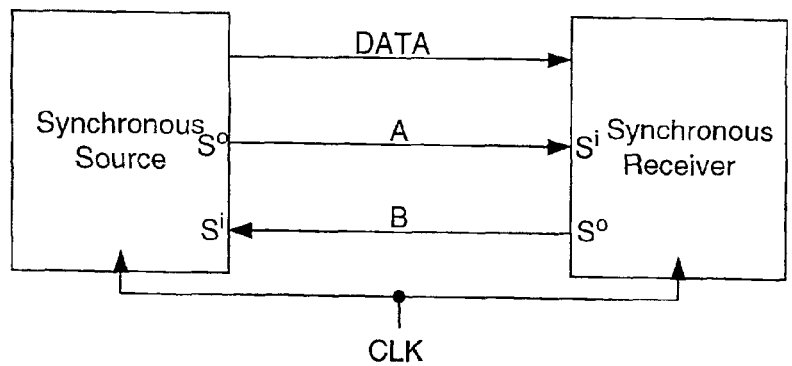
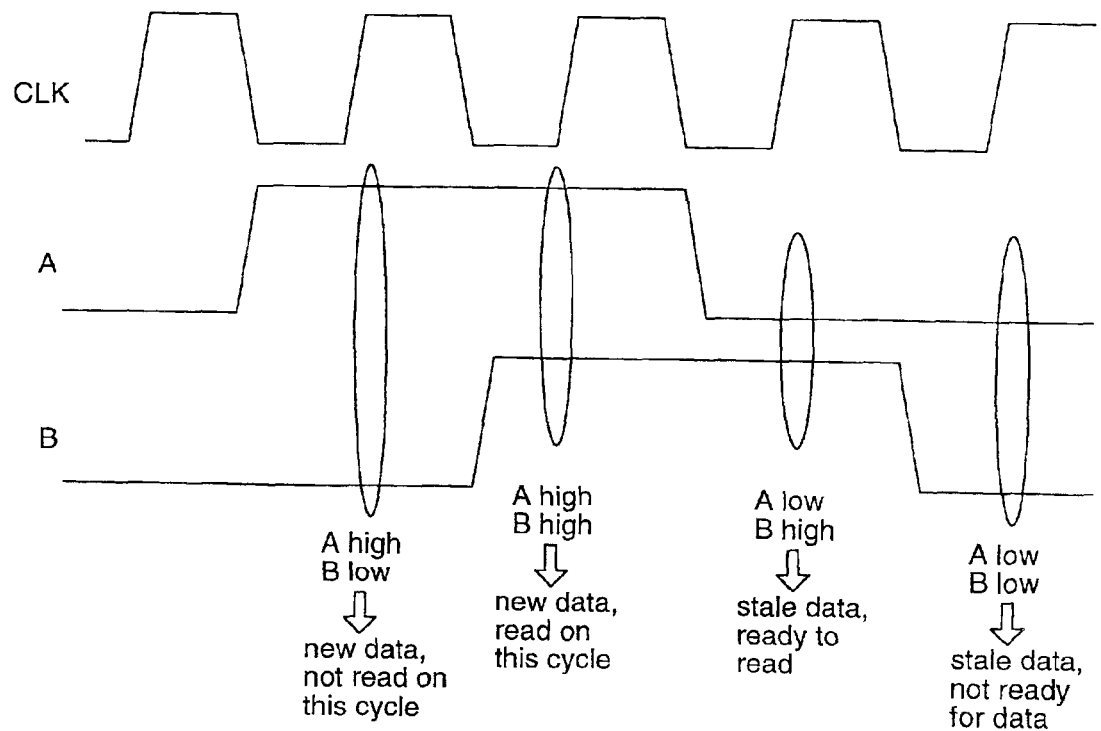
FIG. 7

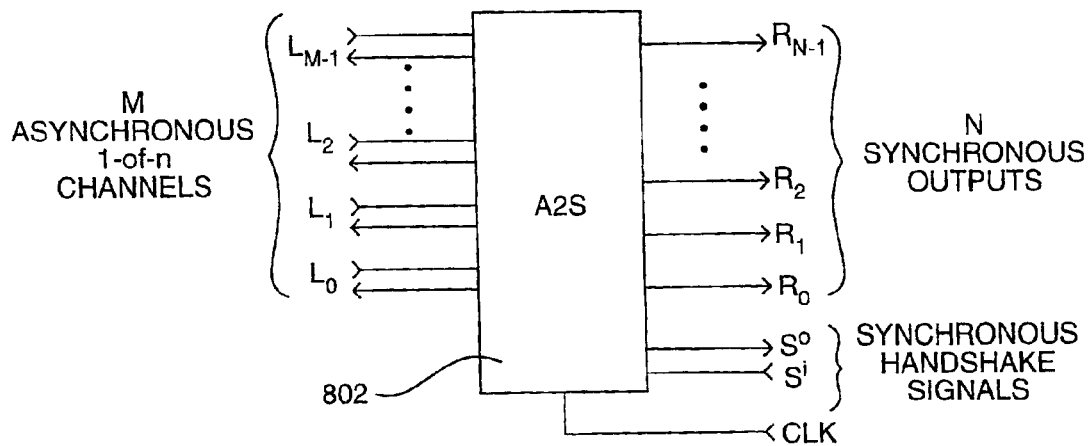
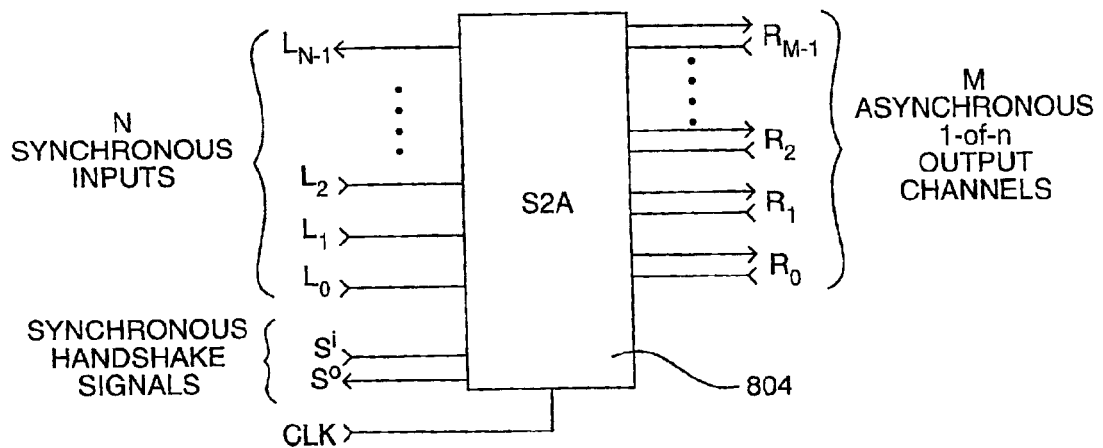
FIG. 8

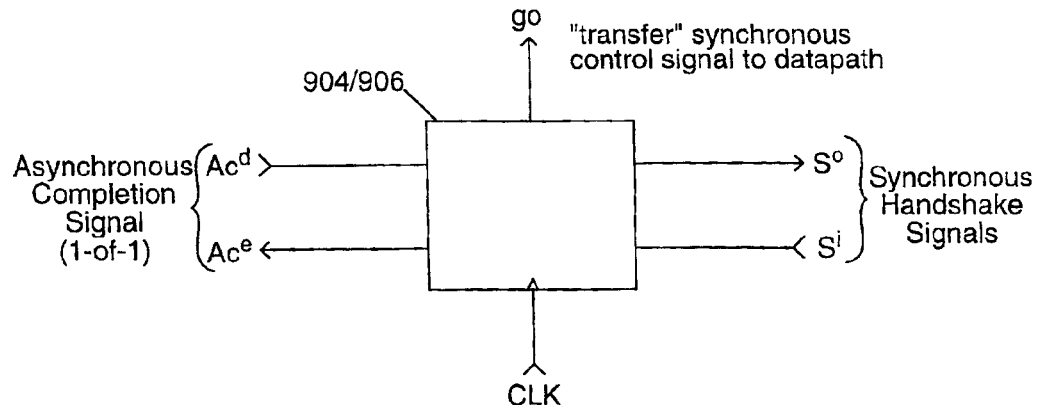
FIG. 10
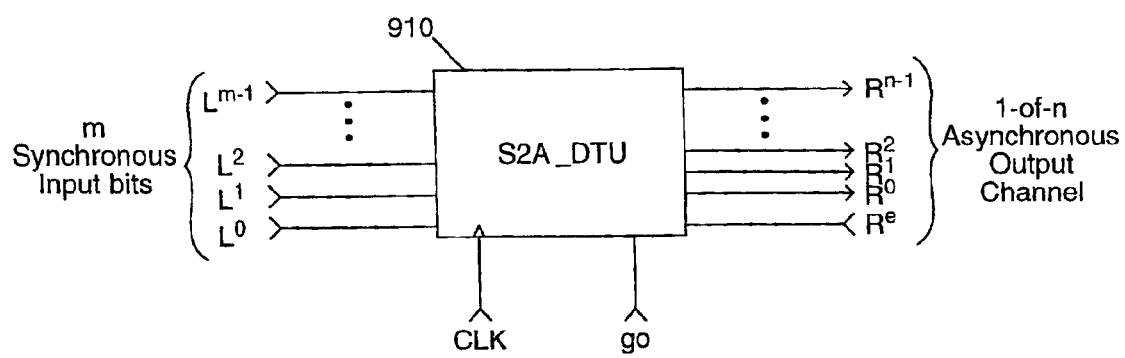
FIG. 11
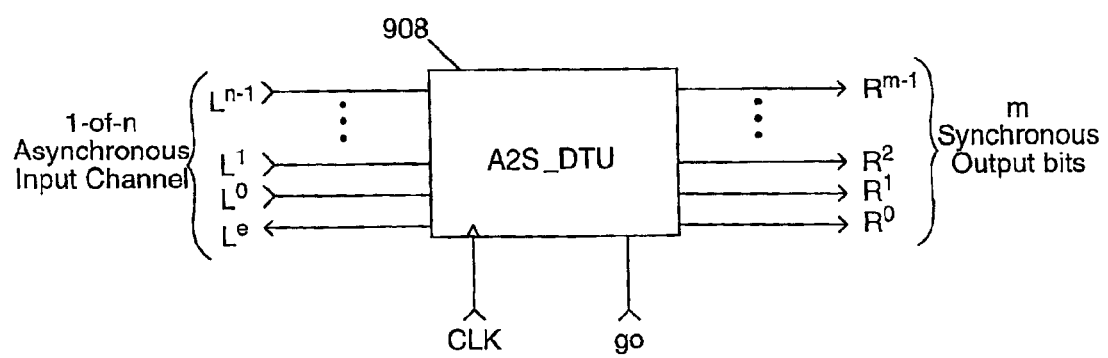

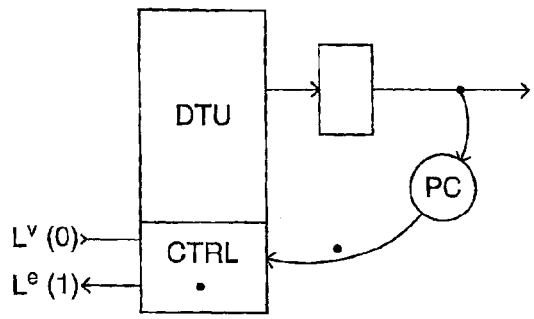
(A) Reset Condition
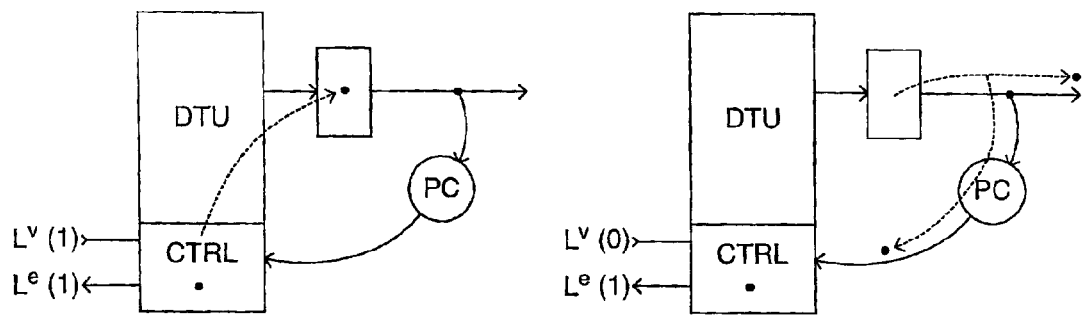
(B) Normal Operation
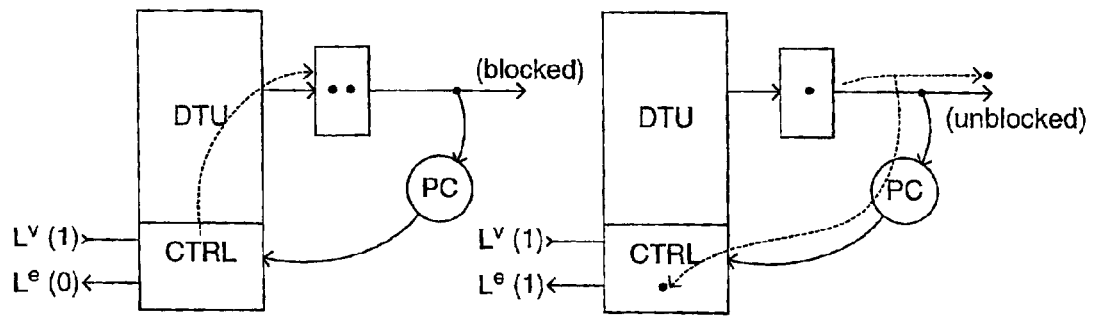
(C) Stall Condition
(Asynchronous Side Stalls)
*FIG. 12*

DTU_A2S
(1 of 4 version)

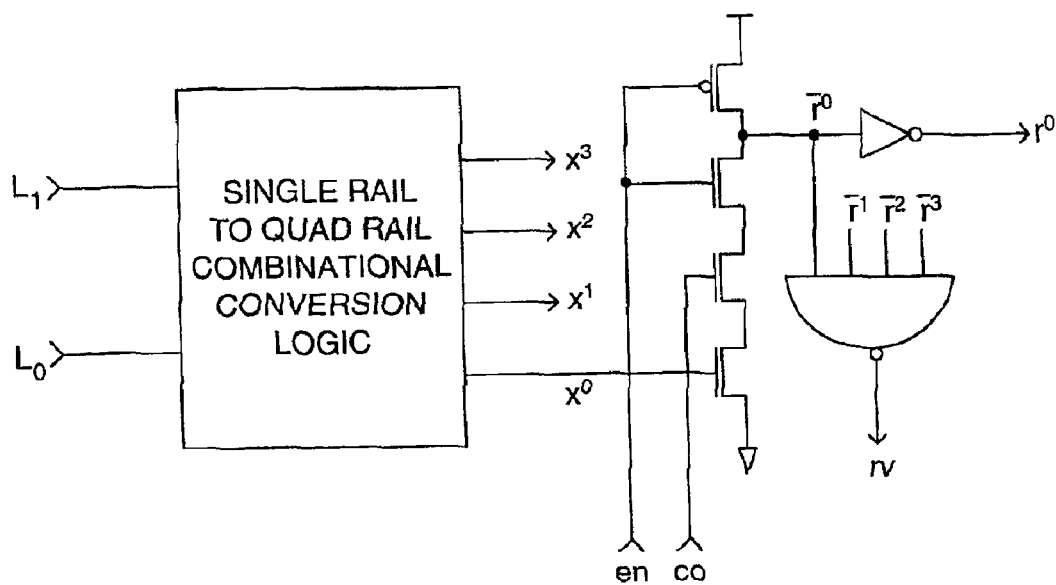
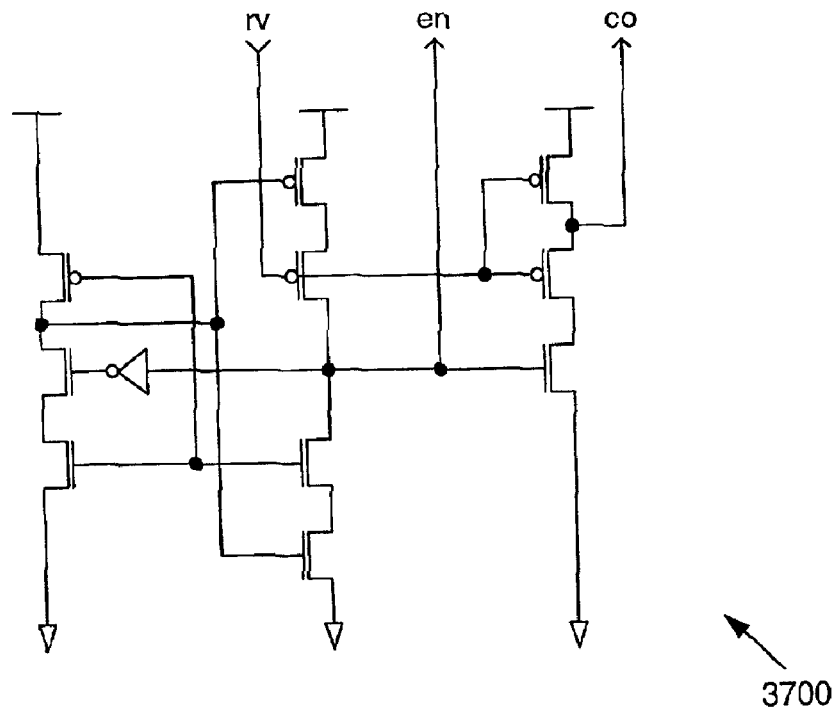
S2Q SAMPLER
FIG. 34

DTU-S2A
(1-of-4 version)

FIG. 36  Message segmentation MAX_LEN=4

FIG. 37  Burst Transfer Protocol

DECIMATE2_ 1 of 1
Weak-condition output logic:
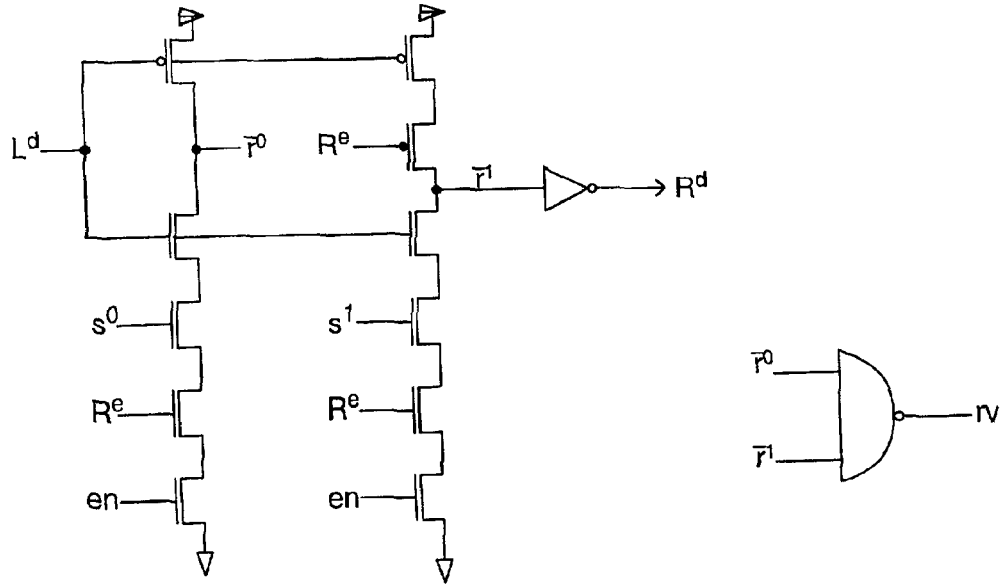
State Logic:
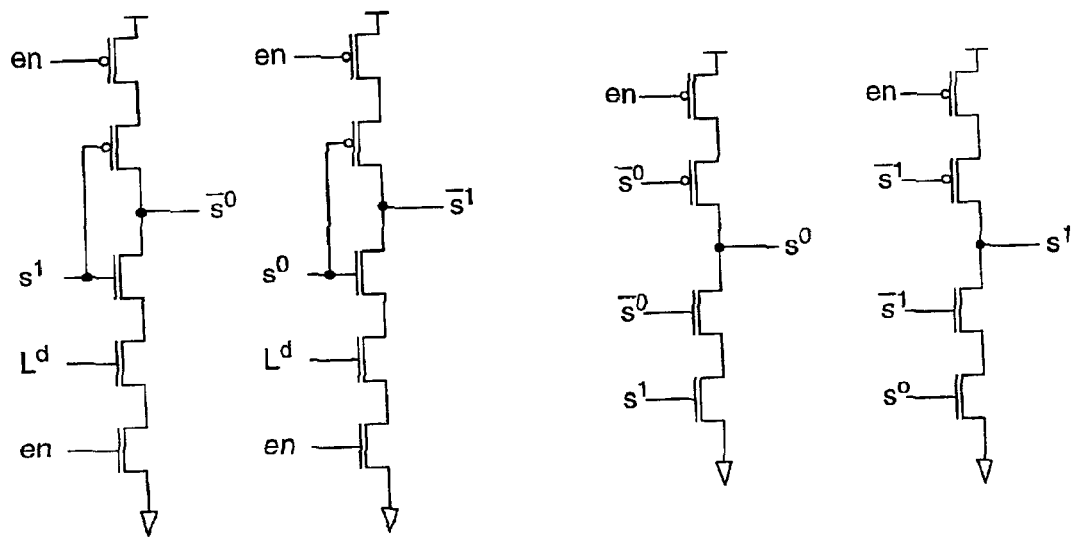
Acknowledge Logic:
FIG. 42

A2S_DDR_DTU ≡
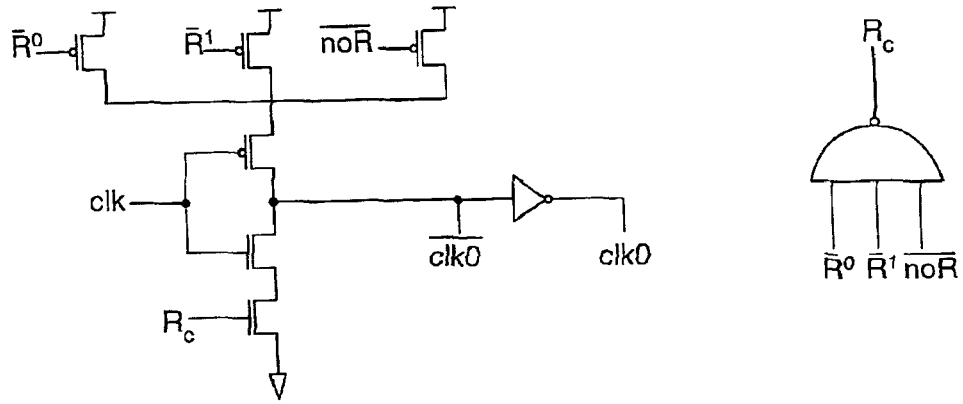
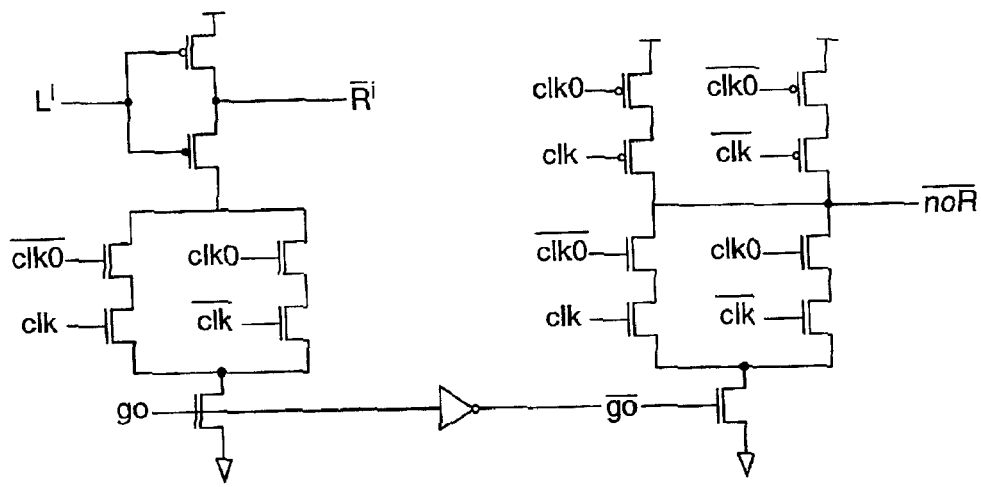
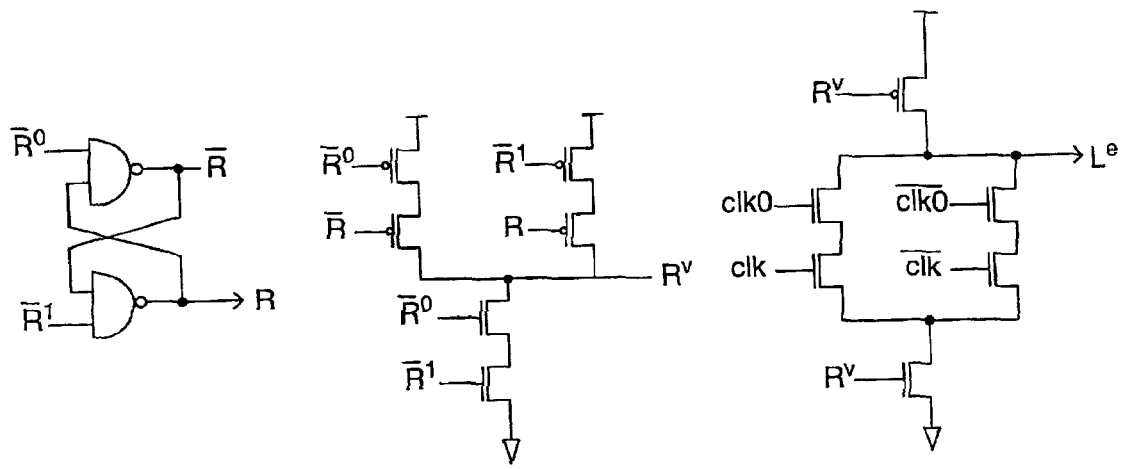
FIG. 43

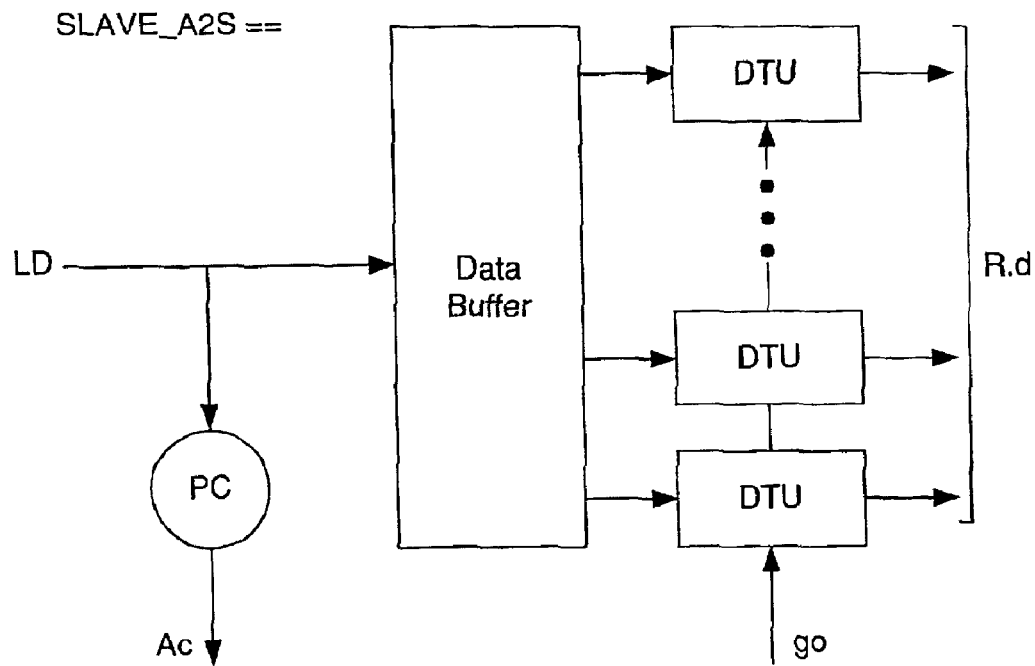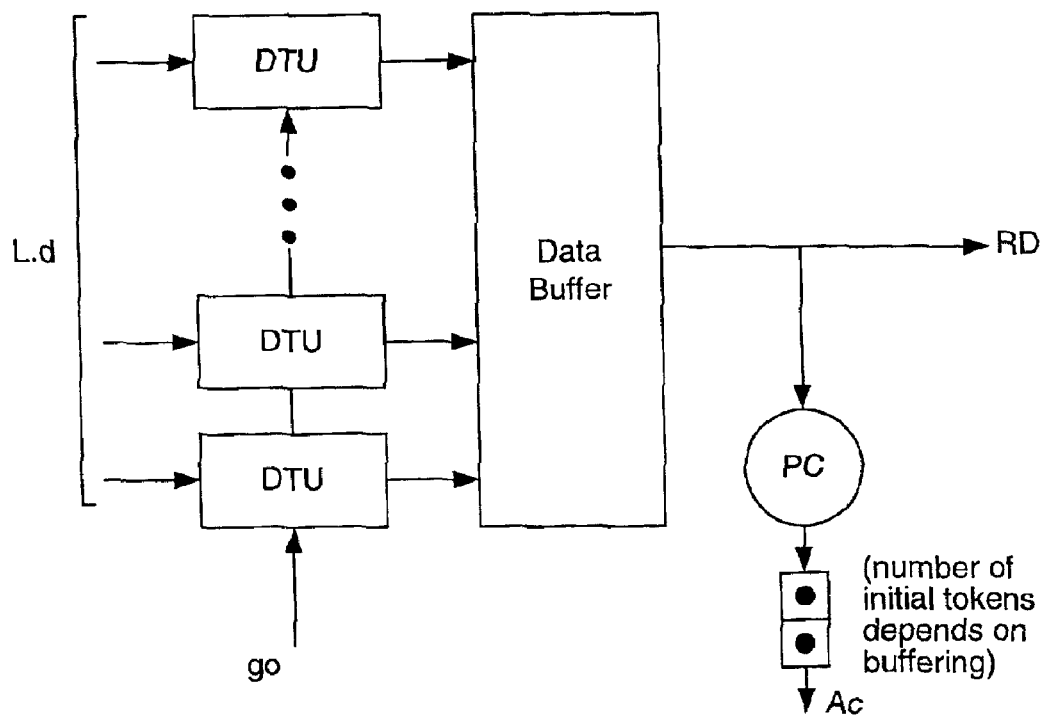
FIG. 45

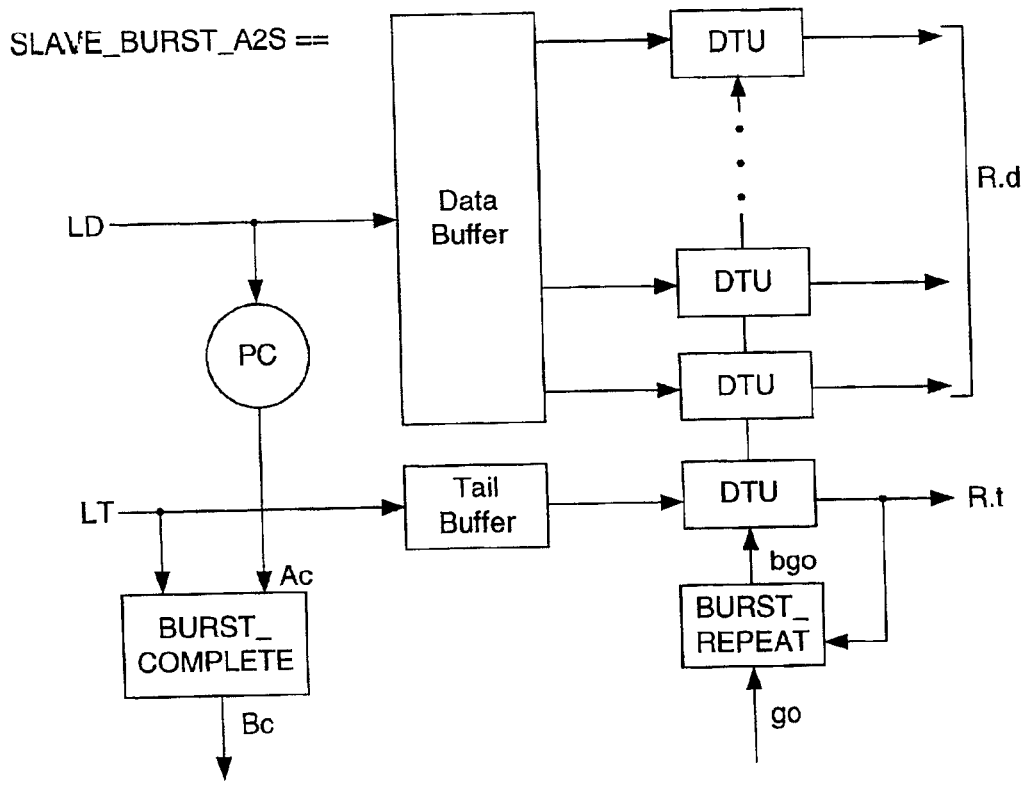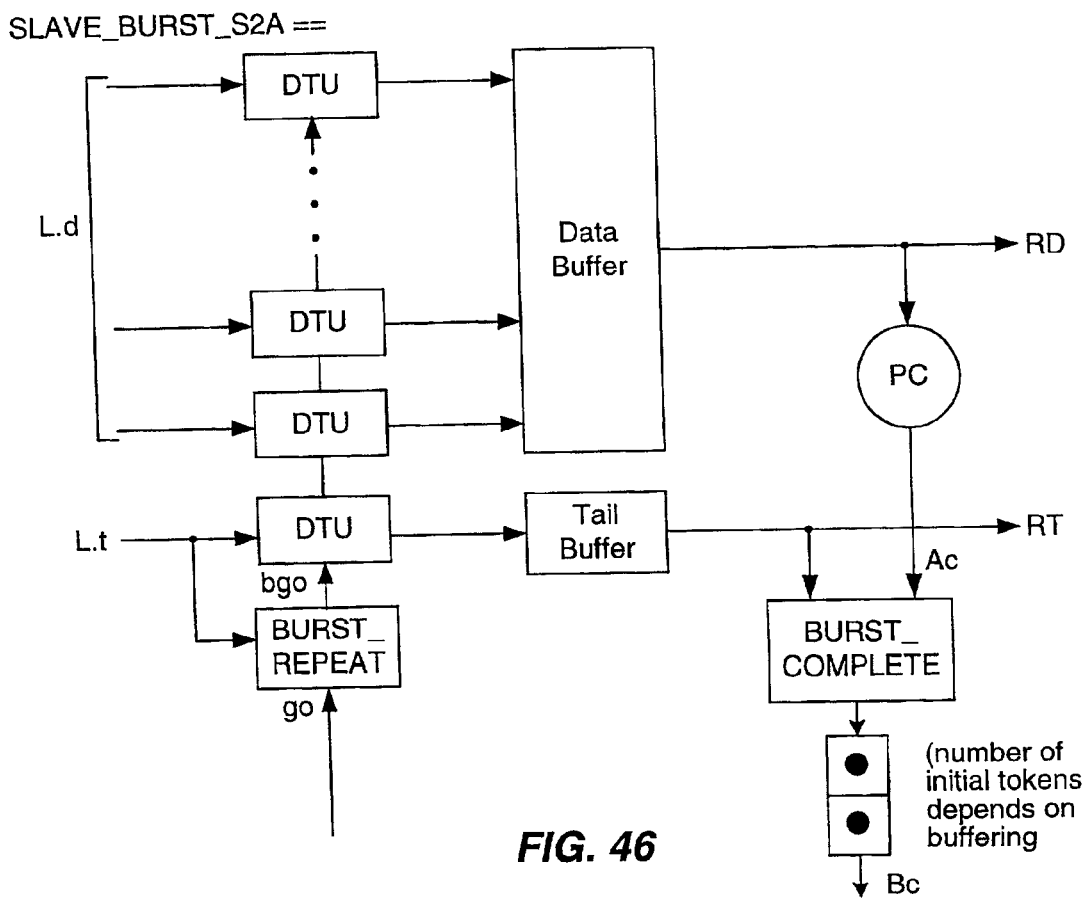
FIG. 46

SLAVE_FIXED_BURST_A2S ==
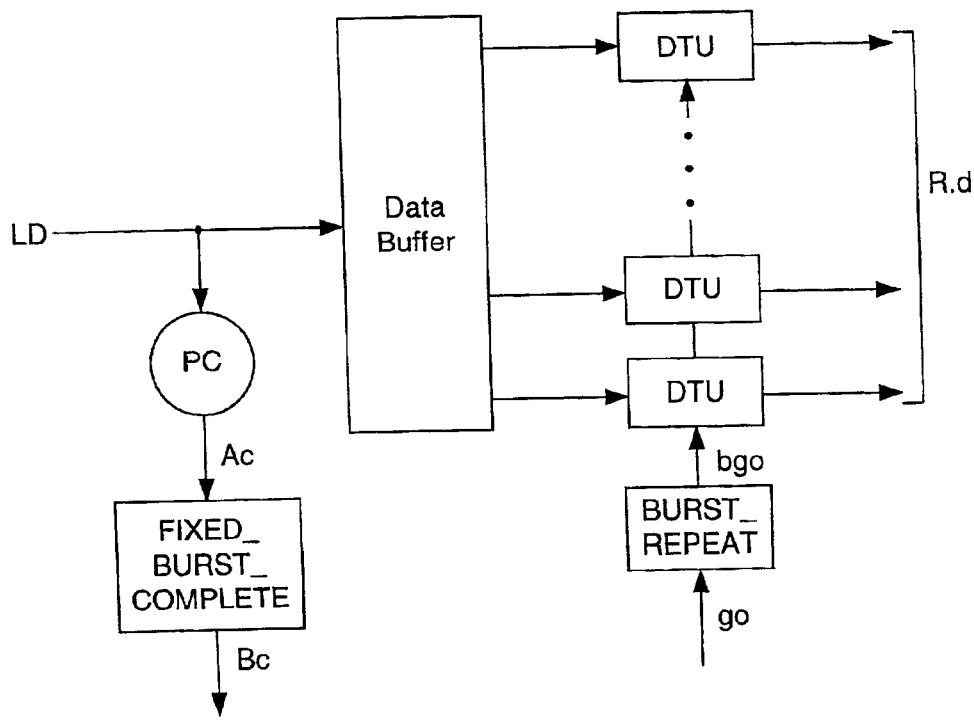
SLAVE_FIXED_BURST_S2A ==
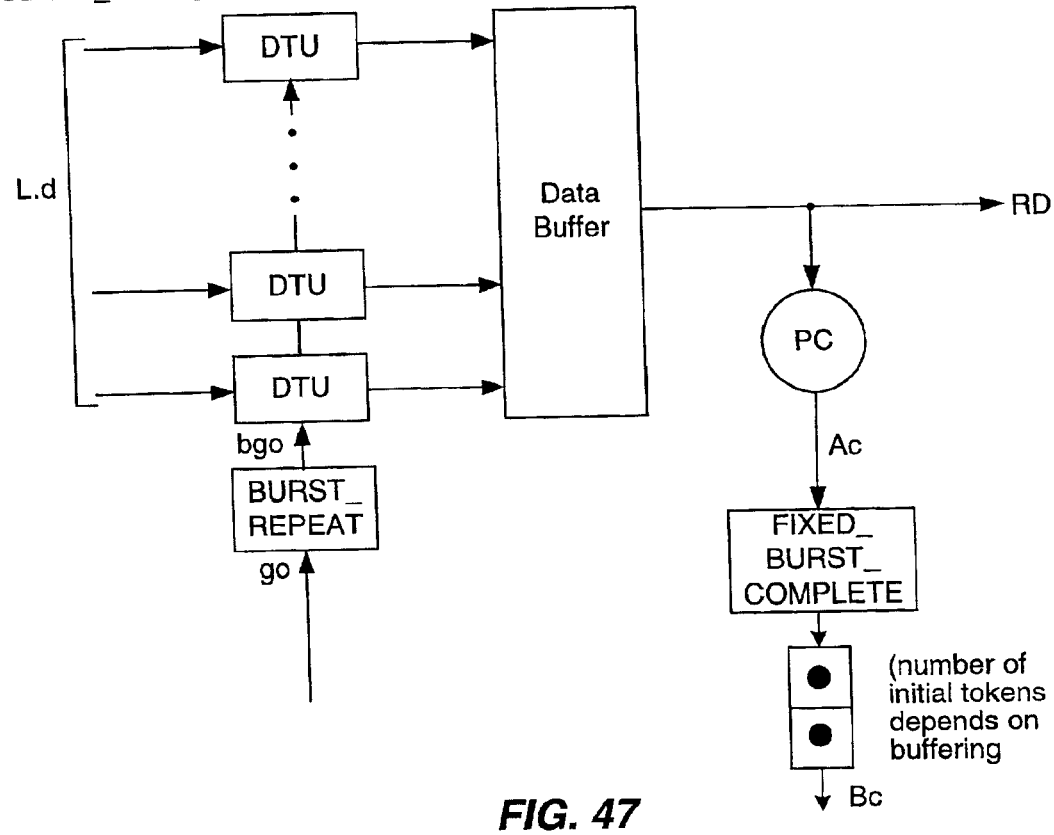
FIG. 47

TECHNIQUES FOR FACILITATING CONVERSION BETWEEN ASYNCHRONOUS AND SYNCHRONOUS DOMAINS

RELATED APPLICATION DATA

The present application claims priority from U.S. Provisional Patent Application No. 60/357,201 for ASYNCHRONOUS-SYNCHRONOUS CONVERSION CIRCUITS filed on Feb. 12, 2002, the entire disclosure of which is incorporated herein by reference for all purposes.

BACKGROUND OF THE INVENTION

The present invention relates to systems integrating asynchronous and synchronous components. More specifically, the invention provides methods and apparatus for facilitating conversion of data between asynchronous and synchronous domains.

Asynchronous design methodologies and the resulting circuits and systems are emerging as a likely mechanism by which the performance of digital systems can continue the historical adherence to Moore's Law which postulates a monotonic increase in available data processing power over time. As asynchronous circuits and systems become more commonplace, there will be an increasing need to integrate such circuits and systems with circuits and systems designed according to currently prevalent synchronous design methodologies. More specifically, there will be a need to provide low-penalty interfaces for converting data between the asynchronous and synchronous domains.

Previous solutions for converting from the asynchronous domain to the synchronous domain typically have dealt with converting only one or some very small number of signals. An example of such a solution is the conversion of an asynchronous signal generated in response to the activation of a switch or button by a human to a synchronous signal which may be employed by synchronous circuitry. Often, such an asynchronous signal will simply be gated through two or more latches, thereby generating a synchronous version of the original asynchronous signal. This approach simply allows a minimum of one clock period (and typically as long as two) for any metastability in the signal to resolve.

While such an approach may be suitable for one or a very small number of signals, it is not suitable for simultaneously converting a large number of signals as represented, for example, by the 32 and 64-bit wide datapaths employed by many digital processing systems today. That is, the latency associated with conversion of a single bit of data encoded using 1of2 encoding may be 2 or more clock cycles due to the fact that the validity of the data to be transferred must be verified. While tolerating such latency may be feasible where the asynchronous signal is only generated infrequently or is only one bit, allowing sufficient time for eliminating metastability and verifying validity when 32 or 64 bits of data are involved is not.

Moreover, certain types of synchronous systems, e.g., memory architectures such as SDRAM systems, are not tolerant of "wait" states which may result from the unpredictable manner in which asynchronous data are transmitted. That is, such systems expect to receive or transmit blocks of consecutive data tokens. The occurrence of clock transitions where valid data are not present can cause the storage of inaccurate data or the failure to store the entire block being transferred.

In view of the foregoing, there is a need for interfaces between asynchronous and synchronous systems which are capable of handling wide datapaths with acceptable latency. There is also a need for interfaces which mitigate the "wait" state problem associated with certain types of synchronous systems.

SUMMARY OF THE INVENTION

According to the present invention, low-latency, high-throughput solutions are provided for converting data between asynchronous and synchronous domains where transmission of data in the asynchronous domain is accomplished using an asynchronous handshake protocol. For data transfers from an asynchronous domain to a synchronous domain, transfer of data to the synchronous domain is not allowed until valid data are present as indicated by completion of the asynchronous handshake associated with the asynchronous domain for each of the bits in the datapath. For data transfers from a synchronous domain to an asynchronous domain, transfer of data to the asynchronous domain is not allowed until an enable is received which is also generated with reference to the asynchronous handshake.

According to a more specific embodiment in which the synchronous domain requires data to be transferred in blocks of consecutive data tokens, transfer of data from the asynchronous domain to the synchronous domain is not allowed until an enable is received which indicates the required number of consecutive tokens are ready to be transferred. The enable is generated with reference to the asynchronous handshake.

According to another specific embodiment, in which the synchronous domain requires data to be transferred in blocks of consecutive tokens, transfer of data from the synchronous domain to the asynchronous domain is not allowed until an enable is received which indicates sufficient memory is available to store the block of consecutive tokens. The enable is generated with reference to the asynchronous handshake.

Thus, the present invention provides an interface for use between an asynchronous domain and a synchronous domain. The asynchronous domain is characterized by transmission of data in accordance with an asynchronous handshake protocol. The synchronous domain is characterized by transmission of data in accordance with transitions of a clock signal. The interface includes a datapath operable to transfer a data token between the domains. The interface also includes control circuitry operable to enable transfer of the data token via the datapath in response to a transition of the clock signal and at least one completion of the handshake protocol.

According to a specific embodiment, an interface is provided for use between an asynchronous domain and a synchronous domain, the asynchronous domain being characterized by transmission of data in accordance with an asynchronous handshake protocol, and the synchronous domain being characterized by transmission of data in accordance with transitions of a clock signal. The interface includes a datapath operable to receive a data token generated in the asynchronous domain and comprising a plurality of bits. The interface also includes control circuitry operable to facilitate transfer of the data token to the synchronous domain via the datapath in response to a transition of the clock signal and completion of the handshake protocol for each of the bits.

According to a more specific embodiment in which the synchronous domain requires a data transfer to comprise a block of consecutive data, the datapath is further operable to accumulate data tokens generated in the asynchronous domain to form the block of consecutive data. The control circuitry is further operable to facilitate transfer of the accumulated data tokens to the synchronous domain via the datapath in response to transitions of the clock signal and after completion of the handshake protocol for each of the bits of each of the data tokens.

According to another specific embodiment, an interface is provided for use between a synchronous domain and an asynchronous domain, the synchronous domain being characterized by transmission of data in accordance with transitions of a clock signal, and the asynchronous domain being characterized by transmission of data in accordance with an asynchronous handshake protocol. The interface includes a datapath operable to receive a data token generated in the synchronous domain and comprising a plurality of bits. The interface also includes control circuitry operable to facilitate transfer of the data token to the asynchronous domain via the datapath in response to a transition of the clock signal and an enable signal generated in accordance with the handshake protocol and indicating that the asynchronous domain is ready to receive the data token.

According to a more specific embodiment, in which the synchronous domain requires a data transfer to comprise a block of consecutive data, the control circuitry is further operable to facilitate transfer of a plurality of data tokens as the block of consecutive data to the asynchronous domain via the datapath in response to transitions of the clock signal and an enable signal generated in accordance with the handshake protocol and indicating that the asynchronous domain has sufficient memory to receive the plurality of data tokens.

According to yet another embodiment, an interface for use between an asynchronous domain and a synchronous domain is provided. A first datapath is operable to receive a first data token generated in the asynchronous domain and comprising a plurality of bits. A second datapath is operable to receive a second data token generated in the synchronous domain. Control circuitry is operable to facilitate transfer of the first data token to the synchronous domain via the first datapath in response to a transition of the clock signal, completion of the handshake protocol for each of the bits, and an enable signal generated in accordance with the handshake protocol and indicating that the asynchronous domain is ready to receive the second data token.

A further understanding of the nature and advantages of the present invention may be realized by reference to the remaining portions of the specification and the drawings.

BRIEF DESCRIPTION OF THE DRAWINGS

FIGS. 7–25 illustrate various components of specific implementations of an A2S interface and an S2A interface according to various specific embodiments of the invention.

FIGS. 26–35 illustrate various components of specific implementations of an A2S interface and an S2A interface according to various other specific embodiments of the invention.

FIGS. 36–44 illustrate various implementations of A2S and S2A burst-mode interfaces according to specific embodiments of the invention.

FIGS. 45–49 illustrate various implementations of A2S and S2A burst-mode interfaces according to other specific embodiments of the invention.

DETAILED DESCRIPTION OF SPECIFIC EMBODIMENTS

Figure 1:
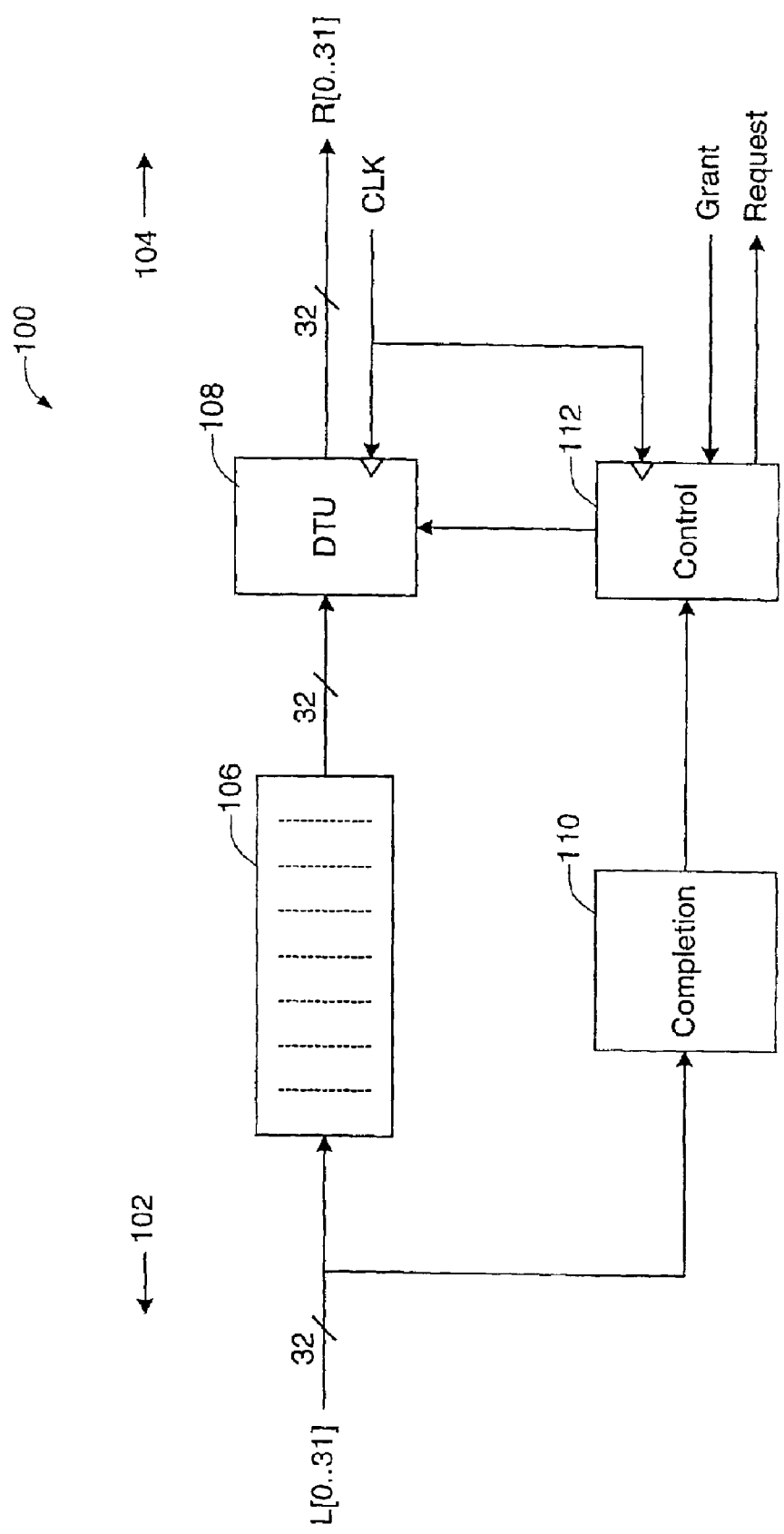
FIG. 1 is a simplified block diagram of an asynchronous-to-synchronous (A2S) interface designed according to a specific embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In addition, well known process operations have not been described in detail in order not to unnecessarily obscure the present invention.

At the outset, it should be noted that some of the techniques and circuits described in the present application are described and implemented as quasi-delay-insensitive asynchronous VLSI. However it will be understood that many of the principles and techniques of the invention may be used in other contexts such as, for example, non-delay insensitive asynchronous VLSI as well as synchronous VLSI.

It should also be understood that the various embodiments of the invention may be implemented in a wide variety of ways without departing from the scope of the invention. That is, the asynchronous processes and circuits described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., FPGAs) suitable for designing and manufacturing the processes and circuits described herein are within the scope of the invention.

The present application also employs the pseudo-code language CSP (concurrent sequential processes) to describe high-level algorithms and circuit behavior. CSP is typically used in parallel programming software projects and in delay-insensitive VLSI. It will be understood that the use of this particular language and notation is merely exemplary and that the fundamental aspects of the present invention may be represented and implemented in a wide variety of ways without departing from the scope of the invention. Applied to hardware processes, CSP is sometimes known as CHP (for Communicating Hardware Processes). For a description of this language, please refer to "Synthesis of Asynchronous VLSI Circuits," by A. J. Martin, DARPA Order number 6202.1991, the entirety of which is incorporated herein by reference for all purposes.

In addition, transformation of CSP specifications to transistor level implementations for various aspects of the circuits described herein may be achieved according to the techniques described in "Pipelined Asynchronous Circuits" by A. M. Lines, *Caltech Computer Science Technical Report* CS-TR-95-21, Caltech, 1995, the entire disclosure of which is incorporated herein by reference for all purposes. However, it should be understood that any of a wide variety of asynchronous design techniques may also be used for this purpose.

The CSP used herein has the following structure and syntax. A process is static and sequential and communicates with other processes through channels. Together a plurality of processes constitute a parallel program. The [and] demark if statements, and a *[and] demark loops.

Multiple choices can be made by adding pairs of B→S inside an if statement or a loop, separated by a ⏐ (indicates deterministic selection) or a | (indicates non-deterministic selection), where B is a Boolean expression and S is a statement. Thus [B1→S1 ⏐B2→S2] means if expression B1 is true, execute S1 or if expression B2 is true, execute S2. If neither B1 or B2 is true, this statement will wait until one is (unlike an if-else construct). The shorthand *[S] means repeat statement S infinitely. The shorthand [B] means wait for boolean expression B to be true. Local variables are assumed to be integers, and can be assigned the value of integer expressions as in x:=y+1. The semicolon separates statements with strict sequencing. The comma separates statements with no required sequencing. The question mark and exclamation point are used to denote receiving from and sending to a channel, respectively. Thus *[A?x;y:=x+1;B!y] means receive integer x from channel A, then assign integer y to the value x+1, then send y to channel B, then repeat forever.

According to various specific embodiments of the invention, the latching of data happens in channels instead of registers. Such channels implement a FIFO (first-in-first-out) transfer of data from a sending circuit to a receiving circuit. Data wires run from the sender to the receiver, and an enable (i.e., an inverted sense of an acknowledge) wire goes backward for flow control. According to specific ones of these embodiments, a four-phase handshake between neighboring circuits (processes) implements a channel. The four phases are in order: 1) Sender waits for high enable, then sets data valid; 2) Receiver waits for valid data, then lowers enable; 3) Sender waits for low enable, then sets data neutral; and 4) Receiver waits for neutral data, then raises enable. It should be noted that the use of this handshake protocol is for illustrative purposes and that therefore the scope of the invention should not be so limited.

According to specific embodiments, data are encoded using 1ofN encoding or so-called "one hot encoding." This is a well known convention of selecting one of N+1 states with N wires. The channel is in its neutral state when all the wires are inactive. When the kth wire is active and all others are inactive, the channel is in its kth state. It is an error condition for more than one wire to be active at any given time.

For example, in certain embodiments, the encoding of data is dual rail, also called 1of2. In this encoding, 2 wires (rails) are used to represent 2 valid states and a neutral state. The wires associated with channel X are written $X^0$, $X^1$ for the data, and $X^e$ for the enable. According to other embodiments, larger integers are encoded by more wires, as in a 1of3 or 1of4 code.

For much larger numbers, multiple 1ofN's may be used together with different numerical significance. For example, 32 bits can be represented by 32 1of2 codes or 16 1of4 codes. In this case, a subscript indicates the significance of each 1ofN code, i.e., $L_g^r$ is the rth wire of the gth bit (or group), and $L_g^e$ is the associated enable. According to still other embodiments, several related channels may be organized into a 1-D or 2-D array, such as L[i] or V [i,j]. To identify individual wires in such embodiments, the notation $L[i]^r$ or $L[i]_g^r$ is used.

FIG. 1 is a simplified block diagram illustrating an exemplary interface 100 for transferring data tokens from an asynchronous domain 102 to a synchronous domain 104 according to a specific embodiment of the invention. According to the embodiment shown, a 32-bit wide data token, i.e., L[0 . . . 31], encoded using 1of2 encoding is assumed. However, it will be understood that data tokens having any number of bits and encoded in many different ways may be transferred from one domain to the other according to the described embodiment.

The 32-bit wide datapath includes a multi-stage buffer queue 106 which receives and transfers the data tokens generated in the asynchronous domain from one stage to the next according to the delay-insensitive handshake protocol described above. Although buffer 106 is shown having 8 stages, i.e., being capable of accommodating 8 data tokens, it will be understood that according to various embodiments, the length of this buffer may vary. As the transfer of each data token into buffer 106 is achieved, completion of the transaction for each of the bits is signaled backwards by the first stage of buffer 106 in accordance with the handshake.

The datapath also includes one or more asynchronous-to-synchronous (A2S) datapath transfer units (one for each bit of the data token) represented by DTU block 108. As will be described, DTU 108 effects the transfer of each data token to synchronous domain 104 in response to an A2S "go" signal and the clock signal (CLK) associated with synchronous domain 104. The manner in which the A2S "go" signal is generated according to a specific embodiment of the invention is described below.

In response to the indication that each of the bits of the token has been successfully transferred to buffer 106 (i.e., the completed handshake), completion block 110 generates a 1of1 transfer token representing the completed transfer. According to a specific embodiment, completion block 110 employs a pipelined architecture to minimize the impact of the latency inherent in generating a single transfer token from the completion signals for each of the bits of the data token. A specific implementation of such a completion block is described below.

The transfer token generated by completion block 110 is received by control block 112 which, in turn, generates a request signal to the synchronous domain indicating that valid data are available to be transferred. Upon receiving a grant signal from the synchronous domain and in response to a transition of the clock signal, control block 112 generates the A2S "go" signal which causes DTU block 108 to simultaneously latch all of the bits of the data token currently at the end of buffer 106 to the synchronous domain. According to an alternative embodiment in which the synchronous domain is always ready for data, the grant and request signals may be omitted, the A2S "go" signal being generated in response to the transfer token and the clock signal.

According to a specific embodiment, distribution of the A2S "go" signal among the individual datapath transfer units in DTU 108 is accomplished using a pipelined tree structure which minimizes the effect of the latency inherent in such a distribution. According to an alternative embodiment, the A2S "go" signal is distributed to the individual datapath transfer units using an electrically continuous conductor, e.g., a single wire.

Figure 2:
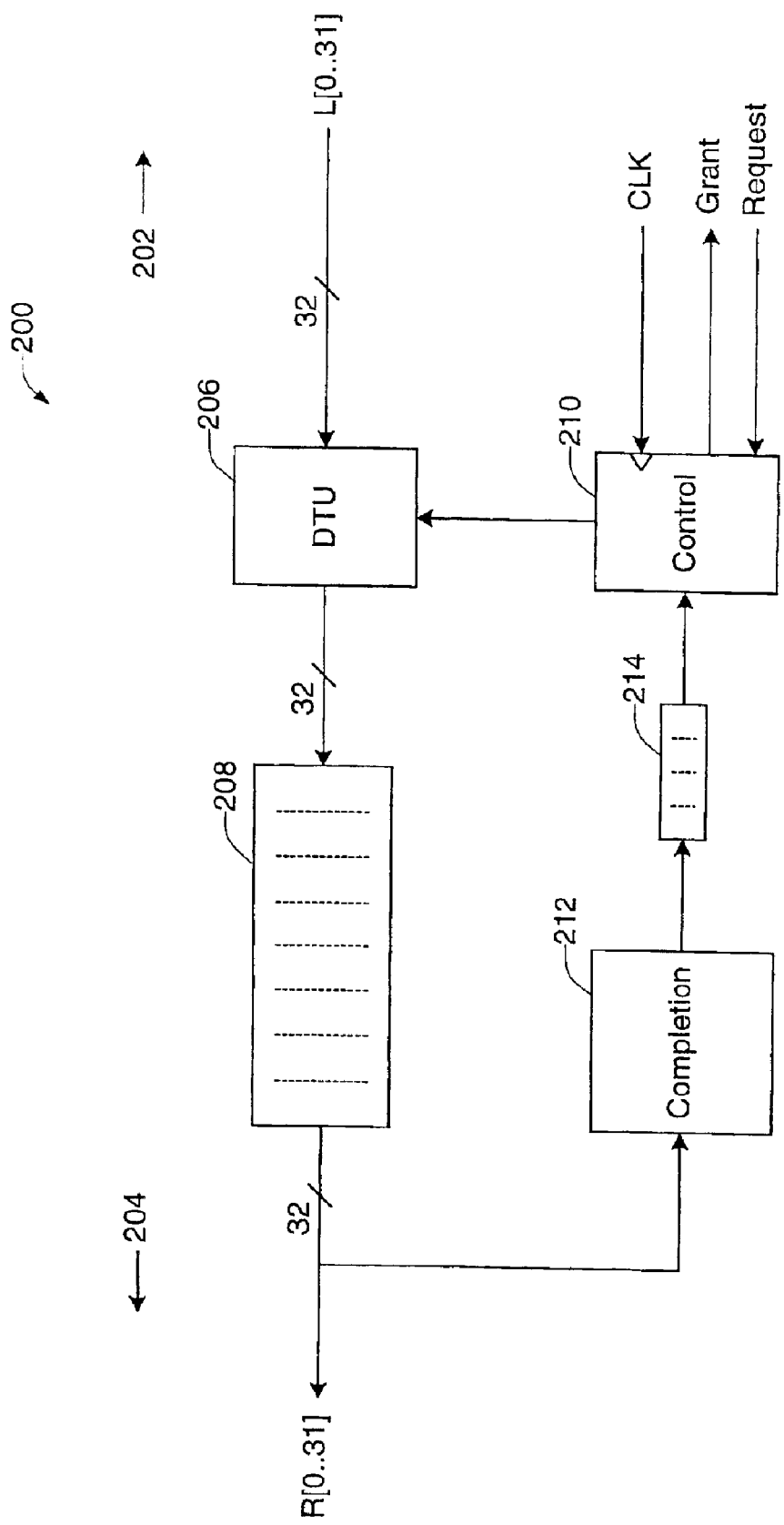
FIG. 2 is a simplified block diagram of a synchronous-to-asynchronous (S2A) interface designed according to a specific embodiment of the invention.

FIG. 2 is a simplified block diagram illustrating an interface 200 for transferring data tokens from a synchronous domain 202 to an asynchronous domain 204 according to another specific embodiment of the invention. As with the embodiment discussed above with reference to FIG. 1, an exemplary 32-bit wide data token, i.e., L[0 . . . 31], is assumed. Data tokens generated in the synchronous domain are transferred to the asynchronous domain via a datapath which includes a plurality of synchronous-to-asynchronous (S2A) datapath transfer units (shown as DTU 206) and a multi-stage buffer queue 208.

Buffer 208 receives and transfers the data tokens received from DTU 206 from one stage to the next according to the delay-insensitive handshake protocol described above. And although buffer 208 is shown having 8 stages, i.e., being capable of accommodating 8 data tokens, it will be understood that according to various embodiments, the length of this buffer may vary. Data tokens generated in the synchronous domain are transferred into buffer 208 by DTU 206 in response to an S2A "go" signal generated by control block 210. Generation of this S2A "go" signal is described below.

In response to the indication that each of the bits of the data token at the end of buffer 208 has been successfully transferred out of buffer 208, completion block 212 generates a 1of1 transfer token representing the completed transfer and the fact that room is now available in buffer 208 for at least one additional data token. According to a specific embodiment, completion block 212 employs a pipelined architecture to minimize the impact of the latency inherent in generating a single transfer token from the completion signals for each of the bits of the data token. A specific implementation of such a completion block is described below.

The transfer token generated by completion block 212 is received and transferred through the stages of transfer token buffer 214 (which can accommodate multiple tokens) according to the delay-insensitive handshake protocol. The number of tokens in token buffer 214 at any given time corresponds to the number of available spaces in buffer 208 for additional data tokens to be transferred from the synchronous domain. The length of token buffer 214 may vary according to different implementations, different buffer lengths being more suitable for particular datapath widths.

When control block 210 receives a transfer token from buffer 214 and there is an outstanding request from the synchronous domain for transfer of a data token, control block 210 generates a grant signal indicating that the asynchronous domain is ready to receive the data token. Control block 210 also generates the S2A "go" signal which enables the transfer of the data token by DTU 206 to the first stage of buffer 208. According to a specific embodiment, the S2A "go" signal is distributed among the individual datapath transfer units of DTU 206 using a pipelined tree structure which minimizes the effect of the latency inherent in such a distribution. According to an alternative embodiment, the S2A "go" signal is distributed to the individual datapath transfer units using an electrically continuous conductor, e.g., a single wire.

According to various embodiments, and as will be understood with reference to FIGS. 1 and 2 and the corresponding discussion, the pipelining of the various elements which generate and distribute the "go" signals results in a low latency solution by which large data tokens may be transferred between asynchronous and synchronous domains. According to some embodiments, the latency for large datapaths, e.g., 32 or 64-bit, can be as little as one clock period.

For certain types of synchronous systems in which data transfers must occur in blocks of consecutive data and/or which are not tolerant of wait states, the foregoing A2S and S2A interfaces may not be sufficient by themselves to effectively transfer data between domains. Therefore, according to various specific embodiments of the invention referred to herein as "burst mode" interfaces, solutions are provided which ensure that the data transmission requirements of the synchronous domain are satisfied.

Figure 3:
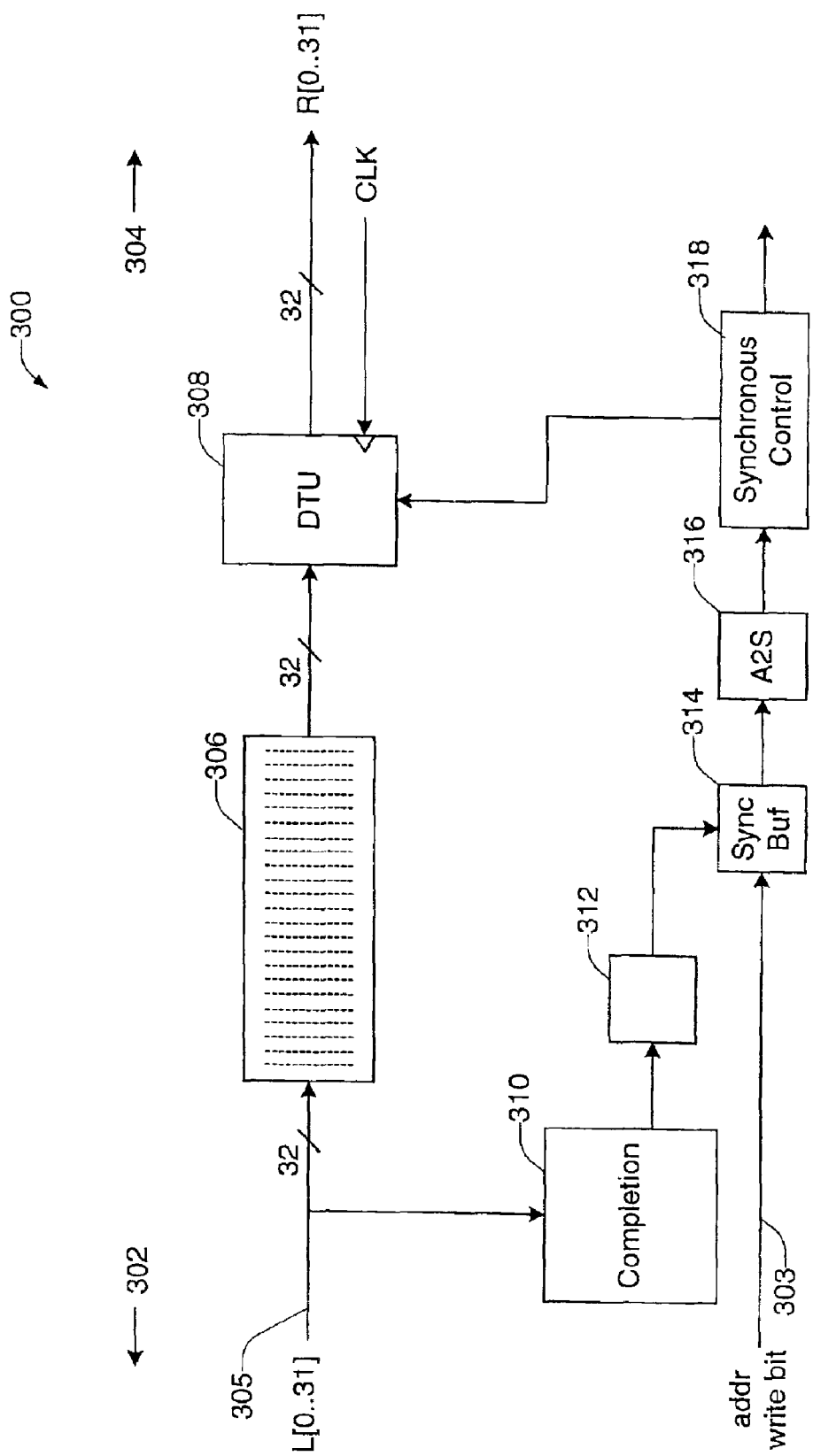
FIG. 3 is a simplified block diagram of a burst mode A2S interface designed according to a specific embodiment of the invention.

FIG. 3 is a simplified diagram illustrating an exemplary "burst mode" interface 300 for transferring data tokens from an asynchronous domain 302 to a synchronous domain 304 according to a specific embodiment of the invention in which the synchronous domain expects data to be transmitted in uninterrupted blocks or "bursts" of consecutive tokens. It should be noted that although the term asynchronous may be used with respect to certain circuitry, the nature of the interfaces of the present invention mean that timing constraints exist on the asynchronous side, e.g., the buffer must be fast enough to feed one data token per clock cycle. While this is a fairly easy constraint to meet in that such a buffer feeds tokens through significantly faster than the typical clock cycle, it is a constraint nevertheless.

According to a more specific embodiment, synchronous domain 304 is a synchronous memory architecture and interface 300 is a "write" interface. It should be understood, however, that a burst mode interface designed according to the invention is more generally applicable than the specific implementation shown in FIG. 3. That is, various implementation details shown in FIG. 3 may not be necessary or may be replaced with other details for burst mode interfaces designed for other applications.

According to the embodiment shown, a 32-bit wide data token, i.e., L[0 . . . 31], encoded using 1of2 encoding is assumed. However, it will be understood that data tokens having any number of bits and encoded in many different ways may be transferred from one domain to the other according to the described embodiment. Control information associated with the data token, e.g., a write command bit and the address to which the data are to be written, is split off from the data token and transmitted via control path 303. The 32-bit data tokens are transmitted via data path 305.

As will be understood, the nature of the control information will depend upon the type of memory architecture in the synchronous domain. As will also be understood, the data tokens may include dummy tokens where only specific words in a block of memory are to be written. These dummy tokens may be included in the bursts and may be identified, for example, by a mask bit associated with each of the tokens.

The 32-bit wide datapath includes a multi-stage buffer queue 306 which receives and transfers the data tokens generated in the asynchronous domain from one stage to the next according to the delay-insensitive handshake protocol described above. Although buffer 306 is shown having 24 stages, i.e., being capable of accommodating 24 data tokens, it will be understood that according to various embodiments, the length of this buffer may vary. As the transfer of each data token into buffer 306 is achieved, completion of the transaction for each of the bits is signaled backwards by the first stage of buffer 306 in accordance with the handshake.

The datapath also includes a plurality of asynchronous-to-synchronous (A2S) datapath transfer units (one for each bit of the data token) represented by DTU block 308. As will be described, DTU 308 effects the transfer of each data token to synchronous domain 304 in response to an A2S "go" signal and the clock signal (CLK) associated with synchronous domain 304. The manner in which the A2S "go" signal is generated according to a specific embodiment of the invention is described below.

In response to the indication that each of the bits of a token has been successfully transferred to buffer 306 (i.e., the completed handshake for each bit), completion block 310 generates a 1of1 transfer token representing the completed transfer. According to a specific embodiment, completion block 310 employs a pipelined architecture to minimize the impact of the latency inherent in generating a single transfer token from the completion signals for each of the bits of the data token. A specific implementation of such a completion block is described below.

According to a specific embodiment, buffer 306 is implemented as a series of asynchronous stages each of which receives and transmits one 32-bit data token at a time via intervening buffer channels using the four-phase asynchronous handshake described above. According to an even more specific embodiment, each buffer stage comprises 16 buffer elements in parallel, each of which is responsible for receiving and transmitting two bits of the data using the handshake. As will be appreciated, there are a number of ways in which buffer 306 and its buffer stages may be implemented without departing from the scope of the invention.

Figure 4:
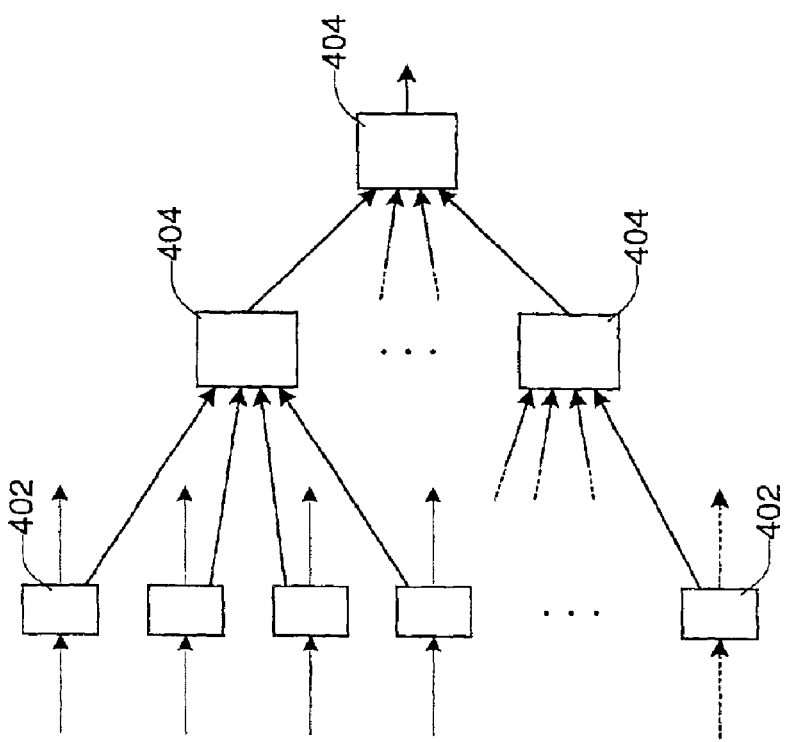
FIG. 4 is a simplified block diagram of a transfer token generation circuit according to a specific embodiment of the invention.

A transfer token is generated for every data token which is successfully transferred to the buffer for the purpose of tracking whether there are a sufficient number of tokens in the buffer for sending a burst. According to a specific embodiment, completion block 310 employs a pipelined architecture to minimize the impact of the latency inherent in generating a single transfer token from the completion signals for each of the bits of the data token. More specifically, completion block 310 is implemented as a tree structure which generates the transfer token from a copy of the data token sent to buffer 306. An example of such a tree structure, including the circuit to copy the data token, is shown in FIG. 4.

Each buffer element 402 receives and transmits two bits of data using an asynchronous handshake protocol. Each buffer element also generates a completion signal, e.g., a copy of the enable, when a successful transfer has occurred. This completion signal (along with three other completion signals for adjacent buffer elements) is received by a 4-way token collection circuit 404 which generates a single token when all four completion signals are received. This token (along with three others generated by similar circuits 404) are transmitted to a final 4-way token collection circuit 406 which generates the transfer token in much the same way.

The CSP for an exemplary 4-way token collection circuit which may be used in such an implementation is given by *[<||i:0 . . . 3:L[i]?>; R!]. The CSP for an exemplary transfer buffer element which may be used in such an implementation is given by *[L?x; R!x, T!].

The transfer token is received by accumulator block 312 which generates a single synchronization token when a specific number of transfer tokens have been accumulated indicating the presence of at least one burst of data in the buffer; e.g., if each data token is a single word of data and a burst must be 8 words of data, a synchronization token is generated for every 8 transfer tokens received.

Synchronization buffer 314 is simply a buffer which copies its inputs to its outputs but won't let the control information on control path 303, e.g., the address and write command, through until it receives the synchronization token from accumulator block 312 which indicates that sufficient data are present in buffer 306 to effect a write to the address identified by the control information. The control information is then transmitted to A2S interface 316 which may comprise a simple buffer stage similar to the datapath transfer units of DTU block 108 and 308 described above. Alternatively, A2S interface 316 may be implemented using something more elaborate such as, for example, A2S interface 100 of FIG. 1.

Figure 5:
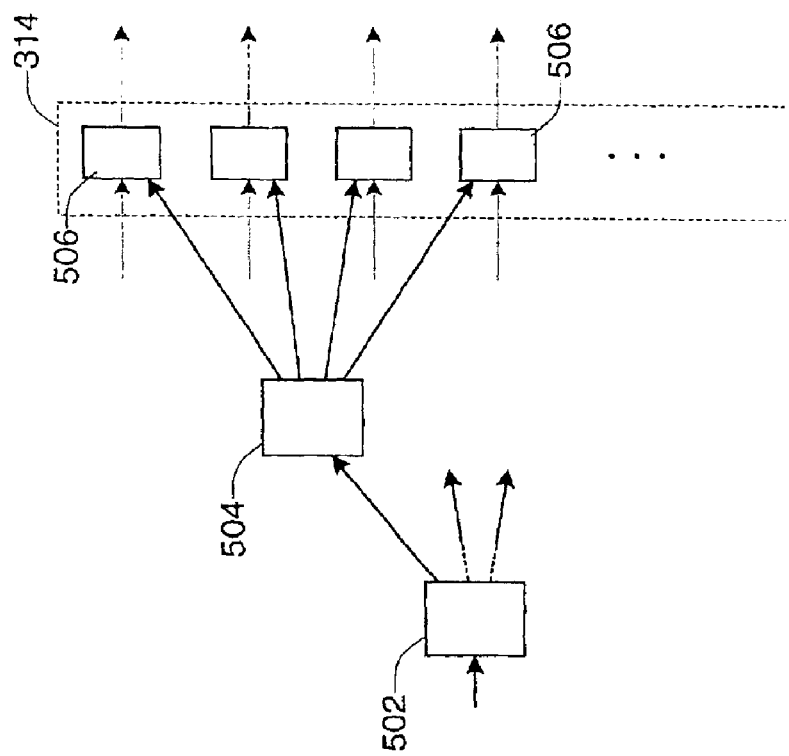
FIG. 5 is a simplified block diagram of a transfer token distribution circuit according to a specific embodiment of the invention.

According to a specific embodiment, the synchronization token generated by accumulator block 312 is distributed to the individual buffer elements of synchronization buffer 314 using a pipelined tree structure, a portion of which is shown in FIG. 5. As with the tree structure of FIG. 4 (which essentially works the reverse function), tree structure 500 minimizes the impact of the latency inherent in distributing copies of a single token to each of the buffer elements.

As shown in FIG. 5, a 4-way token copy circuit 502 receives the synchronization token and copies the token to each of a plurality of subsequent token copy circuits 504 (which may have different numbers of outputs, e.g., 2-way, 3-way) until there are a sufficient number of copies to distribute to the individual buffer elements 506 of synchronization buffer 314. The CSP for an exemplary 4-way token copy circuit which may be used in such an implementation is given by *[L?; <||;:0 . . . 3:R [i]!>]. The CSP for an exemplary synchronization buffer element which may be used in such an implementation is given by *[L?x, T?; R!x].

In any case, once the control information, e.g., a write request, has been transmitted to the synchronous domain, the A2S "go" signal is asserted by synchronous control circuitry 318 and, in response to the successive clock signals, DTU block 308 transfers a burst of data tokens to be written to the specified memory locations according to the protocol by which the synchronous memory architecture is characterized. When the burst is complete, the "go" signal is deasserted.

Figure 6:
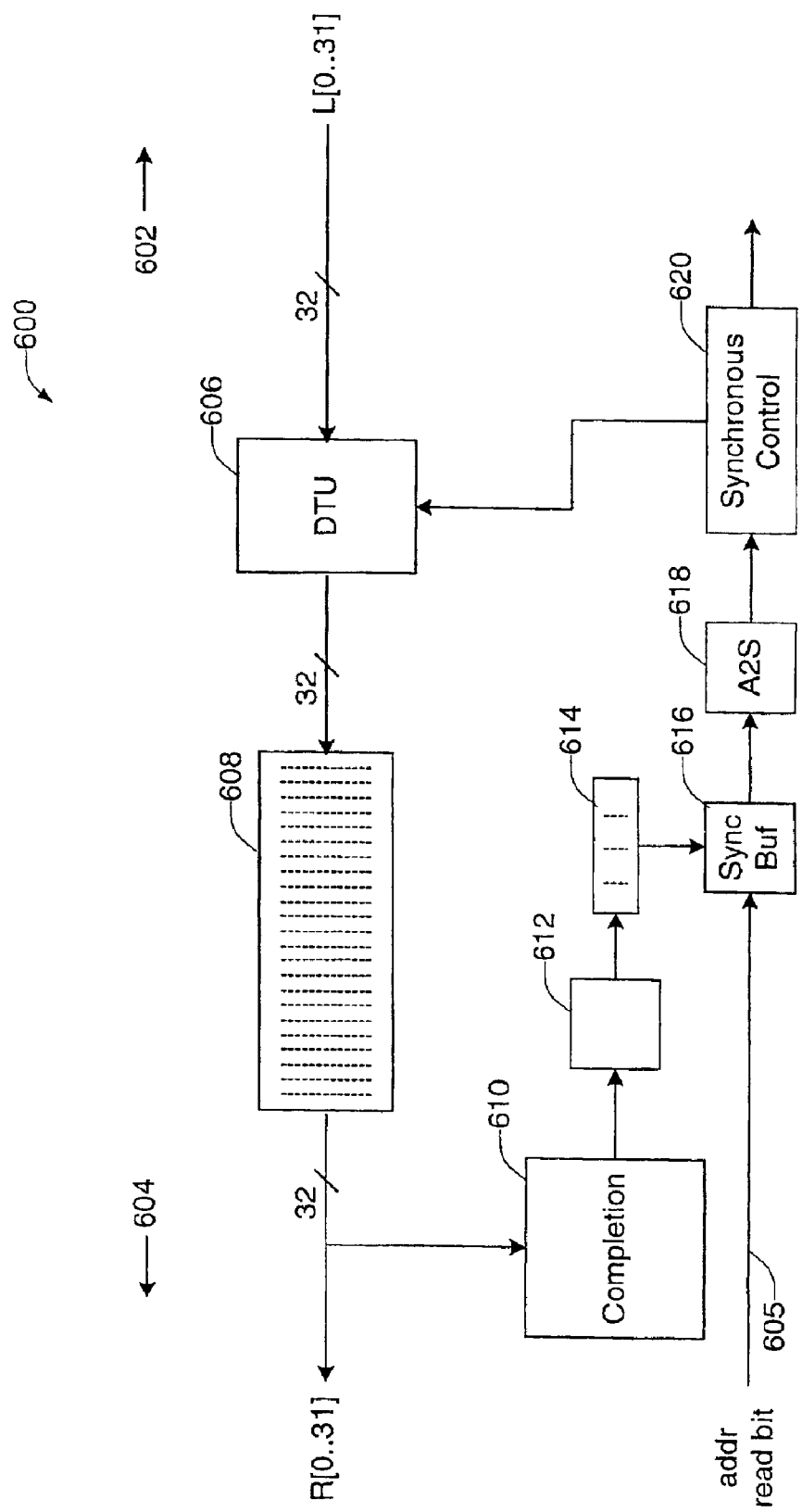
FIG. 6 is a simplified block diagram of a burst mode S2A interface designed according to a specific embodiment of the invention.

FIG. 6 is a simplified diagram illustrating an exemplary "burst mode" interface 600 for transferring data tokens from a synchronous domain 602 to an asynchronous domain 604 according to a specific embodiment of the invention. In the embodiment shown, synchronous domain 602 comprises a synchronous memory architecture, and interface 600 is the read interface for use with the write interface of FIG. 3. According to various other embodiments, S2A interfaces similar to interface 600 may be employed in any of a wide variety of contexts in which the synchronous domain is required to transfer data in bursts of consecutive tokens.

As with write interface 300 of FIG. 3, a 32-bit wide data path, i.e., L[0 . . . 31], encoded using 1of2 encoding is assumed. However, it will be understood that data tokens having any number of bits and encoded in many different ways may be transferred from one domain to the other according to the described embodiment. The datapath includes a plurality of synchronous-to-asynchronous (S2A) datapath transfer units (one for each bit of the data token) represented by DTU block 606. As will be described, DTU 606 effects the transfer of each data token to asynchronous domain 604 in response to an S2A "go" signal and the clock signal (CLK) associated with synchronous domain 304. The manner in which the S2A "go" signal is generated according to a specific embodiment of the invention is described below.

The 32-bit wide datapath also includes a multi-stage buffer queue 608 which receives and transfers the data tokens from one stage to the next according to the delay-insensitive handshake protocol described above. Buffer 608 is shown having 24 stages because in a particular embodiment, this provides space for three 8-token bursts of data. However, it will be understood that according to various embodiments, the length of this buffer may vary. As the transfer of each data token out of buffer 608 is achieved, completion of the transaction for each of the bits is signaled backwards in accordance with the handshake.

As with write interface 300, control information, e.g., a read command and address range, generated in asynchronous domain 604 is not transmitted into synchronous domain 602 until there is sufficient room in buffer 608 to accept the expected burst of consecutive data tokens. According to one embodiment, the size of the bursts are constant. According to another embodiment, the size of the bursts vary and may be determined with reference to the control information. In any case, interface 600 is configured to ensure that whatever the size of the data transfer from the synchronous domain there is sufficient buffer space to accommodate it.

According to a specific embodiment, this is achieved by keeping track of the number of tokens transferred out of buffer 608 with completion block 610 which generates a transfer token for every data token which is successfully transferred out of buffer 608. According to a specific embodiment, completion block 610 employs a pipelined architecture to minimize the impact of the latency inherent in generating a single transfer token from the completion signals for each of the bits of the data token. More specifically, completion block 610 may be implemented as tree structure which generates the transfer token from the completion signals generated by the asynchronous circuitry subsequent to the final stage of buffer 608. Alternatively, completion block 610 may comprise its own buffer stage following buffer 608. An example of such a tree structure is described above with reference to FIG. 4.

The transfer token generated by completion block 610 is received by accumulator block 612 which generates a single synchronization token when a specific number of transfer tokens have been accumulated indicating there is space in buffer 608 for at least one burst of data; e.g., if each data token is a single word of data and a burst is 8 words of data, a synchronization token is generated for every 8 transfer tokens received. The synchronization tokens generated by accumulator block 612 are stored in a token buffer 614 for application to synchronization buffer 616.

Token buffer 614 is shown as being able to accommodate 3 synchronization tokens at a time. This corresponds to the number of data bursts which may be accommodated by buffer 608. However, it will be understood that token buffer 614 may vary in length along with buffer 608 without departing from the scope of the invention. {Are there any timing assumptions associated with the length chosen for the token buffer or is it dictated by the number of bursts which can be accommodated by buffer 608. It will also be understood that when the interface is powered up, token buffer 614 is fully populated with synchronization tokens to reflect the fact that buffer 608 is completely empty.

Synchronization buffer 616 is simply a buffer which copies its inputs to its outputs but won't let the control information on control path 605, e.g., the address range and read command, through until it receives the synchronization token from token buffer 614 which indicates that sufficient space exists in buffer 306 to effect a read of data from the address range identified by the control information. The control information is then transmitted to A2S interface 618 which may comprise a simple buffer stage similar to the datapath transfer units of DTU block 108 and 308 described above. Alternatively, A2S interface 618 may be implemented using something more elaborate such as, for example, A2S interface 100 of FIG. 1.

As discussed above with reference to interface 300, there are some timing constraints in the circuitry of interface 600. That is, for example, interface 600 is configured such that each time synchronization buffer 616 receives a synchronization token from token buffer 614 any data tokens in buffer 608 have migrated far enough toward the end of the buffer such that there is sufficient space at the beginning of the buffer to accommodate the burst of data precipitated by transmission of the synchronization token. According to a specific embodiment, this may be achieved, at least in part, because of the speed with which buffer 608 transfers tokens from stage to stage.

According to a specific embodiment, each synchronization token transmitted from token buffer 614 is distributed to the individual buffer elements of synchronization buffer 616 using a pipelined tree structure as discussed above with reference to FIG. 5.

In any case, once the control information, e.g., a read request, has been transmitted to the synchronous domain, the A2S "go" signal is asserted by synchronous control circuitry 620 and, in response to the successive clock signals, DTU block 606 transfers a burst of data tokens from synchronous domain 602 to buffer 608. When the burst is complete, the "go" signal is deasserted. Generation of such a "go" signal will be described below with reference to more specific embodiments.

More specific implementations of A2S and S2A interfaces will now be described with reference to FIG. 7 et seq. In the subsequent description, an asynchronous channel refers to a 1ofN channel plus a handshaking "enable" wire. The enable wire is identified by an "e" superscript. Communication on these wires happens according to the asynchronous four-phase handshake protocol discussed above. "Validity" refers to the state of the 1ofN channel. When one rail is high, the channel is said to be "valid". Otherwise, it is said to be "neutral" or invalid. A "token" is an abstraction referring to the propagation of valid states from one asynchronous channel to the next in a system.

The converter designs described below also make use of a pair of synchronous handshaking signals (referred to as $S^o$ and $S^i$) to implement flow control. According to a specific embodiment illustrated in FIG. 7, the handshake protocol used is the following: On a rising clock edge, if both A and B are high, the receiver reads the data. If A is high and B is low, the data channel contains an unread value, and the sender is waiting for the receiver to raise B. If A is low and B is high, the data channel is "empty". The receiver has read any previous value and is ready for the next one. If A and B are both low, the channel is empty and the receiver is not ready to read from the channel value.

The following abbreviations and notation are used to represent various signals, channels, and constants: CLK—Clock; Tclk—Clock period; $S^o$—synchronous handshake output signal; $S^i$—synchronous handshake input signal; $A_c$—PC 1of1 output channel; go—Control signal to the DTU array indicating whether to transfer a token (either a synchronous single-rail broadcast or a 1of1 four-phase asynchronous channel); and en—Internal enable signal in a cell (sometimes en is also the enable to its input channels, sometimes not).

Each of the embodiments described below implement high-performance conversion circuitry between clocked (synchronous) logic and locally-handshaking, (asynchronous) logic. In the asynchronous domain, the transfer of data occurs on 1ofN rail channels, following a four-phase local handshaking protocol. In the synchronous domain, transfer of data happens according to timing relationships with the transitions of a clock signal. Any circuit which mixes the two communication conventions inevitably introduces metastability to the system. Localizing that metastability to a single signal per data token transfer while maintaining low-latency, high-throughput transfers is an objective of various embodiments described hereinafter.

The port interfaces of the Asynchronous-to-Synchronous (A2S) and Synchronous-to-Asynchronous (S2A) converters 802 and 804, respectively, are illustrated in FIG. 8. It should be noted that in the following discussion all synchronous signals are assumed to be single-rail. However, embodiments of the invention can trivially accommodate other synchronous signaling conventions (e.g. dual-rail or differential).

A simplified description of the behavior of A2S interface 802 is as follows:

1. An asynchronous token arrives on the L channel, indicated by all $L_0 \ldots L_{M-1}$ channels going valid.
2. On the next rising edge of CLK, if either $S^i$ is high or if $S^o$ is low, a transfer occurs (go to state 4). Otherwise,
3. The converter waits until a rising CLK transition when $S^i$ is high.
4. The data value on L is read (enables go low, the $L_0 \ldots L_{M-1}$ data rails go neutral). On the falling edge of CLK, the value is asserted on $R_0 \ldots R_{N-1}$ and $S^o$ is set high.
5. Operation returns to state 1. Until the next token arrives, on each rising CLK edge, if $S^i$ is high, $S^o$ is set low on the subsequent falling CLK transition.

This is a simplified description due to nonzero slack on the L channel internal to A2S converter 802. The precise timing relationship between the L handshake and the converter's synchronized transfer is unknown (but can only happen at times earlier than those indicated above).

A similarly simplified description of the behavior of S2A interface 804 is as follows:

1. The $R_0 \ldots R_{M-1}$ channels all go neutral, and the converter waits for all $R_i^e$ enables to be high (indicating readiness to receive a token). As long as at least one $R_i^e$ is low, $S^o$ is set low on the falling edge of CLK.
2. On the next rising edge of CLK, if $S^i$ is high, a transfer occurs (go to state 4).

Whether or not a transfer occurs, $S^o$ is asserted high on the next falling CLK edge.

3. The converter waits until a rising CLK transition when $S^i$ is high.
4. The data value on $L_0 \ldots L_{N-1}$ is written to the R channels ($R_0 \ldots R_{M-1}$ go valid, the enables transition low). Operation returns to state 1.

The A2S interface and S2A interface designs described below implement the above-described behavior. In addition, specific implementations of the described embodiments are characterized by the following properties. With regard to timing, various designs of the present invention impose a minimum of timing assumptions on all signals. Races exist only against the clock, and on synchronous inputs which are assumed to conform to specified setup and hold times relative to the rising edge of CLK. Assuming all timing assumptions hold, metastability arises only at a single point in the design. This metastability is resolved by a Seitz arbiter. ½ Tclk (minus epsilon) is allowed for metastability resolution. All synchronous outputs transition during some range $[tO_{min}, tO_{max}]$ following CLK+.

According to various embodiments, both S2A and A2S directions can sustain one transfer per clock cycle. The maximum latency penalty of the conversion is one clock cycle (relative to a synchronous-to-synchronous transfer), suffered only in pathological cases. Completion of incoming A2S and outgoing S2A tokens is pipelined (with local DI handshakes) to keep cycle times low.

According to various embodiments, minimized synchronization to CLK allows "overclocking": correctness is maintained even as Tclk drops below its minimal value ("nop" cycles are introduced via synchronous handshaking). Assuming all timing races are met, the only possibility of metastability propagating beyond the arbiter is if the arbiter resolves during a period of one transition exactly Tclk/2 following CLK+.

Figure 9:
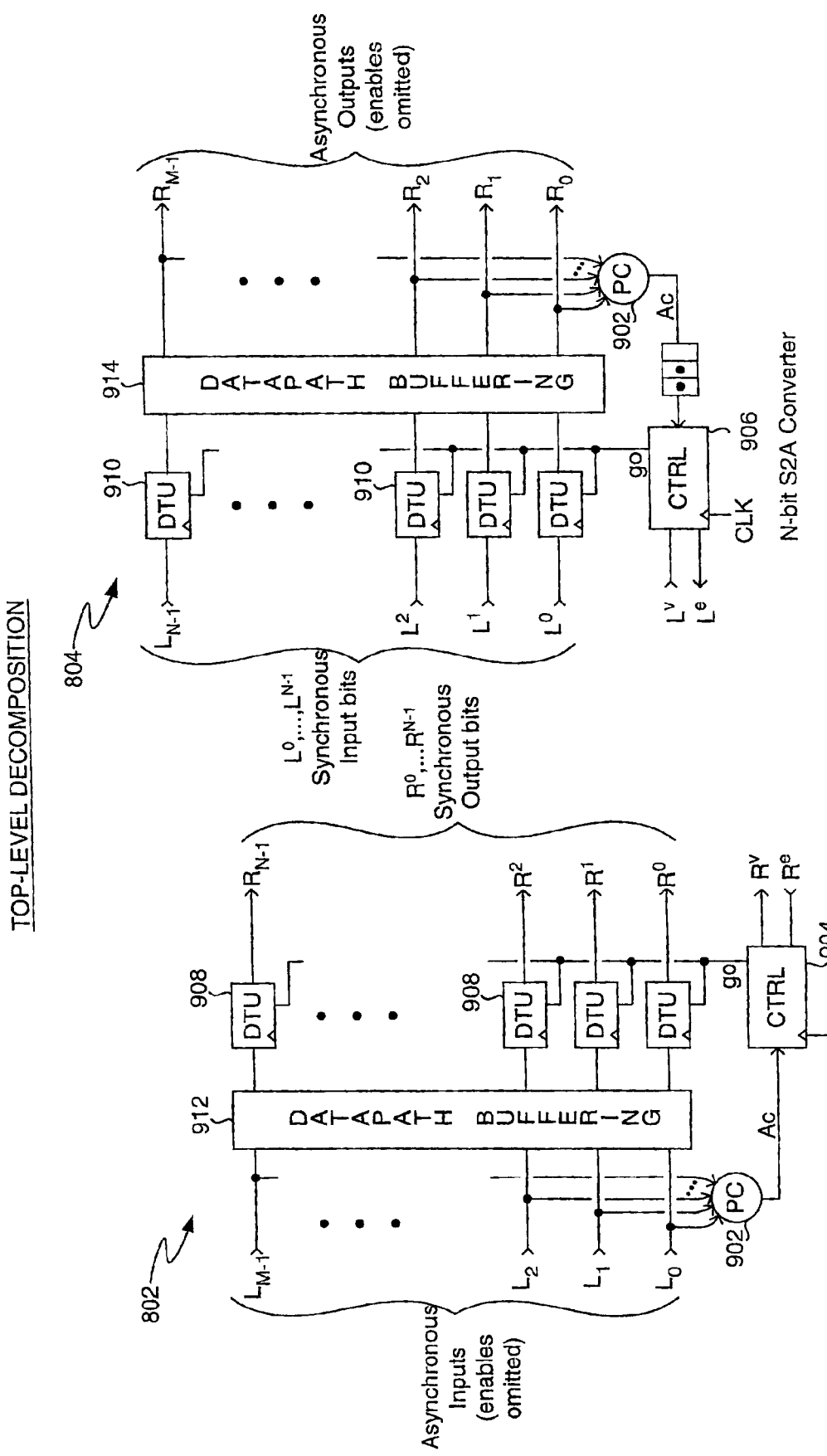

The internal high-level organization of the A2S and S2A converters 802 and 804 according to a specific embodiment is shown in FIG. 9. Each interface includes four high-level components:

1. Pipelined Completion (PC) 902. The purpose of this component is to identify and acknowledge an incoming (A2S) or outgoing (S2A) data token. This "completion" logic involves feeding the OR'd data rails of each data channel into a tree of C-elements, i.e., condensing these data rails into a single "data valid" signal. For all but single-channel tokens, this combinational logic tree introduces too much forward-latency to sustain a high cycle rate. Therefore, according to a specific embodiment, the incoming token is completed in a pipelined manner, buffering intermediate completion signals at each stage.

According to a specific embodiment, PC 902 is identical for both A2S and S2A converters of the same token size & type. It appears on the asynchronous side of each (i.e. at the input of the A2S, at the output of the S2A).

2. Control Processes (CTRL) 904 and 906 (e.g., see FIG. 10). CTRL processes 904 and 906 are responsible for (1) issuing a "go" signal to the datapath when both asynchronous and synchronous sides are ready for a transfer, (2) sequencing the asynchronous and synchronous handshaking signals ($A_c^d$, $A_c^e$) and ($S^i$, $S^o$), and (3) synchronizing as necessary to CLK.

The control processes for the A2S and S2A designs (CTRL 904 and 906, respectively) are nearly identical. The only difference between A2S CTRL 904 and S2A CTRL 906 is their reset state: A2S CTRL 904's $S^o$ signal resets low, while S2A CTRL 906's $S^o$ resets high. (The former reflects the empty state of the synchronous output channel, the latter reflects the empty state of the S2A's asynchronous capture buffer.)

3. Datapath Transfer Units (DTU) 908 and 910 (e.g., see FIG. 11). Generally, the DTU unit is responsible for transferring a data token across the synchronous/asynchronous boundary once a transfer ("go") signal is received from the associated CTRL process. The A2S and S2A datapath transfer units differ significantly. The details of each are described below.

4. Datapath buffering 912 and 914. Both the A2S interface and the S2A interface require additional stages of asynchronous buffers between their PC and datapath transfer units. The buffers either store data tokens prior to transfer (A2S buffer 912) or prior to being consumed by subsequent asynchronous circuitry (S2A buffer 914). In both cases, timing assumptions are imposed on these buffer stages. Specifically, the buffers are capable of passing tokens faster than the DTU units can consume or produce them. Stated another way, the buffer array has no critical cycles longer than the clock period.

Given the above high-level decomposition of A2S interface 802, a more detailed description of its operation can now be provided. Beginning from the asynchronous L input, a token (comprising N 1ofM channels following the four-phase handshake protocol) enters A2S converter 802 and is immediately copied to two branches: one into Pipelined Completion (PC 902), and the other into datapath buffers 912 preceding the A2S DTU array. PC 902 condenses the token into a single 1of1 token through several stages of logic, the number of stages depending on the size of N and M. The 1of1 token (on the "$A_c$" channel in FIG. 9) is then presented to A2S CTRL process 904 as a notification that an asynchronous token has arrived and is ready to be converted.

A2S CTRL process 904 samples the state of the 1of1 $A_c$ channel on the next rising edge of CLK. Seeing that it contains valid data ($A_c^d$ asserted), it makes the decision whether to transfer the token to the synchronous domain or not, depending on the states of the output channel and the synchronous "grant" ($R^e$) signal. If the R channel is empty ($R^v$ low) or if the grant signal is high, A2S CTRL process 904 will raise its request signal ($R^v$). If $R^e$ is also high, CTRL 904 will assert the "go" datapath signal to the DTU array indicating that the datapath transfer units should acknowledge the asynchronous data token and latch the value to the synchronous $R^d$ bits. By this time, the asynchronous token will have propagated through buffer 912 and will be ready for consumption by the array of DTUs 908.

If, on the other hand, A2S CTRL process 904 does not transfer the token, i.e., if $R^v$ was high and $R^e$ was low, then it will neither acknowledge the $A_c$ token nor assert "go". On some subsequent clock cycle when $R^e$ goes high (indicating the recipient has accepted the stale synchronous value on R), it will then transfer the asynchronous token as described above.

According to various embodiments, this operational description of A2S converter 802 relies on several timing assumptions:

1. In order to maintain full-throughput transfers (i.e. one every clock period when neither side stalls), each asynchronous pipeline unit must be capable of completing its input and output handshake cycles in under one clock period. For example, it is the inability of a single-stage PC to complete a 32-bit datapath in a sufficiently short time which necessitates the pipelining of this unit.

Note that in particular the two branches on the input L path must satisfy this requirement when the pipelines are both at peak dynamic capacity (steady-state condition) and at peak static capacity (following a synchronous-side stall). The latter condition is more difficult to satisfy, but must be if the converter is to promptly respond to the case that $R^e$ goes high after several cycles of stalling low.

Also note that once this condition is satisfied within the A2S asynchronous circuitry, no further timing assumptions must be imposed on the asynchronous circuitry feeding into the A2S converter. Outside the A2S, the handshake can stall unpredictably for arbitrarily long times, and the A2S converter will always maintain correctness, converting tokens at peak throughput whenever possible.

2. The A2S must be able to sample the $A_c$ state at the rising edge of CLK and then, if it decides to transfer, it must assert the "go" signal to all A2S_DTU elements, which then must latch the L data value to $R^d$ bits, all within a single clock cycle, never exceeding some maximum output time. Given that the sampling of $A_c$ relative to clock fundamentally requires a nondeterministic period of time to reach a decision (due to metastability resolution), this timing assumption must be verified under the worst-possible arbitration time. If the sampling were ever to take longer than some critical amount (approximately half a clock cycle in this design), then the converter runs the risk of violating its max output time (or, more precisely, propagating a metastable state outside the A2S CTRL arbitration logic). This failure condition must be treated as catastrophic, and the probability of such a failure must be characterized. From this, the MTBF (Mean Time Between Failure) of the A2S converter can be determined, given some assumptions about input/output stall conditions.

3. The A2S converter must never change its synchronous outputs ($R^v$, $R^d$) too early following the rising edge of CLK. This is a standard synchronous timing ("hold time") constraint. The design presented here satisfies this by conditioning all output changes on ~CLK, i.e. as long as the hold times of the output synchronous circuitry are less than Tclk/2, there is no possibility of failure. There is no reason to more aggressively optimize this minimum output time (in order to give the output synchronous circuitry more time for calculation within the clock cycle) since the design assumes a worst-case metastability resolution time of approximately Tclk/2. That is, the minimum possible max output time is also greater than Tclk/2.

In S2A converter 804, the arrival of a token to transfer is indicated by the synchronous-side's assertion of $L^v$. S2A CTRL process 906 decides whether to grant a transfer or not by sampling the state of the 1of1 $A_c$ token at the rising edge of CLK. The presence of a token on $A_c$ indicates space in datapath output buffer 914 for an additional token. In this case (when $A_c^d$ is set at the rising edge of CLK), S2A CTRL 906 will set its $L^e$ grant line high and acknowledge the $A_c$ token. If both $L^e$ and $L^v$ go high, the "go" signal to the array of DTUs 910 is asserted to transfer the synchronous input value to the asynchronous capture buffer.

As the output asynchronous circuitry consumes the converted tokens captured in S2A buffer 914, copies are sent to Pipelined Completion (PC) 902, becoming new $A_c$ tokens. In this manner the total number of $A_c$ tokens are conserved in the system, representing the fixed token capacity of S2A converter 804. If at any point the output asynchronous circuitry stalls (stops draining buffer 914), buffer 914 fills up and no new $A_c$ tokens are produced. The A2S CTRL process 906 then lowers its grant ($L^e$) line and stops converting tokens until the output logic reads from R, producing an $A_c$ token. Pictorial representations the reset condition, normal operation, and the asynchronous-side stall condition are illustrated in FIGS. 12A–12C, respectively.

S2A converter 804 must satisfy the same three general categories of timing requirements described above with reference to A2S converter 802. Namely:

1. All asynchronous pipeline cells within the S2A converter must be able to sustain clock period handshake cycles under all operating conditions.

In fact, the requirement on the asynchronous output buffer is even more critical for the S2A converter than it is on the A2S converter's input buffer. In the A2S converter, if the input asynchronous buffering "stutters" somewhat when transitioning from a full (previously stalled) to a dynamic condition, at worst an unnecessary send-stall "no-op" cycle will be introduced. In the S2A converter, however, if the output buffers cannot fully drain a single token in one clock cycle out of a full receiver-stall state, the S2A DTU array may not be able to transfer the granted token when the S2A CTRL process thinks it can. The result would be a lost or corrupted data token.

2. The S2A converter must be able to set its synchronous output signal ($L^e$) within some reasonable max output time in order to satisfy the setup time of the input synchronous circuitry, even under the worst-case metastability resolution time. This requirement is also imposed on the internal go synchronous control broadcast to the S2A datapath; go must not transition too late into the clock cycle in order for the datapath units to be able to transfer (or not) a token on the next clock cycle.

3. All synchronous outputs ($L^e$, go) must not transition too early in the clock cycle. As in the A2S converter, this requirement is satisfied by conditioning changes on ~CLK.

Implementation details of specific embodiments of the converter designs are given below. Some details of the circuits have been omitted for clarity. These include staticizers on the output nodes of all dynamic logic, and extra reset circuitry which any practical implementation would require. Both of these additions are straightforward to implement. The specifications of the units described below are given in CSP.

Figure 13:
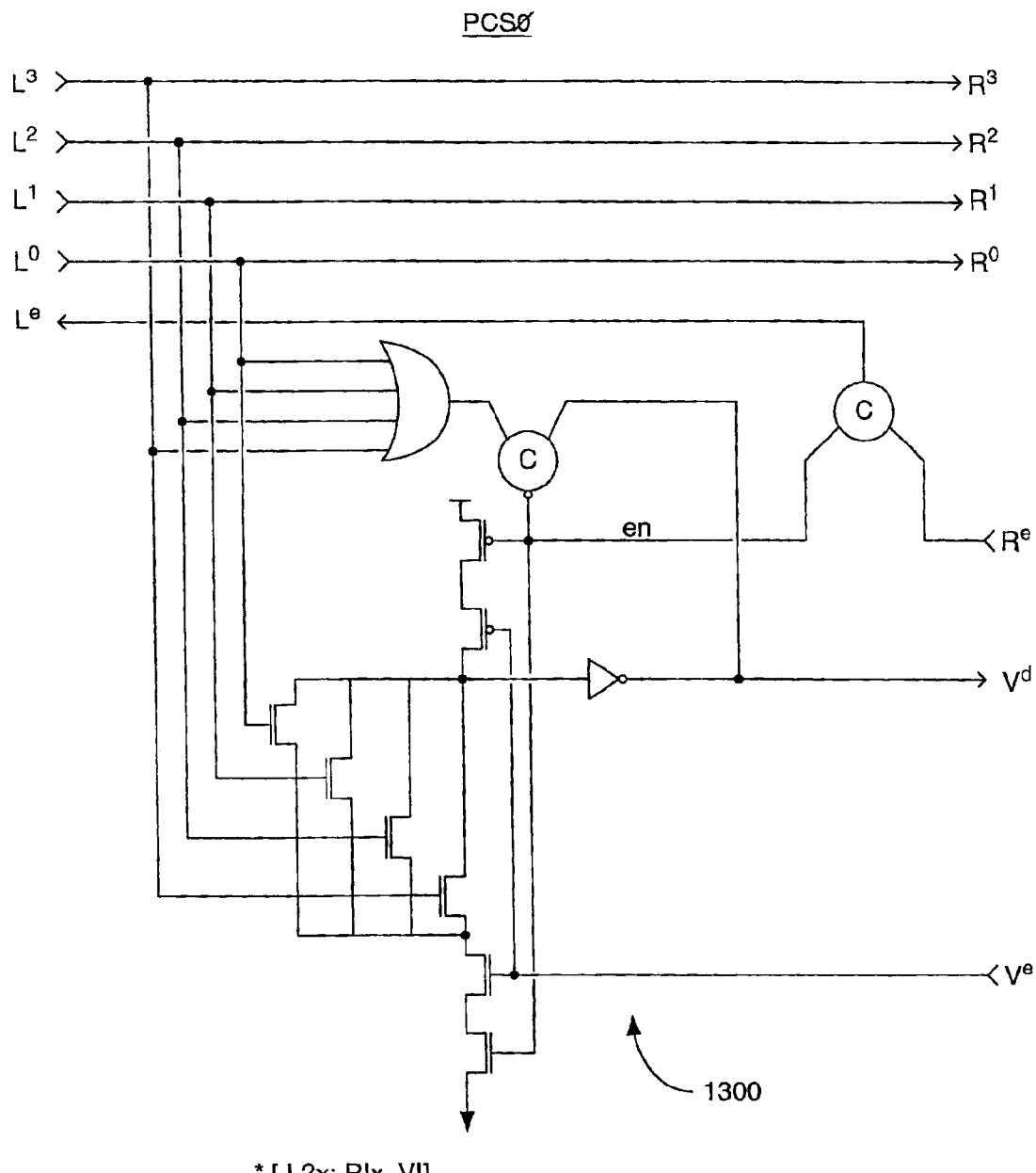
Figure 14:
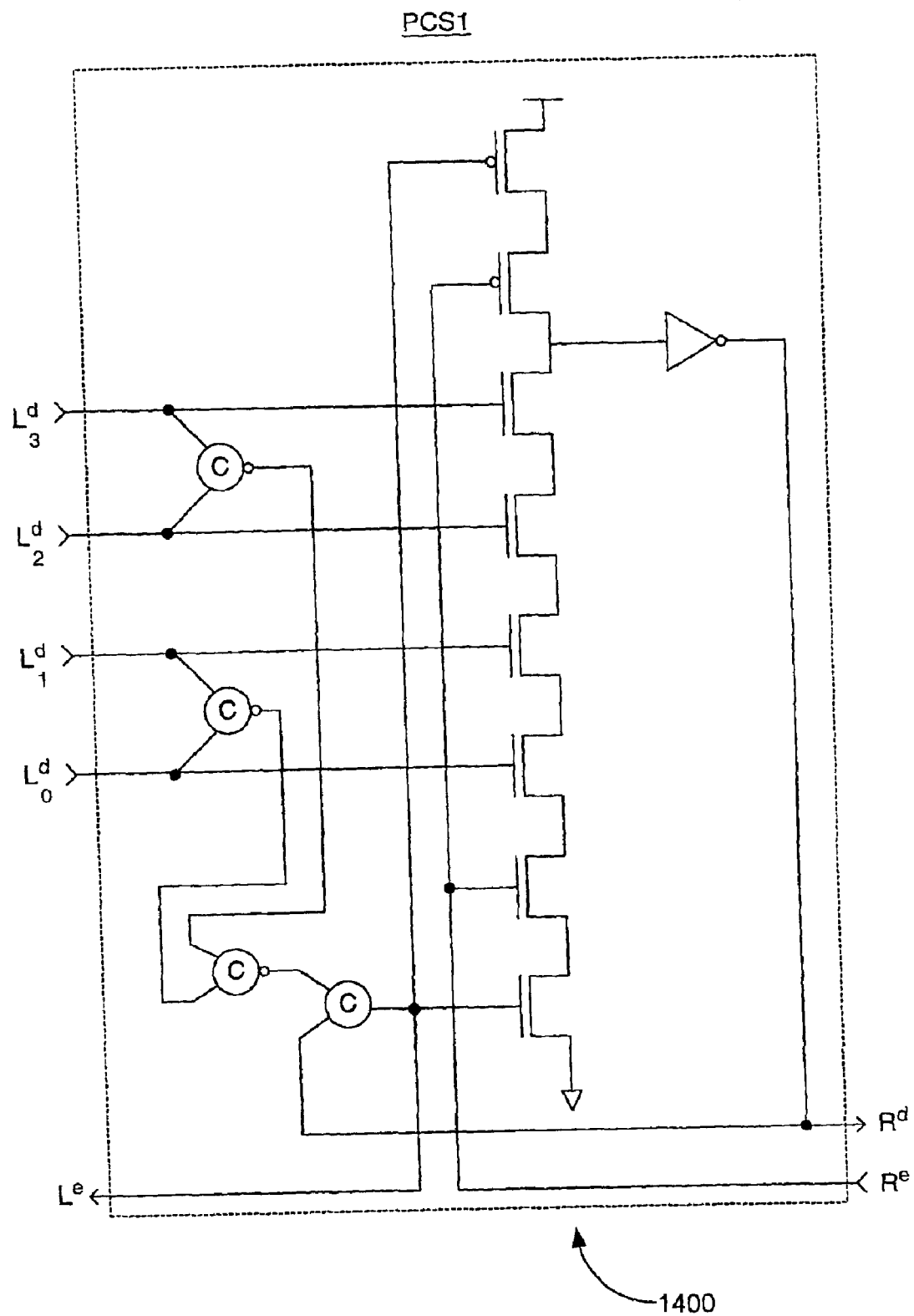

Pipelined Completion unit 902 includes a validity detection element per input channel. An example of such a circuit is PCS0 1300 of FIG. 13 which has a 1of4 input. PCS0 1300 is followed by a log(N)-deep tree of cells, an example of which is PCS1 cell 1400 of FIG. 14. PCS0 unit 1300 implements the simple CSP specification:

*[L?x; R!x,V!]

According to a specific embodiment, the "R!x" output operation is done in a "slack-zero" manner, i.e., the L and R data rails are wired together. When one of the L data rails goes high, a 1of1 token is sent on V.

Figure 15:
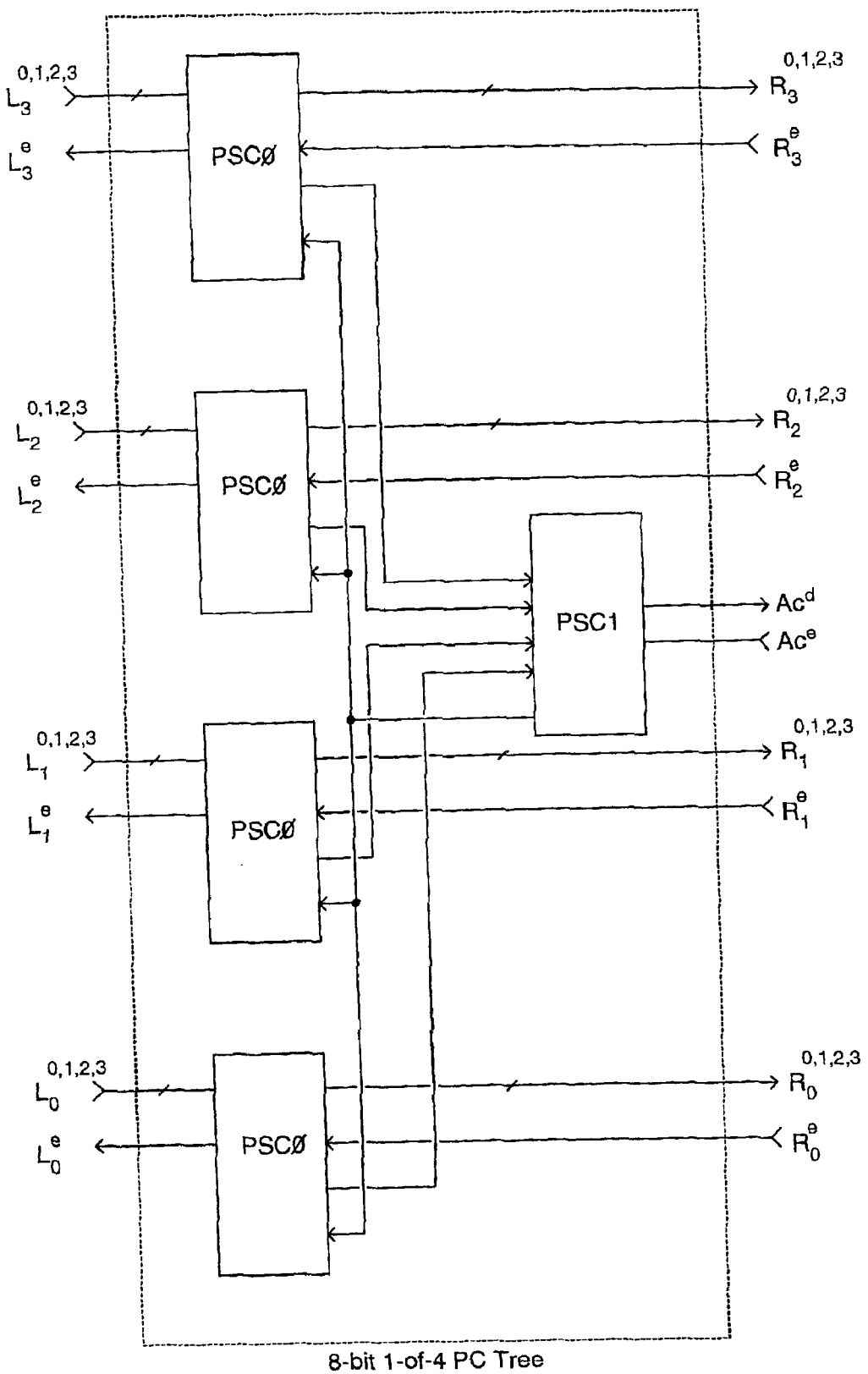

A four-input PCS1 unit 1400 implements the CSP specification:

*[L[0]?, L[1]?, L[2]?, L[3]?; R!]

i.e., it reads the 1of1 inputs from four PCS0 units, and then outputs a single 1of1 token. An example with N=4 1of4 input channels (i.e., 8 bits' worth of data) is shown in FIG. 15. The PCS1 units can be combined in a tree structure to complete arbitrarily large datapaths. Larger completion trees can be constructed in an analogous manner.

Figure 16:
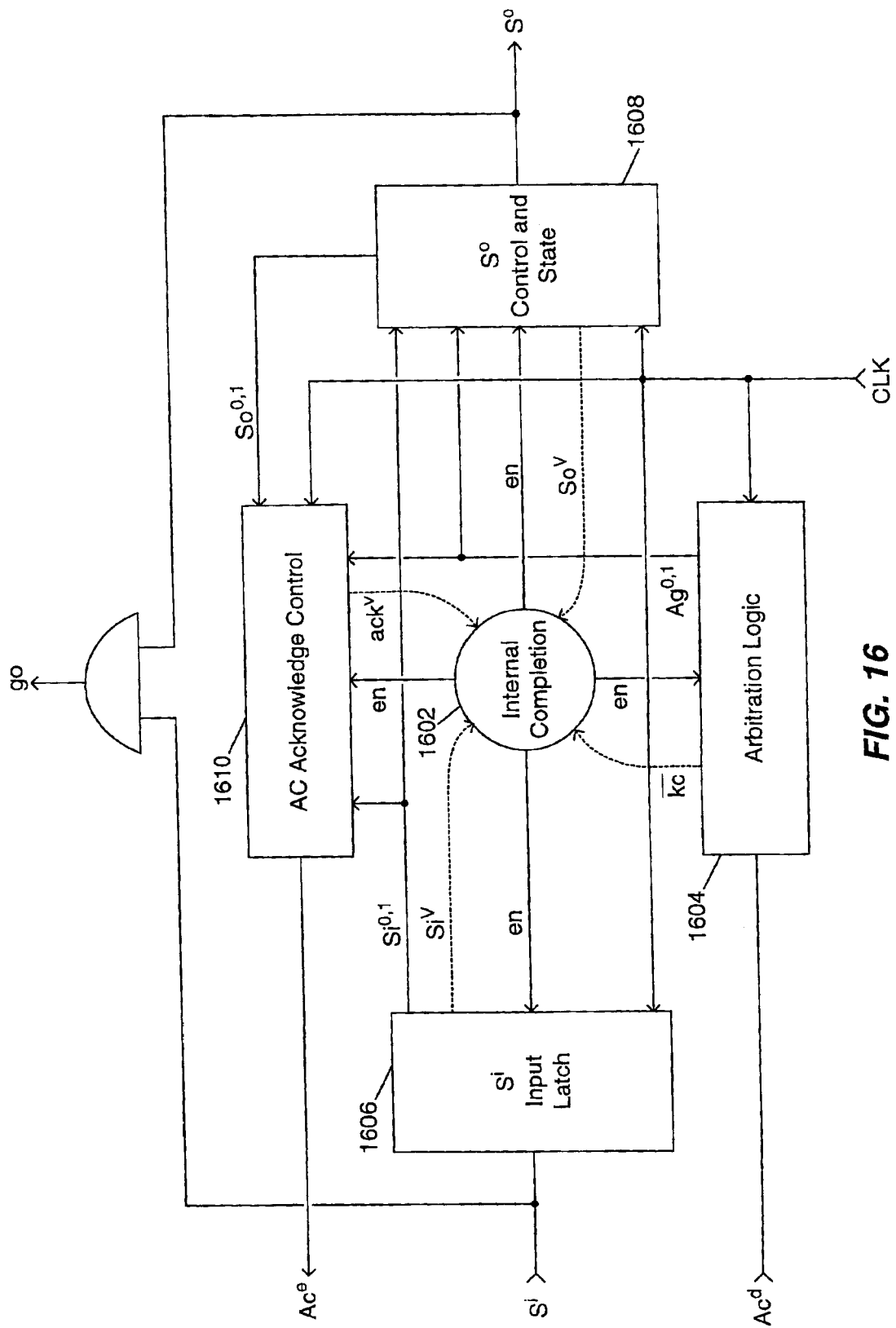

An exemplary CTRL process is shown in FIG. 16. The CSP specification of either of the A2S and S2A control processes is the following:

$S^o$:=so:=so_init_state;
*[[#Ac & CLK->a:=1|~#Ac & CLK->a:=0],
[CLK->si:=$S^i$];
[~a &(si|~so)->xso:=0[ ]else xso:=1],
[a &(si|~so)->Ac?[ ]else->skip];
so:=xso;
[~CLK->$S^o$:=so]]
||
*[go:=$S^i$ & $S^o$]

It should be noted that for the A2S CTRL process, "so_init_state" is 0; for the S2A CTRL process it is 1.

The "$S^o$" output maps to the $R^v$ validity signal in the A2S converter. In the S2A converter, it maps to the $L^e$ enable signal. Likewise, in the A2S converter the "$S^i$" is the input $R^e$ and in the S2A converter it is $L^v$. The assertion of $S^o$ can be considered to indicate the presence of a token in the control process. For the A2S converter, it indicates that the converter has asserted a data token to be consumed by the synchronous circuitry; for the S2A converter, it indicates that the converter is ready to consume a data token.

On each rising clock edge, the control process probes the input asynchronous channel $A_c$ and sets the internal variable "a" high if the channel is ready to be read. The process also latches its synchronous input ($S^i$). If $A_c$ has valid data (a), or if the synchronous side is not ready ($S^i$ low), then xso (to become $S^o$) is set high. If $A_c$ does not have valid data (~a) and the synchronous side is ready, then xso is set low. In all other cases, xso ($S^o$) is left in its prior state.

If $A_c$ has valid data and either $S^i$ is high or $S^o$ is low, the $A_c$ token is consumed. This can happen when either $S^o$ was asserted (indicating ownership of a token in the CTRL process) and $S^i$ was high (indicating the consumption of that token on the clock cycle in question), or when $S^o$ was not asserted (indicating that the CTRL process can accept an $A_c$ token regardless of the synchronous side's state.) In this case of the logic, the process lowers the $A_c^e$ signal, it waits for $A_c^d$ to be de-asserted, and then it re-asserts $A_c^e$. In the circuit implementation given below, it is critical that the $A_c^d$ go low in response to $A_c^e$ within the clock cycle; if it remains high on the next rising edge of CLK, then the control process will duplicate the token. (The Pipelined Completion design outlined in the previous section satisfies this requirement.)

On the falling edge of the clock, the "so" internal state variable is written to the synchronous handshake output ($S^o$). Once high, $S^o$ will stay high until $S^i$ goes high.

In parallel to this process, the "go" signal is combinationally generated as the conjunction of $S^i$ and $S^o$. On any rising clock edge with $S^o$ and $S^i$ both high, the datapath sees an asserted "go", and a data token passes from one domain to the other.

As shown in the embodiment of FIG. 16, the circuit implementation of the control process includes five components: internal completion logic 1602 responsible for sequencing the enable signal, arbitration logic 1604, $S^i$ input latching circuitry 1606, $S^o$ output control and state logic 1608, and the $A_c$ acknowledge logic 1610.

Figure 17:
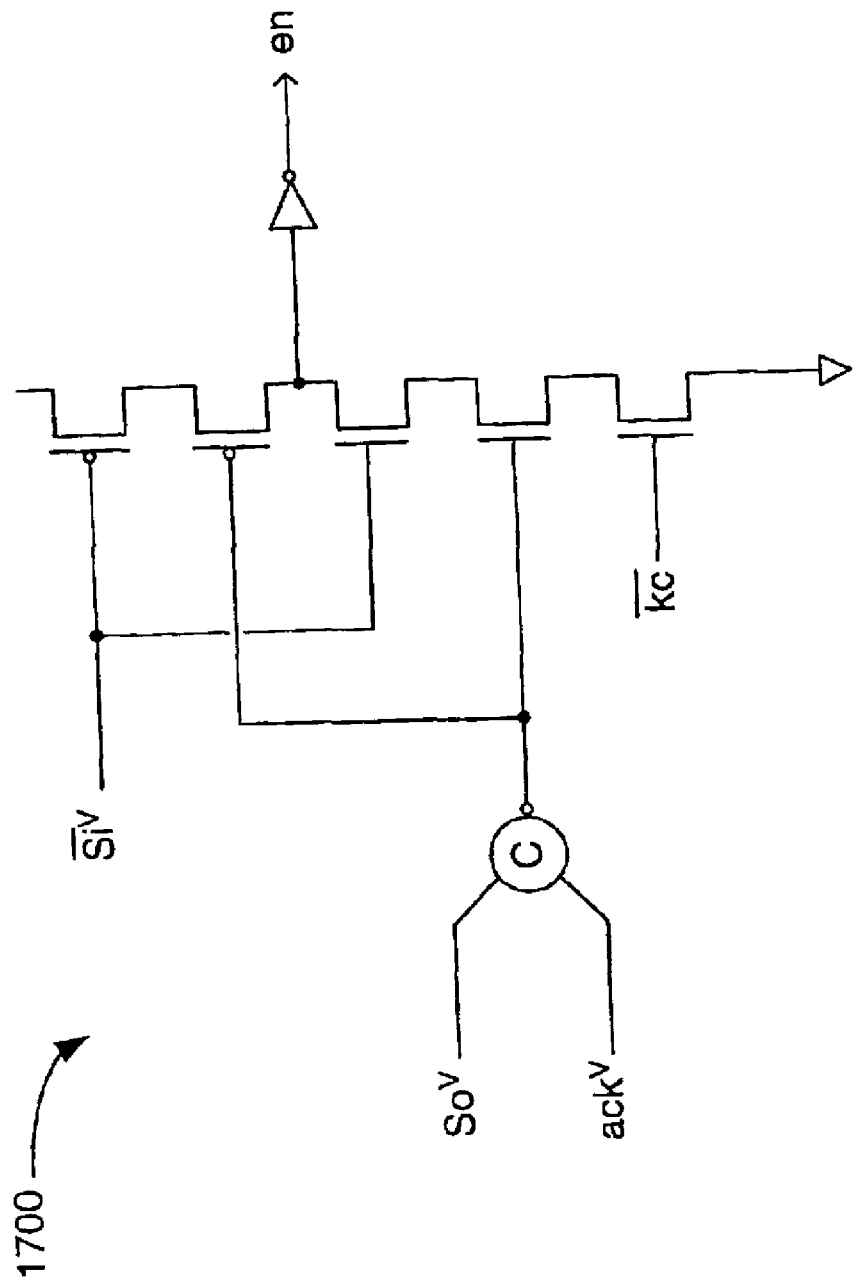

Central to the design of the control process is the internal enable signal ("en"), which triggers the set (en high) and reset (en low) phases of the internal dynamic logic. "en" is not strictly synchronized to CLK. It will cycle once per clock cycle, but "en" is sequenced by the validities if the internal signals, not CLK. A specific circuit implementation of the internal completion logic 1700 is shown in FIG. 17.

Figure 18:
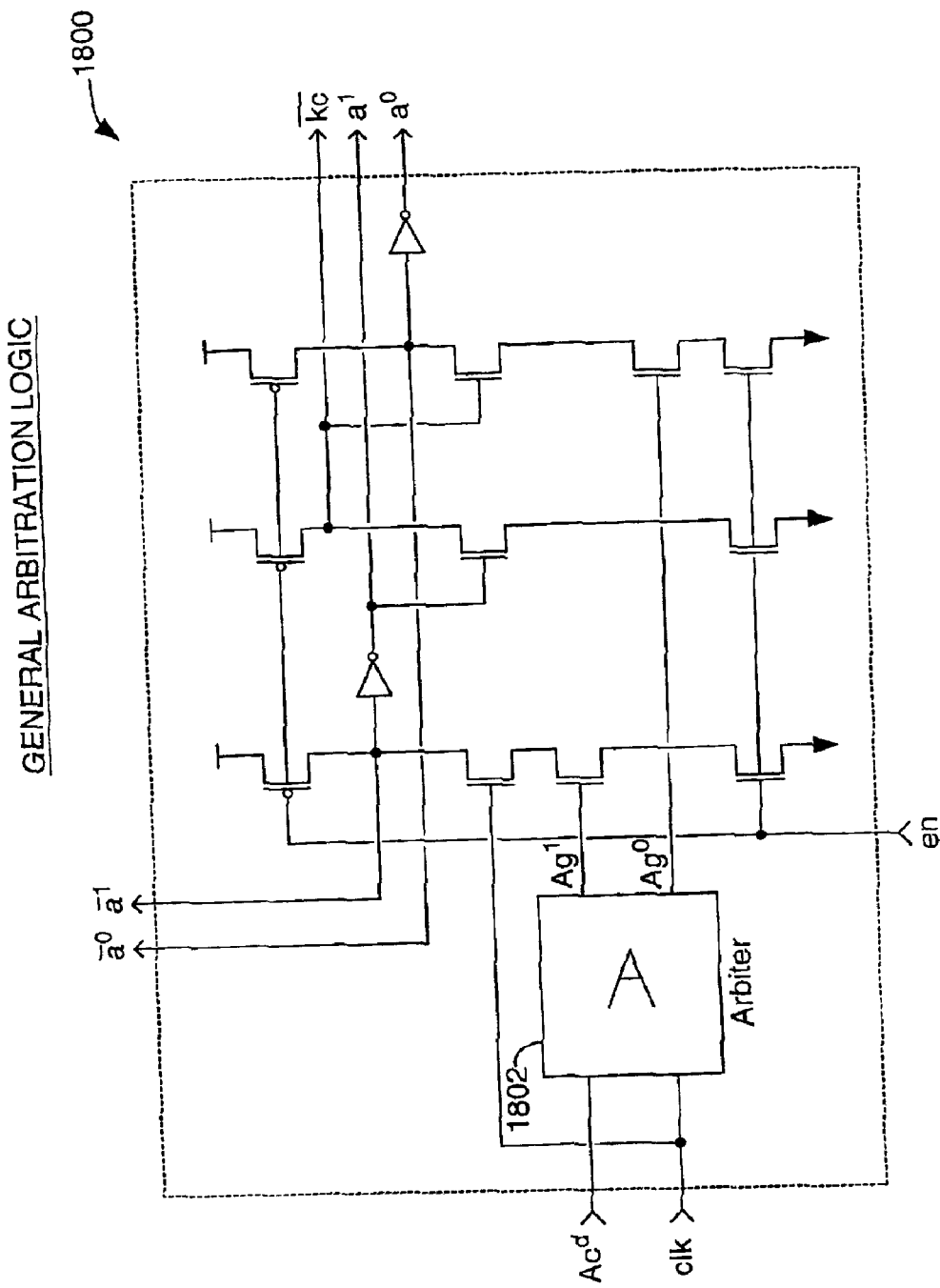

A specific implementation of an arbitration logic circuit 1800 for the control process is given in FIG. 18. Arbiter 1802 shown in this circuit can be any standard mutual exclusion element such as, for example, a Seitz arbiter or a QFR. The "a" variable is implemented as a dual-rail signal pair to allow the use of domino pull-down logic stages elsewhere in the circuit. Doing so facilitates the synchronized-QDI (quasi-delay insensitive) design style used throughout the converters.

For exemplary implementations of Seitz arbiter and QFR circuits, please refer to C. L. Seitz, *System Timing*, chapter 7, pp. 218–262, Reading, Mass., Addison-Wesley, 1980, and F. U. Rosemberger, C. E. Molnar, T. J. Chaney, and T. P.

Fang, *Q-modules: Internally clocked delay-insensitive modules,* IEEE Trans. Computers, vol. 37, no.9, pp. 1005–1018, September 1988, respectively. The entire disclosures of each of these references are incorporated herein by reference for all purposes.

The $\overline{kc}$ signal in this logic is used to disable the arbitration logic's clock grant signal ($A_g^0$) once the $A_c^d$ input wins the arbitration ($A_g^1$ asserted). This must be done to protect the rest of the circuit from seeing a glitch on $A_g^0$ in the case that $A_c^e$ transitions negative while CLK and en are still high.

Figure 19:
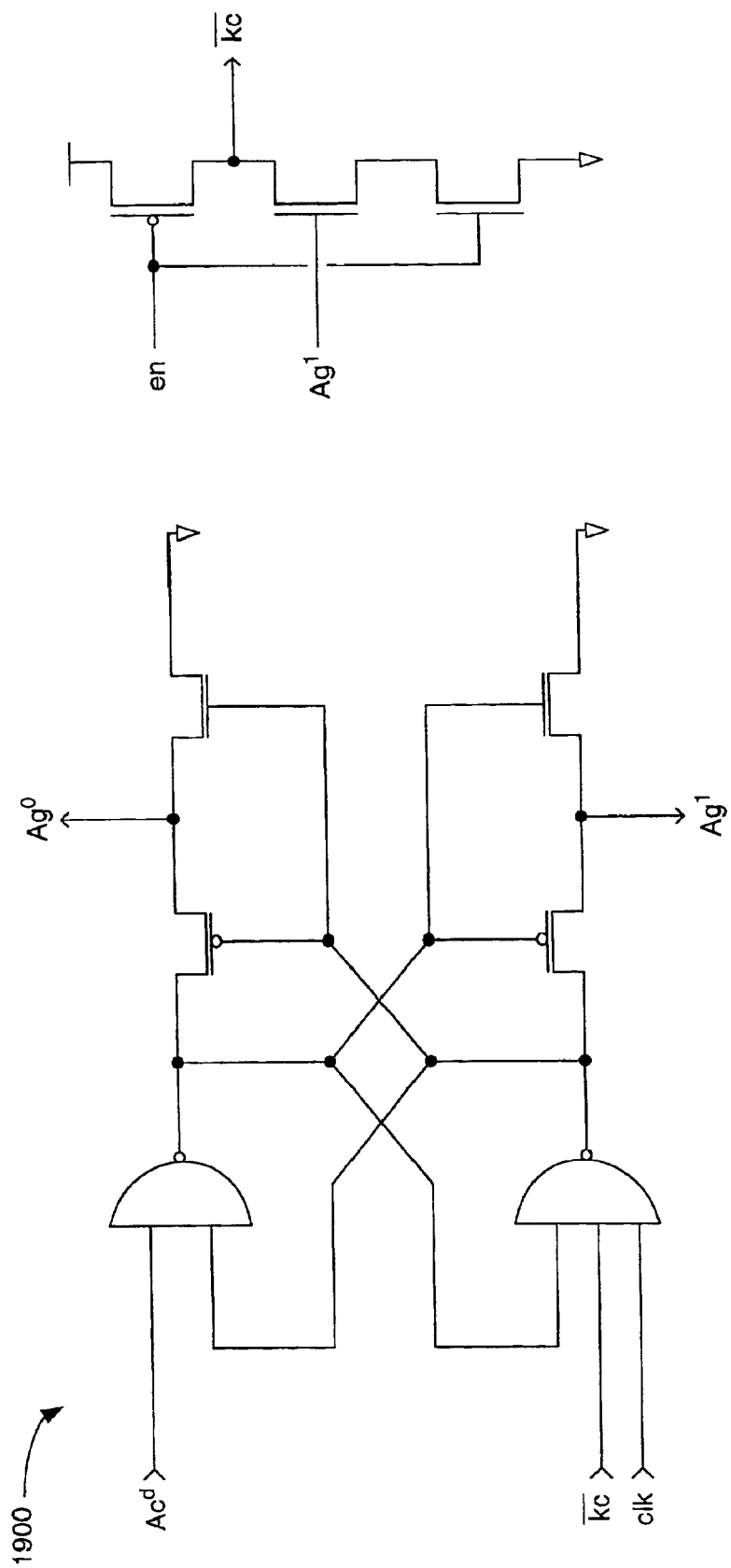

A more specialized arbitration circuit 1900 which incorporates the $\overline{kc}$ function into a variant of the Seitz arbiter is given in FIG. 19. This design removes the need for an extra dynamic logic stage to generate a. However, elsewhere in the CTRL unit logic stages, wherever "$a^1$" might have been used with the more general design, the series combination "$A_g^1$ & CLK" must be included instead (i.e., requiring an extra transistor).

The circuits in FIGS. 18 and 19 limit the metastability hazard to the case that an arbiter output resolves exactly as CLK transitions negative. In the case that $A_g^1$ wins, $A_g^1$ transitioning high as CLK transitions low can cause an unstable voltage on $\overline{a^1}$ (or whatever logic stage depends on $A_g^1$). In the case that $A_g^0$ wins, $A_g^0$ transitioning high as CLK transitions low can cause $A_g^0$ to return low before it has completely pulled down $\overline{a^0}$ (or some other logic stage in the more specialized design.) In either case, the metastable condition propagates beyond the arbiter. Note that if the arbiter were to resolve at some time past CLK transitioning low, then the metastable condition does not propagate: if $A_g^1$ wins at some point following CLK transitioning low, the transfer is simply deferred until the next rising clock edge; if $A_g^0$ does not win by CLK transitioning low, $A_g^1$ wins due to the CLK input's withdrawn request.

Thus the failure mode due to metastability is dependent on the time required for the CLK to transition low. Ensuring a fast slew rate for CLK's negative transition will help protect the circuits from this fundamental hazard.

Figure 20:
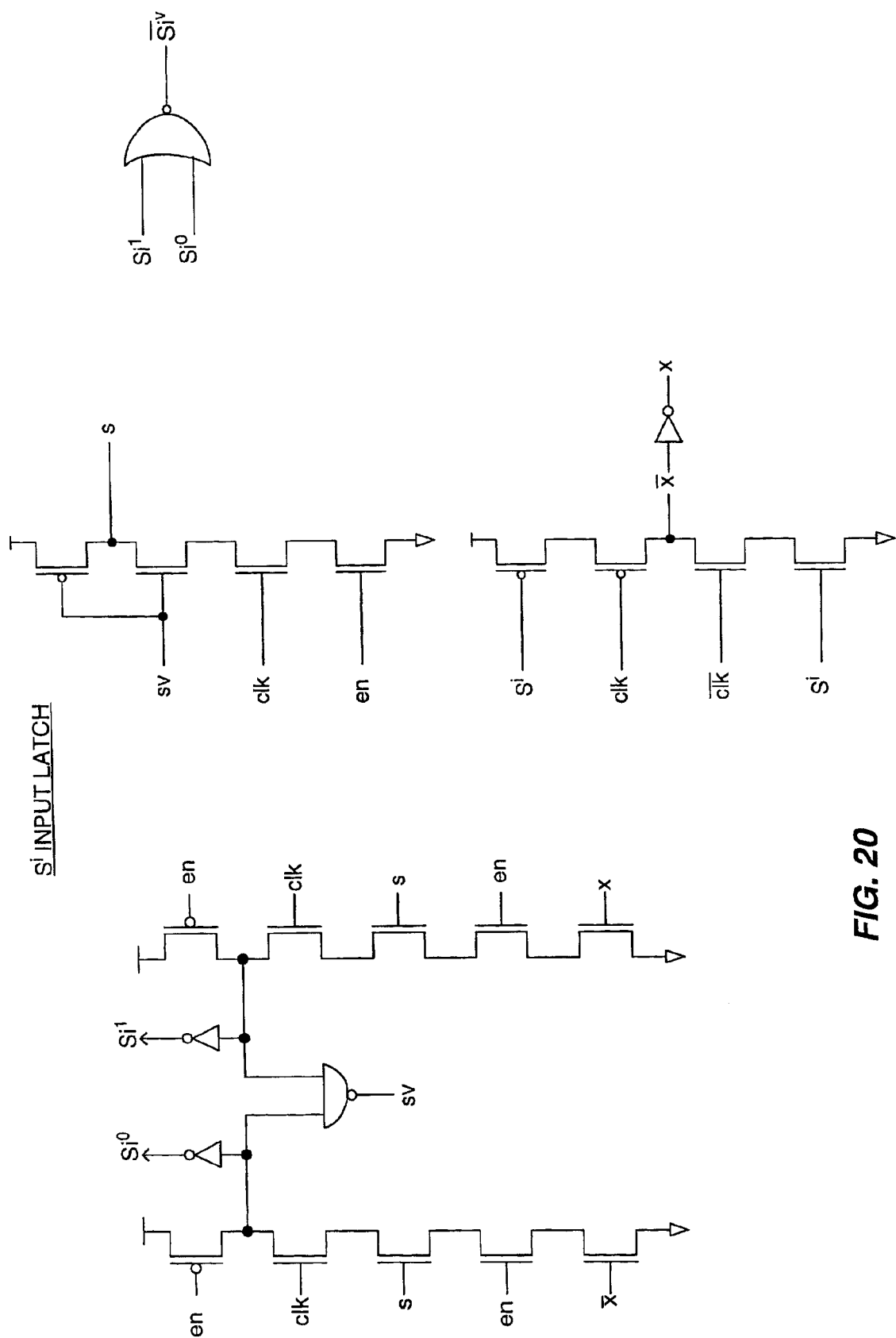

According to a specific embodiment, the $S^i$ input signal is captured using an edge-triggered, self-disabling single-rail to dual-rail circuit 2000 shown in FIG. 20. The en signal is used to set and reset the $s_i^{\{0,1\}}$ input rails and facilitates the use of asynchronous self-sequencing logic throughout the control process. Furthermore, the design relies on this latch's synchronizing relationship to the rising edge of CLK to keep the process from repeatedly cycling in a subtle case of the logic (when the clock period is significantly slower than the $A_c$ cycle time). The protection comes from the circuit's property that, once en transitions low and $s_i$ resets, the $s_i^0$ and $s_i^1$ rails remain low until the next rising edge of CLK.

The $s_i^v$ signal encodes the validity of the $s_i^{\{0,1\}}$ rails. It is used in the internal completion logic to allow safe, delay-insensitive sequencing of en.

Figure 21:
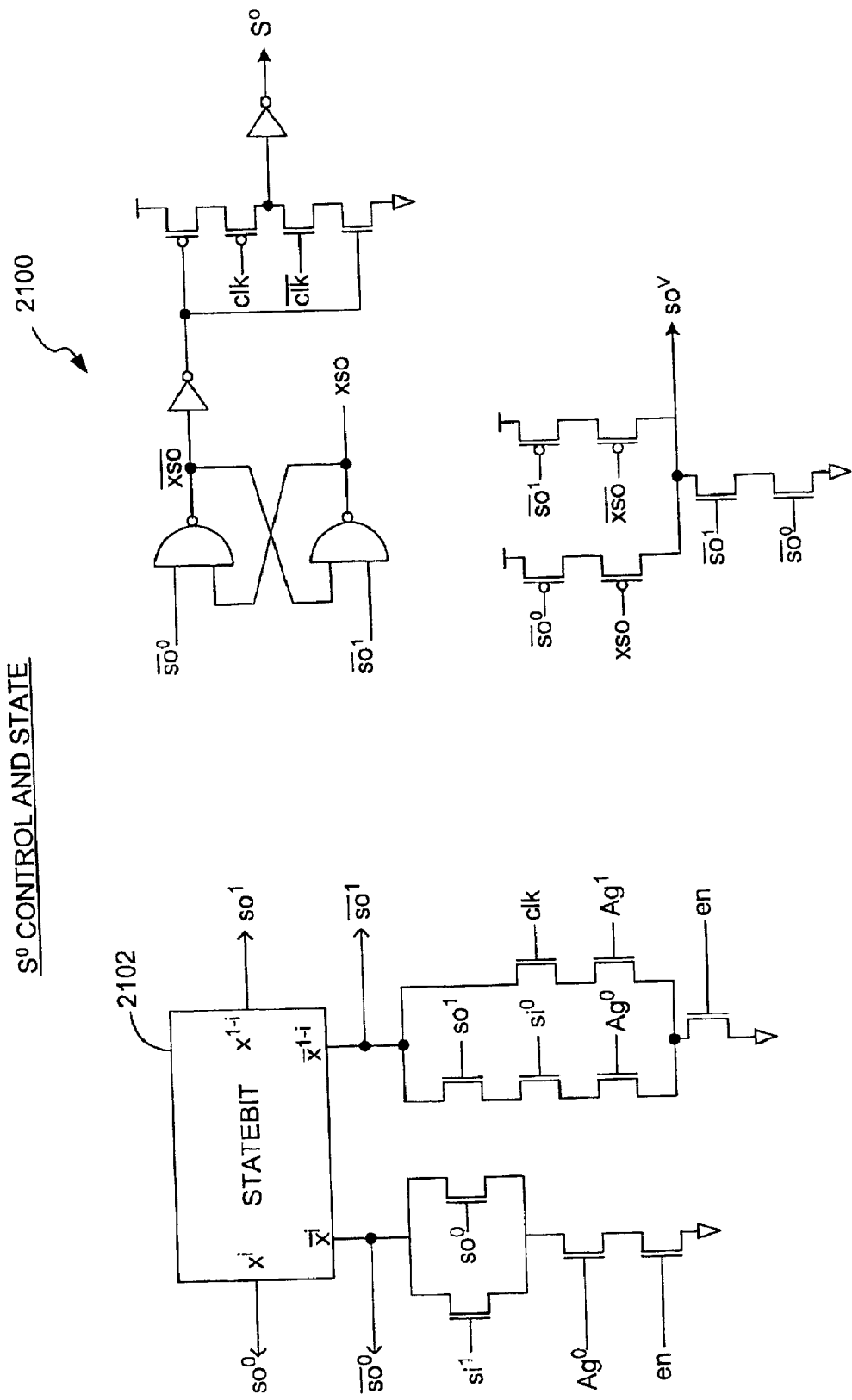
Figure 22:
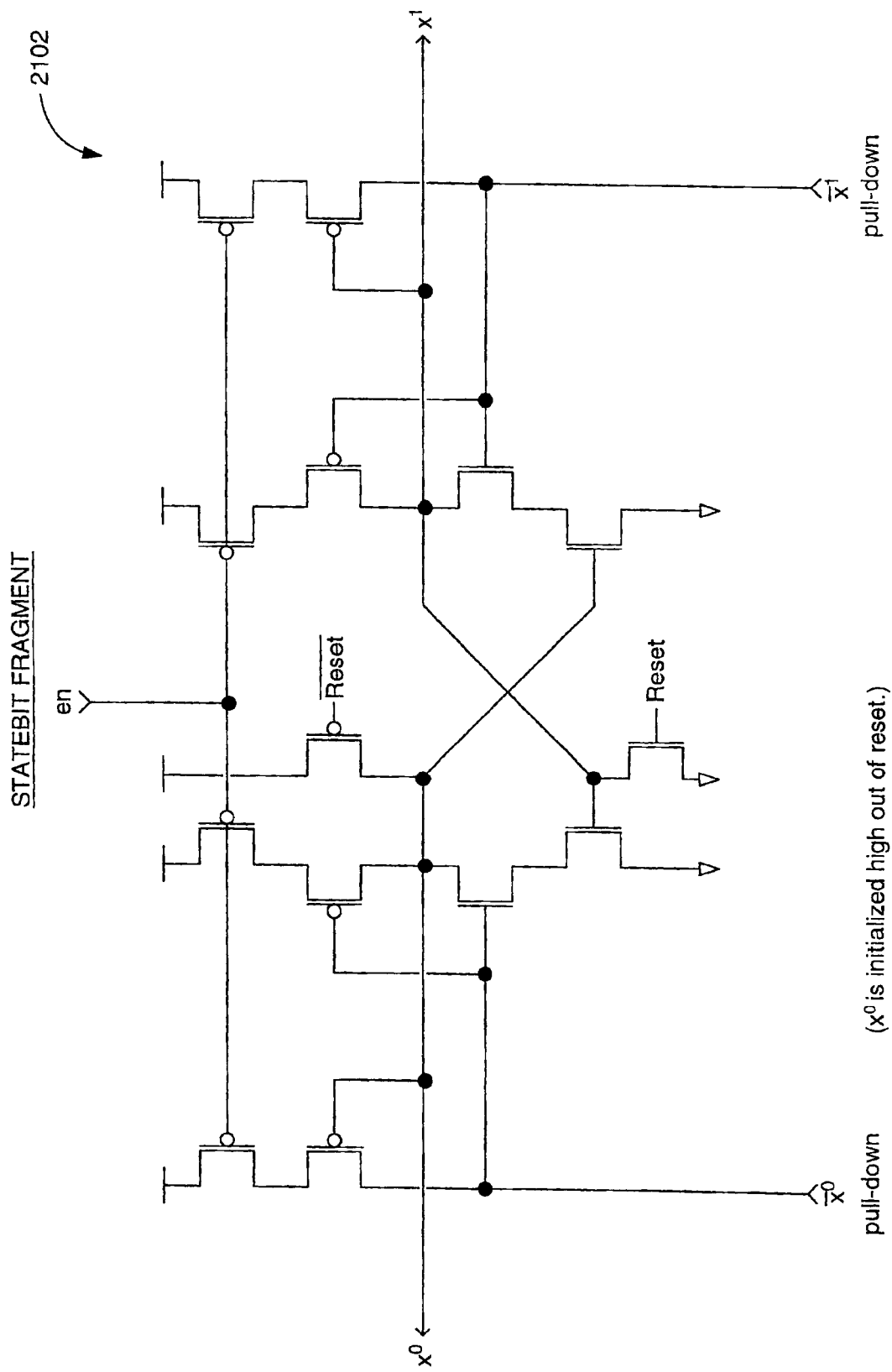

A specific implementation of a $S^o$synchronous output control circuit 2100 is shown in FIG. 21. Since the control process must know the value of $S^o$ from the prior clock cycle, an asynchronous state element (i.e., STATEBIT circuit 2102) is used. A specific implementation of STATEBIT circuit 2102 is shown in FIG. 22. The STATEBIT circuit provides automatic sequencing of the $s_o^0$ and $s_o^1$ signals over the unit's internal cycle. An alternative design might use an additional input latch of FIG. 20 to resample the state from the synchronous $S^o$ signal, but such a design would require additional circuitry to complete the $s_o$ terms in the sequencing of en.

The cross-coupled NANDs and output latch of FIG. 21 provide a safe synchronization of the asynchronous $\overline{s_o}$ terms, which only pulse low during the en rising edge phase of the control process. The cross-coupled NANDs convert the pulse to a persistent value, and the output latch restricts the $S^o$ output from transitioning while CLK is high. Since only one of $\overline{s_o^0}$ or $\overline{s_o^1}$ can transition low at a time, and can only transition low while CLK is high, $S^o$ is set in an entirely synchronous manner.

Like the $s_i^v$ signal of the $S^i$ input latch, the $s_o^v$ signal encodes the validity of the $s_i$ state logic. Here, by including the xso and $\overline{xso}$ terms in the signal's pull-up logic, the assertion of $s_o^v$ additionally implies that the cross-coupled NANDs have successfully captured the appropriate $\overline{s_o^{\{0,1\}}}$ value.

Figure 23:
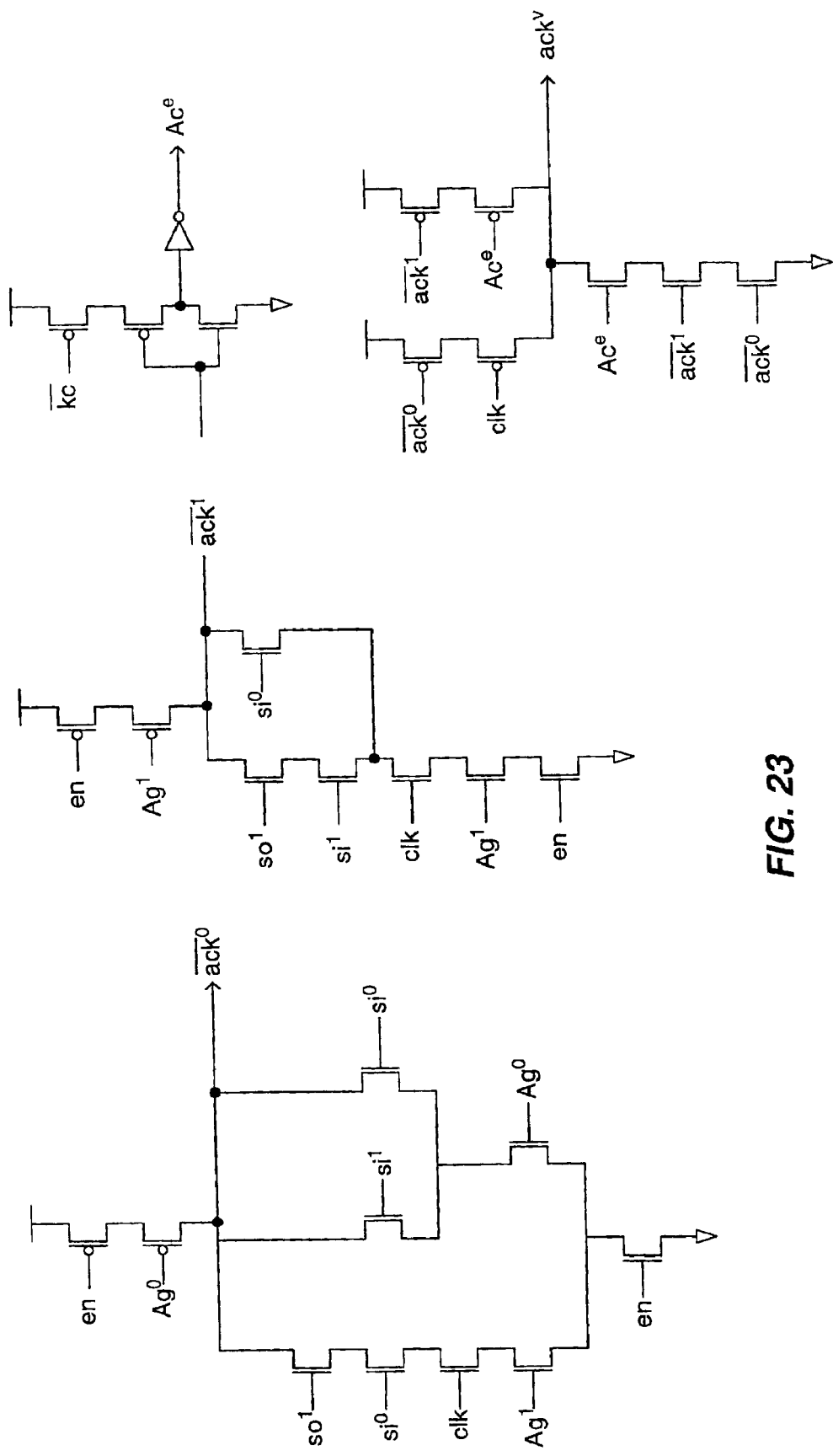

A specific implementation of an $A_c$ Acknowledge logic circuit 2300 is shown in FIG. 23. This circuit is a relatively straightforward dynamic logic stage, encoding the "a &(si|~so)->Ac?" expression of the cell's CSP. When "a" is set (meaning "$A_g^1$ & CLK") and $s_i^1$ or $s_o^0$ is asserted, the $\overline{ack^1}$ rail is pulled low, causing $A_c^e$ to go low, acknowledging the $A_c$ input token.

The $\overline{kc}$ term is included in the $A_c^e$ sequencing to ensure that it has disabled the arbiter's clock selection by this time (to avoid the potential glitch on $A_g^0$ when $A_c^d$ goes low in response to the falling edge of $A_c^e$).

The $s_o^1$ term is redundantly included in the $\overline{ack^1}$ pull-down to prevent the repeated cycling scenario described above in the $S^i$ input latch section.

The ack$^v$, like the $s_i^v$ and $s_o^v$ signals, encodes the completion state of this block of logic. When $\overline{ack^0}$ is selected, the ack$^v$ is delayed until the falling edge of CLK by including CLK in the pull-up; when $\overline{ack^1}$ is selected, ack$^v$ additionally completes the $A_c^e$ negative transition. ack$^v$ does not return low until $A_c^d$ has been withdrawn (completed by the $A_g^1$ term in the $\overline{ack^1}$ pull-up) and $A_c^e$ has returned to its asserted state.

According to a specific embodiment, the A2S and S2A datapath transfer units (e.g., DTUs 908 and 910 of FIG. 9) are single-channel converter elements which transfer tokens based on the value of their synchronous "go" input at various phases of the clock period. In order to avoid metastability hazards within these circuits, timing assumptions must be made on the asynchronous handshake transitions. For example, when the A2S DTU sees an asserted "go", it must also receive a token on its L input during that clock cycle. Likewise, when the S2A DTU receives an asserted "go", its $R^e$ must be high and ready to transition low once an R data rail is asserted. As discussed above, the high-level architecture of the A2S and S2A converters ensures that these assumptions are satisfied.

According to a specific embodiment, the A2S datapath transfer units have the following CSP specification:

*[[CLK]; [go->L?[ ]else->skip];
*[~CLK->[go->R:=#L?[ ]else->skip]
]]

This process transfers the asynchronous L input to the synchronous R output on every cycle that "go" is asserted. The unit makes the assumption that go transitions high sometime following the falling edge of CLK but sufficiently before next rising edge of CLK to satisfy the setup time constraints of the recipient synchronous logic. When CLK transitions high on a cycle when go is asserted, L is acknowledged.

Figure 24:
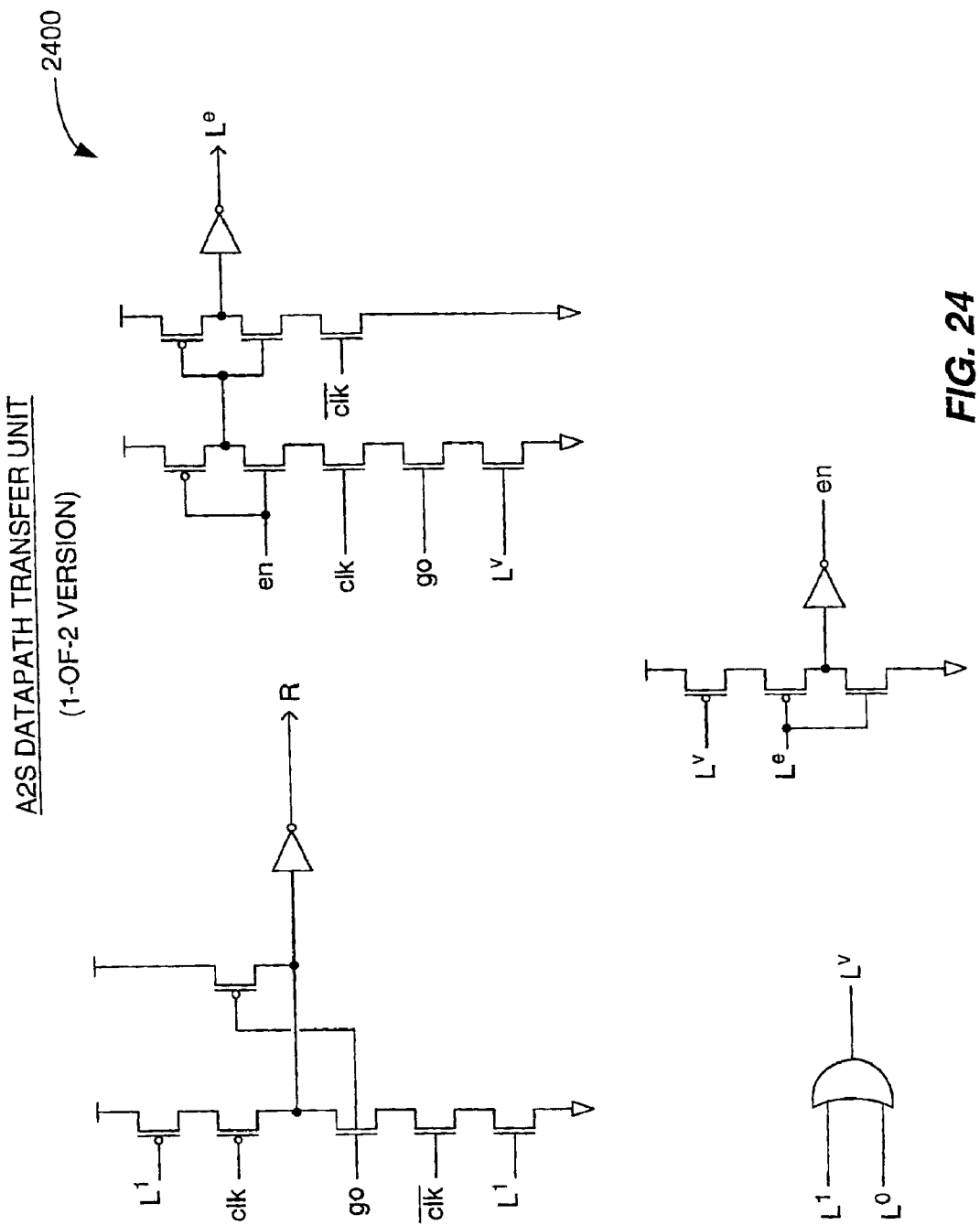

A circuit implementation of an exemplary A2S data transfer unit 2400 for a single 1of2 input is shown in FIG. 24. The data bit latch of R is transparent when CLK is low and go is high. When go is low, R is kept low to protect the output from transitioning unpredictably when L arrives.

In order to keep the circuit from repeatedly acknowledging L tokens within a single clock period, the $L^e$ negative transition is conditioned on the rising edge of CLK, and the $L^e$ positive transition is conditioned on the falling edge of CLK.

In order to avoid metastability hazards in this unit, the assumption is made that $L^v$ will transition low soon after the falling edge of $L^e$. That is, L must not ever stall in a valid state. This can be satisfied if the A2S input buffer units follow a PCHB or PCFB template as described in "Synthesis of Asynchronous VLSI Circuits," by A. J. Martin incorporated herein by reference above.

According to a specific embodiment, the CSP specification of the S2A datapath transfer unit is

*[[CLK]; [go->R!L[ ]else->skip]; [~CLK]]

Figure 25:
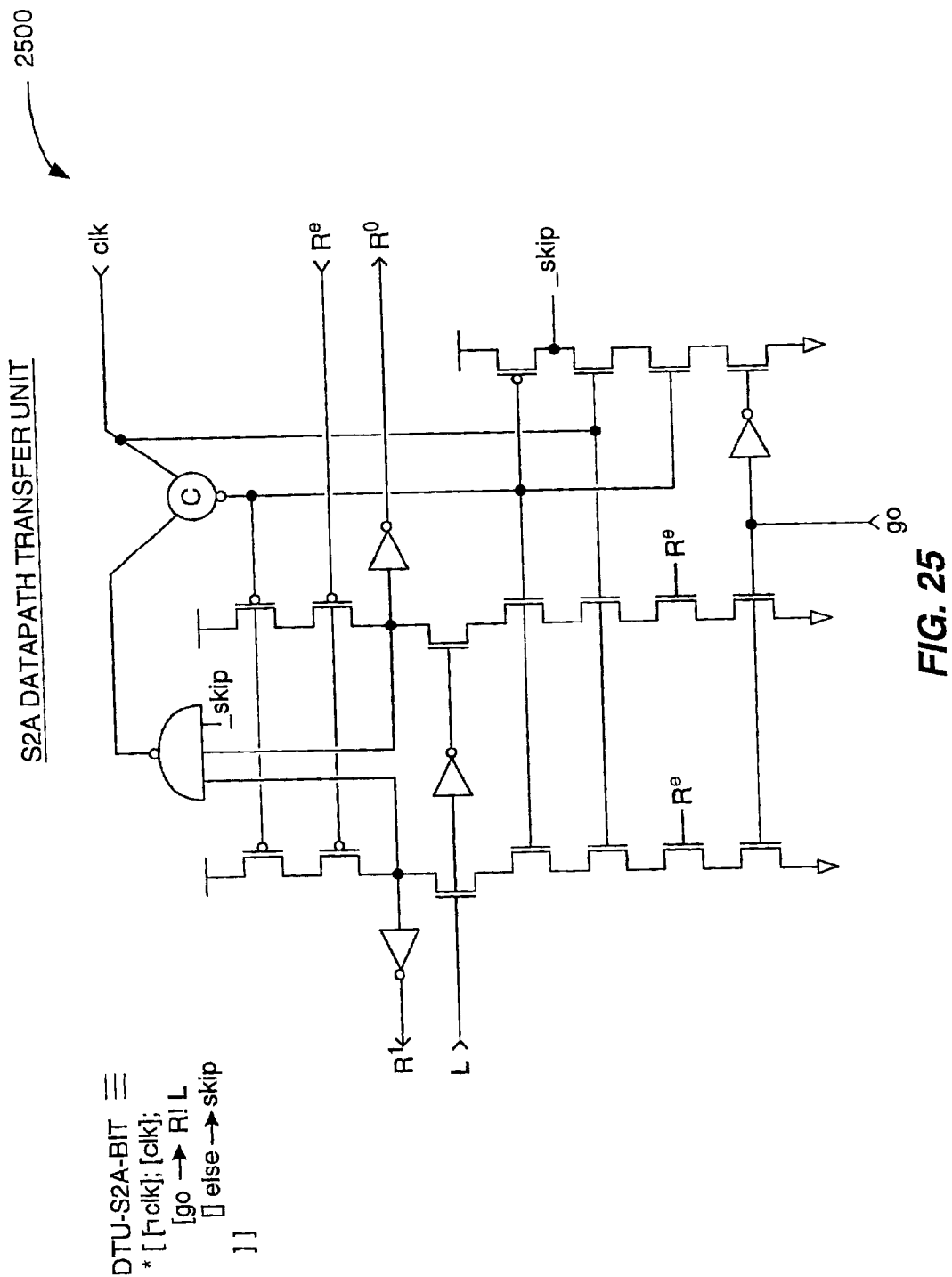

Aside from the handshake with the R output channel, this unit is entirely synchronous in nature; specifically, on each clock cycle, on the rising edge of CLK, it samples its inputs and evaluates some output condition. In this case, it checks if the "go" control signal from the S2A control process is set, and, if so, writes its L bit (or bits) to the R output channel in a 1ofN rail encoding following the four-phase handshake protocol. FIG. 25 shows an exemplary one-bit circuit implementation of the S2A DTU 2500. This design can easily be extended to support a two-bit input, with a 1of4 rail output data encoding.

According to a specific embodiment, the A2S converter requires at least a single stage of buffering on the datapath, following the point that L is copied to the pipelined completion (PC) circuitry. The need for this is primarily due to performance considerations; i.e., in order to allow the PC to operate in a pipelined manner, it must not be bottlenecked by tokens backing up in the datapath branch. Essentially, the datapath is "slack matched" to the control (and completion) path.

Another reason for buffering the asynchronous data at the input of the DTU array is to ensure that the input to the DTU elements have the correct handshake properties. Namely, the A2S DTU described above relies on its input reseting (returning to its neutral state) promptly after the falling edge of $L^e$. This can be guaranteed by having a PCHB or PCFB buffer stage directly preceeding the DTU array.

According to a specific embodiment, the S2A converter imposes a much stricter requirement for additional buffering. It needs several buffer stages between its datapath output and its output PC, as well as on the $A_c$ completion channel output of the PC. The $A_c$ channel buffers initializes "filled", i.e. with a number of tokens corresponding to the amount of slack available in the datapath (minus one token with which the S2A control process initializes out of reset.) At least two tokens must be present in the S2A datapath-to-completion loop in order to support a transfer on every clock cycle. One token is consumed by the S2A control process and DTU elements during a transfer. Since the asynchronous portion of the loop has non-zero latency, a second token must always be present in that branch in order to pipeline the transfers.

According to specific embodiments, both the datapath and completion branches have sufficient buffering to absorb the two tokens in the loop. If the datapath buffer capacity is insufficient, the S2A DTU output handshake will stall if the S2A's R output stalls, potentially causing metastability hazards in the datapath or lost tokens. If the completion path buffer capacity is insufficient, data tokens will be trapped in the output buffer when the synchronous side stalls. In this case, the S2A converter will not output a received R token until the next token is received by the converter, which may take an arbitrarily long amount of time.

A final performance-related factor influences the loop token (and therefore buffering) requirements of the S2A converter. When the forward latency through the PC becomes too great, additional tokens must be present in the loop to keep the pipeline at peak capacity.

Figure 26:
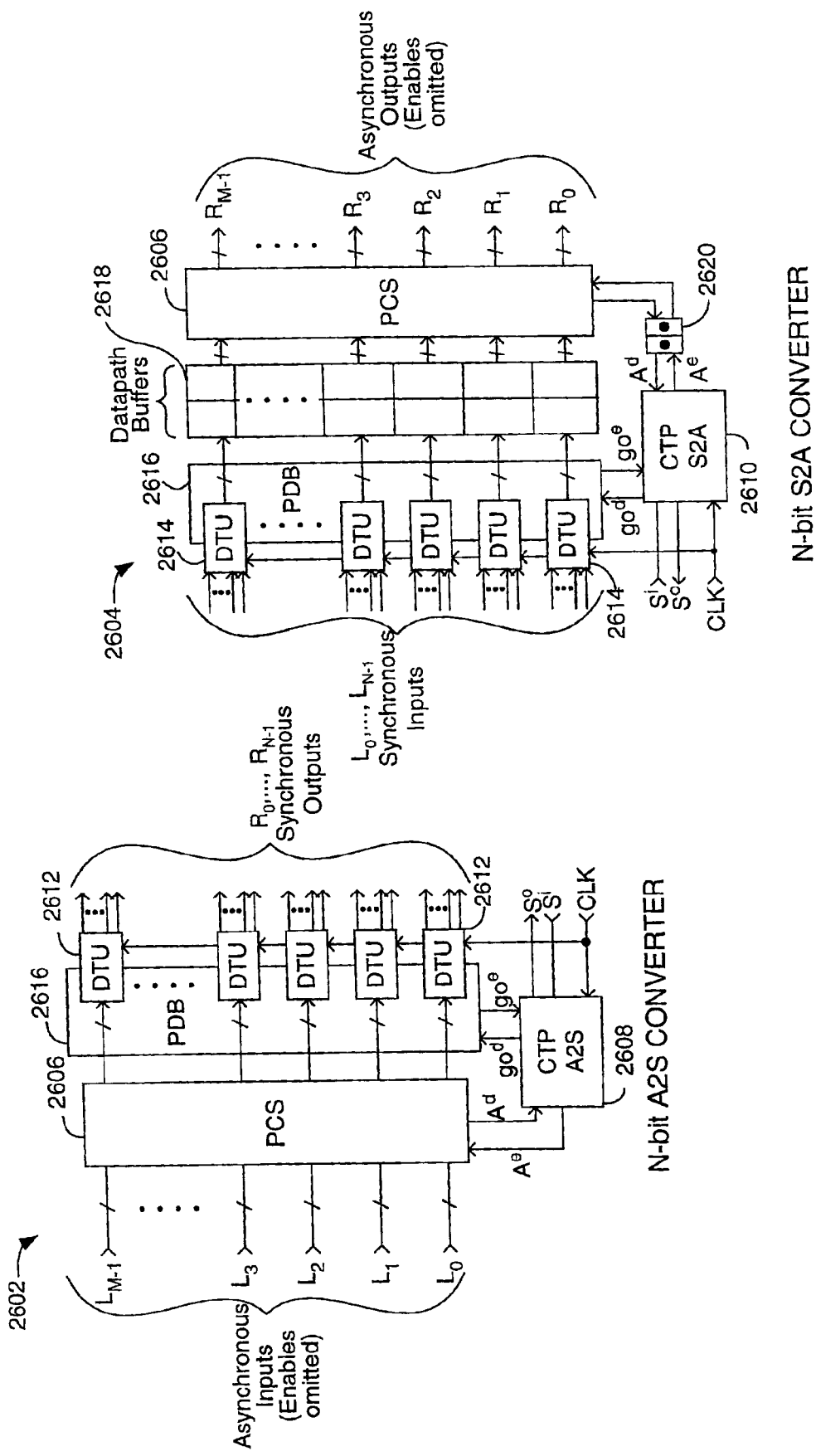

The internal high-level organization of A2S and S2A converters 2602 and 2604 according to an alternate embodiment is shown in FIG. 26. Each interface includes four high-level components:

1. Pipelined Completion Stage (PCS) 2606. This component is identical to the PC unit described earlier, although 2606 is drawn such that it includes the datapath copy circuitry described in PCS0 circuit 1300.

2. Control Processes (CTPs) 2608 and 2610. The CTP is responsible for (1) issuing a "transfer" signal to the datapath when both asynchronous and synchronous sides are ready for the transfer, (2) sequencing the asynchronous and synchronous handshaking signals ($A^d$, $A^e$) and ($S^i$, $S^o$), and (3) synchronizing as necessary to CLK. CTP_A2S 2608 and CTP_S2A 2610 share many circuit elements and have the same port interface, but are not identical. Details of each design, highlighting common functionality, are given below.

3. Datapath Transfer Units (DTU) 2612 and 2614. Generally, the DTU unit is responsible for transferring a data token across the synchronous/asynchronous boundary once a "transfer" (go) token is received from the CTP. In the DTU_A2S case, the unit latches an asynchronous 1ofN data token to the synchronous side at a time acceptable to the synchronous clocking discipline (specifically some time after the falling edge of CLK and before the next rising edge). In the DTU_S2A case, the unit samples the synchronous input on the rising edge of CLK and converts the value to an asynchronous one-hot token once the asynchronous channel is ready (enable asserted).

Figure 27:
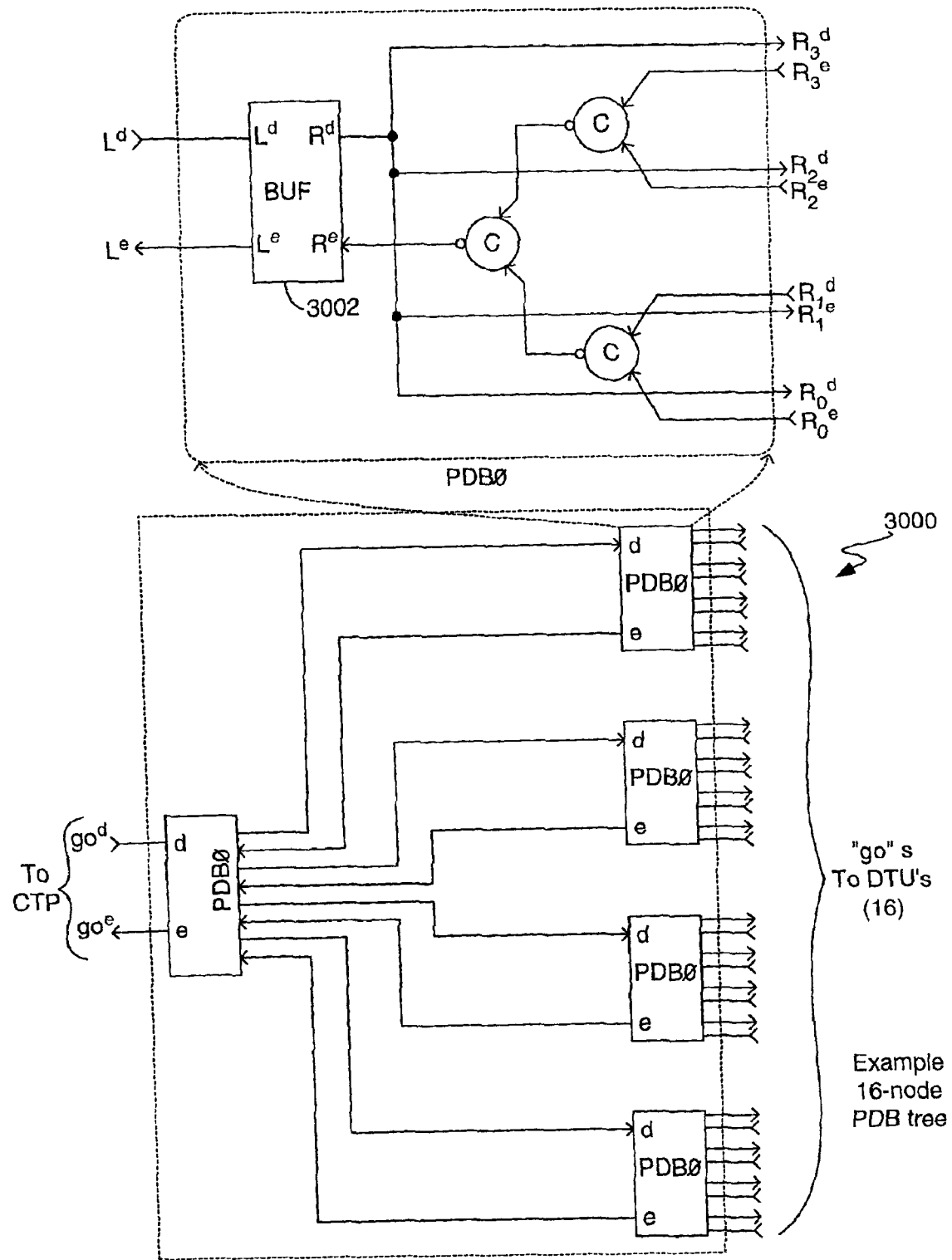

4. Pipelined Datapath Broadcast (PDB). An exemplary implementation of a PDB 3000 is shown in FIG. 27. This unit implements the complementary function of the PCS. That is, it distributes a single "transfer data" ($go^d$) signal to each DTU in the datapath. In this case, the N backward-going enable signals feed into a log(N)-deep C-element tree to generate the final $go^e$ signal. Pipelining the completion adds some forward latency the $go^d$ broadcast, but allows the handshake cycle time to stay low.

According to one embodiment, S2A converter 2604 additionally requires extra asynchronous buffering stages 2618 between its datapath output and its output PCS, and on the "A" channel output of the PCS (i.e., buffer 2620). These provide a guarantee that any transfer initiated by an "A" token can be absorbed in the datapath if the environment is not prepared to read.

Exemplary implementation details of converters 2602 and 2604 according to specific embodiments are given below. Some elements of the designs have been omitted for clarity. These include staticizers on the output nodes of all dynamic logic, and extra reset circuitry which any practical implementation would require. Both of these additions are straightforward to implement. Other circuit details (particularly of the control processes) are not covered since there are many different solutions, and all are fairly straightforward applications of the design style described herein.

An exemplary CSP specification of A2S control process 2608 is the following:

*[[#A & CLK->a:=1|~#A & CLK->a:=0],
[CLK->si:=S.i];
[a|~a &~si & x->x':=1[ ]else->x':=0],
[a &(si|~x)->go!, A?[ ]else->skip];
x:=x',
[~CLK->S.o:=x']]

On each rising clock edge, the process probes the input asynchronous channel A and sets the internal variable "a" high if the channel is ready to be read. The process also latches its synchronous input ($S^i$, which indicates if the synchronous side is ready to receive data on that clock cycle). If A has valid data, or if the synchronous side is not ready to receive data and the synchronous datapath output holds an unread value ("x" high), then "x'" is set high. The "x" variable sets the state of the synchronous datapath output channel ("x") on the next clock cycle. If the asynchronous channel A contains valid data (indicating the presence of an input data token to the datapath), and if either the synchronous side is ready to receive data or if the synchronous datapath output channel is empty ("x" low), then A is read and a "transfer" token ($go^d$) is sent to the datapath.

On the falling edge of the clock, the "x'" variable is written to the synchronous handshake output ($S^o$). This signal encodes the state of the datapath output to the synchronous logic: if it is high, a new data value is sitting on the wires. Once high, $S^o$ will stay high until $S^i$ goes high. On any rising clock edge with $S^o$ and $S^i$ both high, a data token passes from A2S to the synchronous-side logic.

According to a specific embodiment, S2A control process 2610 is somewhat simpler since it does not need to store the state of the synchronous datapath channel:

*[[#A & CLK->a:=1|~#A & CLK->a:=0],
[CLK->si:=S.i];
[a & si->A?[ ]else->skip],
[x & si->go![ ]else->skip];
x:=a,
[~CLK->S.o:=a]]

In this case, $S^i$ is a synchronous request to transfer a data token; $S^o$ grants the transfer, indicating to the synchronous side that the output (R) asynchronous channel is empty.

Figure 28:
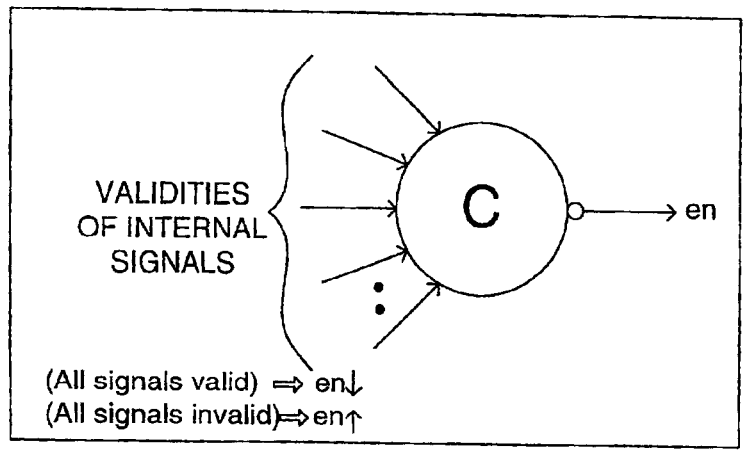

Implicit in the design of these control processes is the internal enable signal ("en"), which triggers the set (en high) and reset (en low) phases of the internal dynamic logic. "en" is not strictly synchronized to CLK. It will cycle once per clock cycle (except in the case that a cycle is missed due to a maximum arbiter resolve time), but "en" is sequenced by the validities if the internal signals, not CLK (as illustrated in FIG. 28).

Figure 29:
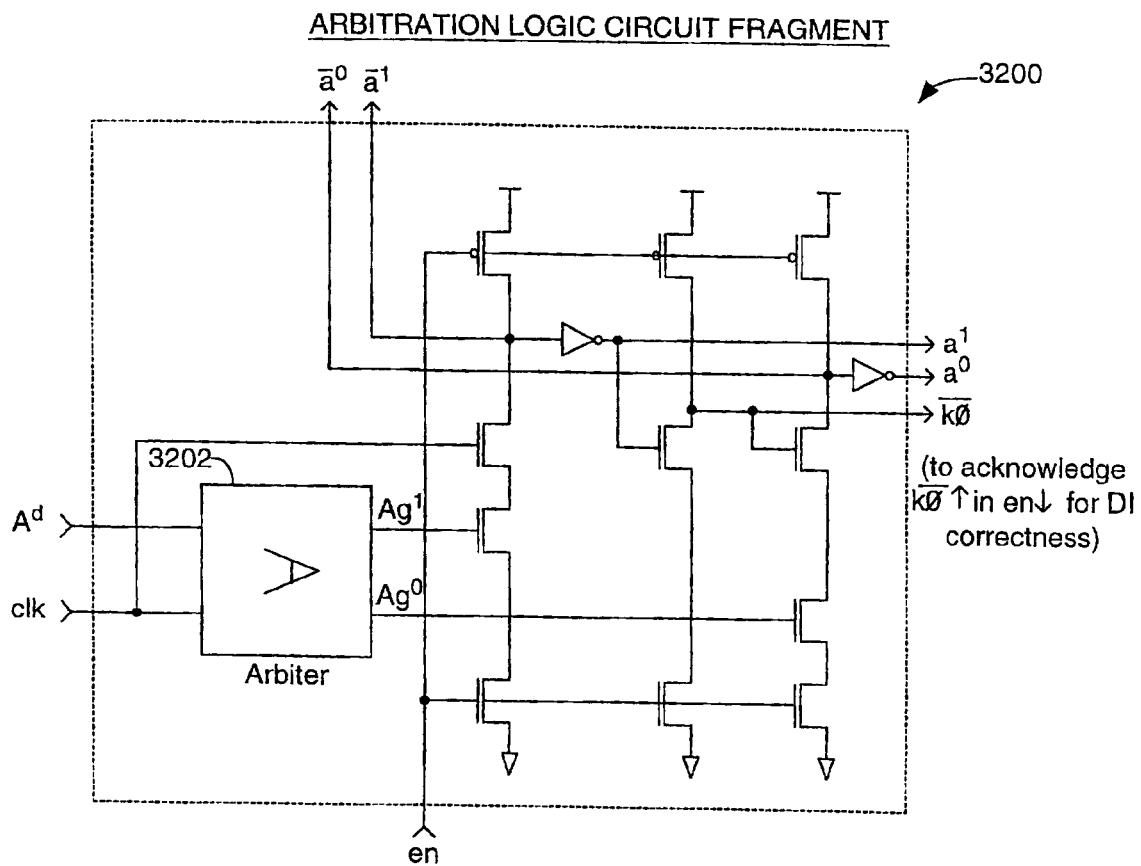

Several structural similarities between the two control processes described above are evident from their CSP descriptions. From the first line of each loop, an arbitrated select, it's clear that the same arbitration logic is used in both. A particular implementation of such arbitration logic 3200 is shown in FIG. 29. According to various embodiments, arbiter 3202 shown in this circuit can be any standard mutual exclusion element such as, for example, a Seitz arbiter or a QFR. The "a" variable is implemented as a dual-rail signal pair to allow the use of domino pull-down logic stages elsewhere in the circuit. Doing so facilitates the synchronized, quasi-delay-insensitive design style used throughout the converters.

The circuit in FIG. 29 limits the metastability hazard to the case that an arbiter output resolves exactly as CLK goes low. In the case that $A_g^1$ wins, the rising edge of $A_g^1$ as CLK goes low can cause an intermediate on $a^1$. In the case that $A_g^0$ wins, the rising edge of $A_g^0$ as CLK goes low can cause $A_g^0$ to return low before it has completely pulled down $a^0$. In either case, the metastable condition propagates beyond the arbiter. Note that if the arbiter were to resolve at some time past CLK going low, then the metastable condition does not propagate: if $A_g^1$ wins at some point following the falling edge of CLK, the transfer is simply deferred until the next rising clock edge; if $A_g^0$ does not win by the falling edge of CLK, $A_g^1$ wins.

According to a specific embodiment, both control processes also share an internal state variable, "x". The A2S circuit sets this state based on an intermediate variable "x'", a logical expression of its inputs; the S2A circuit sets it directly from the arbiter component output z "a" (in this case, x':=$\bar{a}$).

Figure 30:
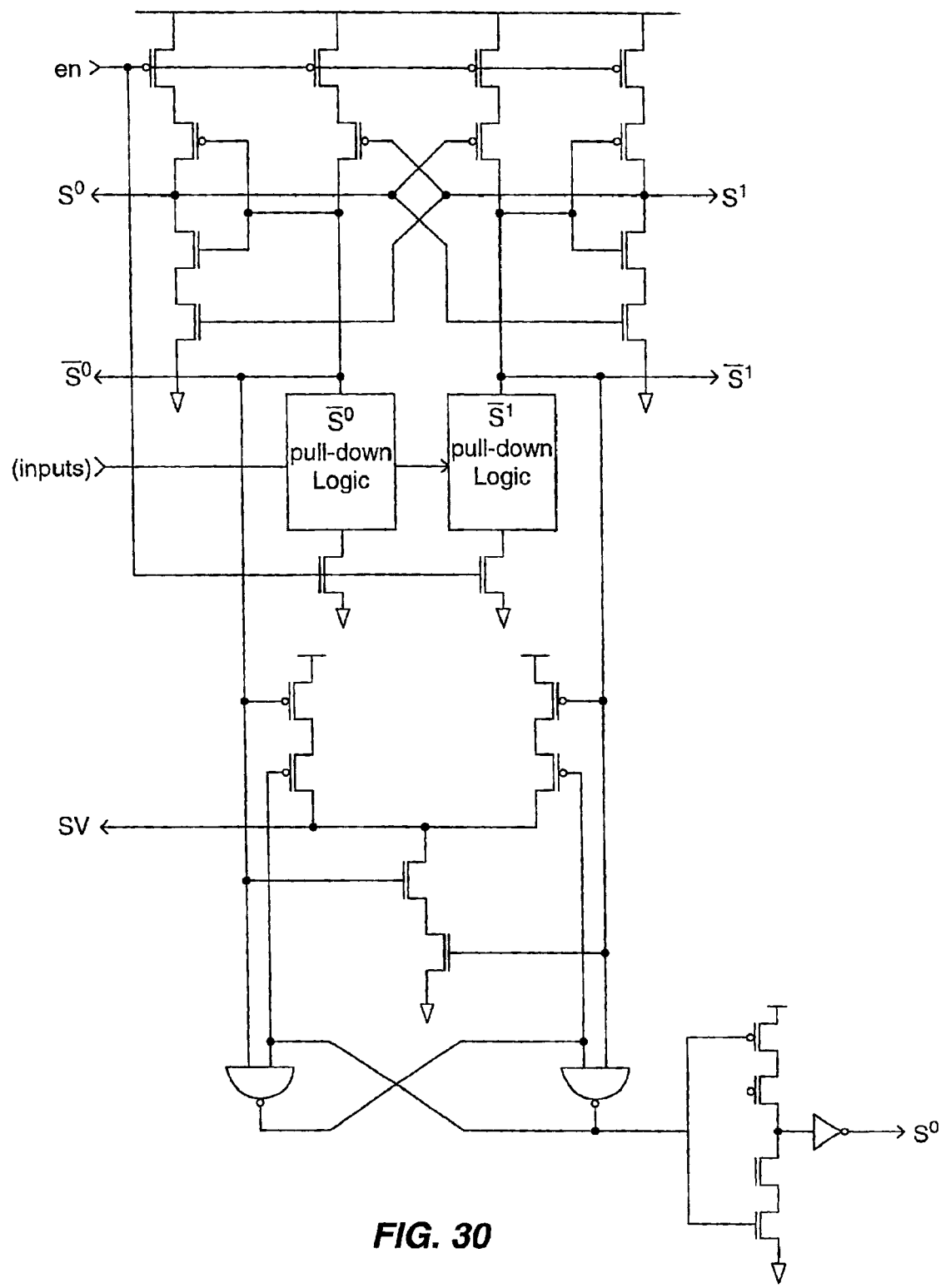

According to a specific embodiment, both control processes use the same state variable to set their synchronous output signal, $S^o$. FIG. 30 illustrates an exemplary combined statebit-to-synchronous-latch circuit. The "xv" signal shown in the diagram encodes the validity of the "x" variable (plus the following RS latch), needed for subsequent completion (i.e., "en" control). This combination of a dynamic pull-down stage ($\bar{x}$) followed by an RS flip-flop, followed by a clocked latch, plus the associated $\overline{xv}$ validity circuit, provides a convenient asynchronous-to-synchronous circuit fragment when the timing of $\bar{x}$ is sufficiently restricted to ensure stability of the output clocked latch. Specifically, $\bar{x}$ cannot go valid too close to the falling edge of CLK. This condition is satisfied in the CTP.

Figure 31:
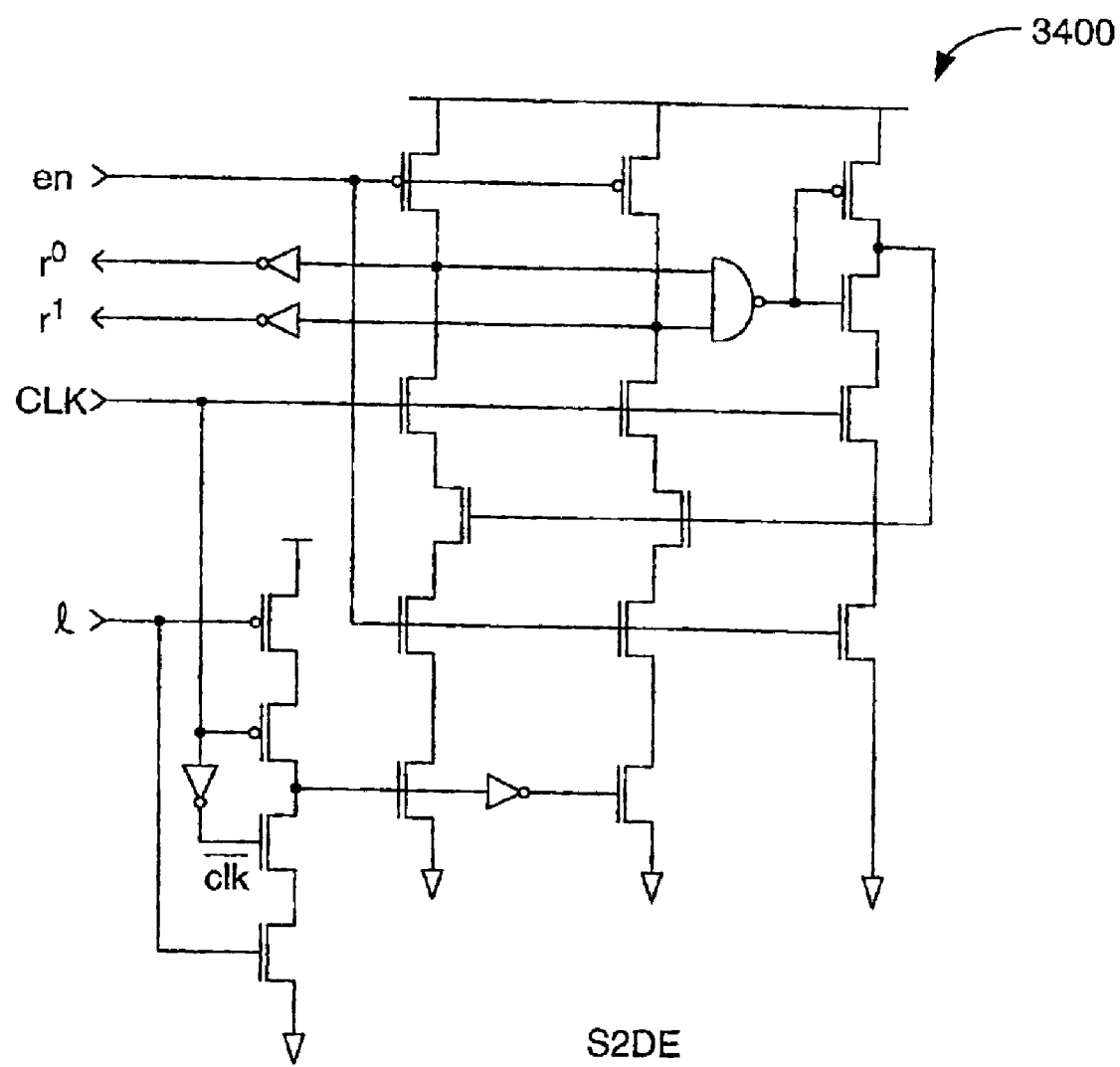

A final shared component of the designs according to a particular embodiments is the handling of the control processes' synchronous input $S^i$. To minimize the hold time requirement on the signal, the edge-triggered, self-disabling single-rail to dual-rail (S2DE) latch 3400 shown in FIG. 31 may be used. The S2DE latch provides a sufficiently safe synchronous-to-asynchronous conversion when it is possible to ensure that the rising edge of en will never coincide with the falling edge of CLK, which could cause a metastable condition on $s_i^{\{0,1\}}$. This requirement establishes the following timing constraint on the rising edge of en: given the latest time into a clock cycle that "a" may be set (the event which triggers all other sequencing in the processes), the rising edge of en must occur before the following cycle's CLK negative transition. The case of en going low then high before the falling edge of CLK of the transfer cycle must also be prohibited, but this can easily be ensured by conditioning the falling edge of en on the falling edge of CLK. The latest "a" may be set is at the falling edge of CLK (maximum arbiter resolution case), so the CTP has a maximum of one clock cycle to complete the en cycle.

Figure 32:
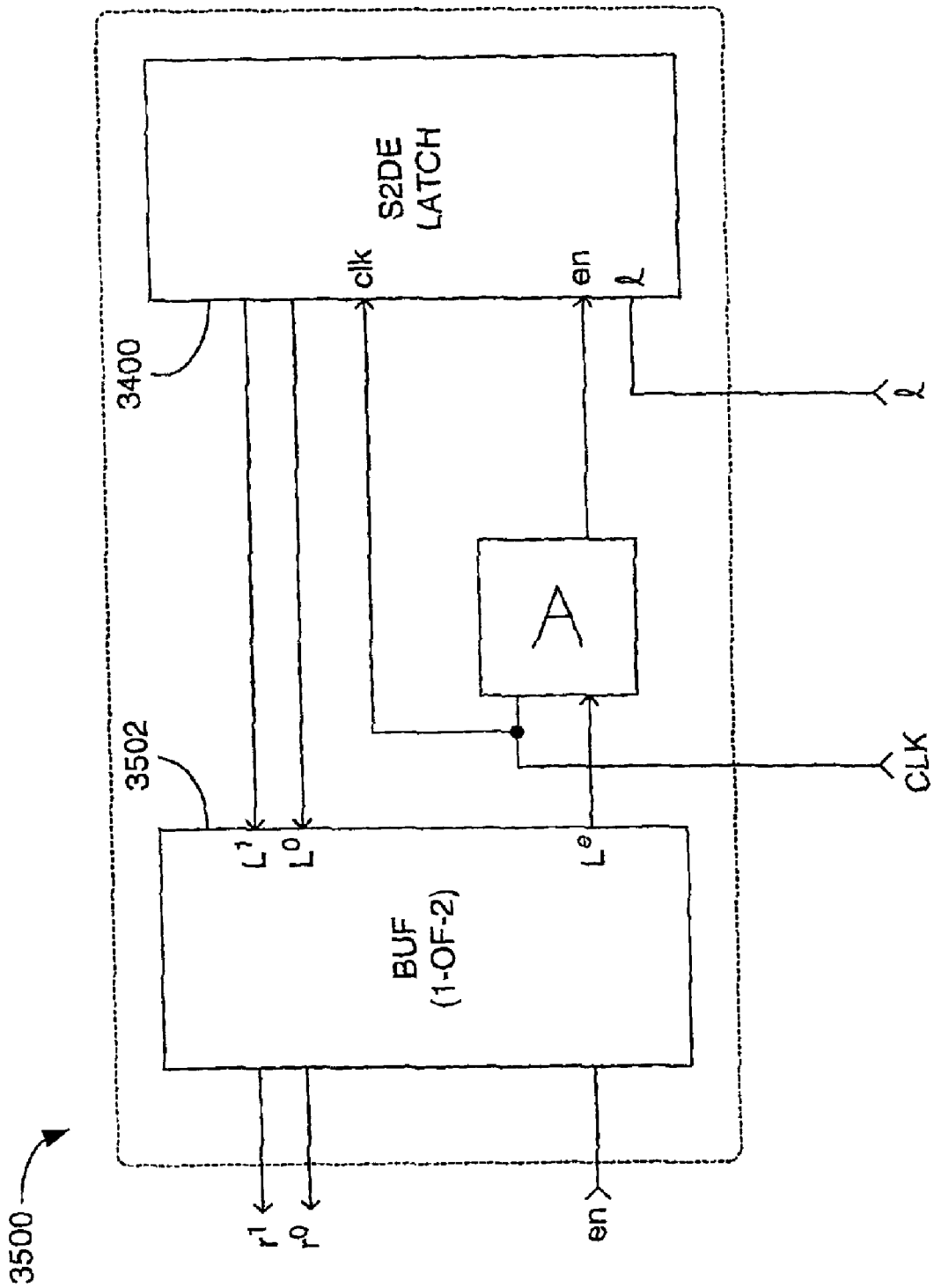

A more robust latch design (e.g., latch 3500 of FIG. 32) can be used to eliminate any potential metastability on $s_i^{\{0,1\}}$ at the expense of extra transitions on its handshake cycle and an additional arbiter. These extra transitions can be hidden by inserting a buffer stage 3502 (slack ½) between the central control process and the S2DE latch 3400.

The remaining details of these particular implementations of CTP_A2S 2608 and CTP_S2A 2610 can be implemented in a variety of ways according to various embodiments following the general production rule synthesis techniques of the quasi-delay-insensitive design style described in "Synthesis of Asynchronous VLSI Circuits," by A. J. Martin incorporated herein by reference above. This flexibility arises from different reshuffling possibilities of the A? and go! handshaking expansions, and from different transition completion strategies. Finally, internal timing races may be introduced to simplify and/or speed up the circuits.

According to a specific embodiment, the A2S datapath transfer units 2612 have the following CSP specification:

*[L?l, go?; [~CLK]; R:=l]

L is the asynchronous input channel from the PCS, "go" is the channel from the CTP indicating that a transfer should occur. The DTU_A2S reads from the L and go channels, waits for CLK to be low (note it may already be low), and then outputs the data value to the synchronous R output. As long as the forward latency of $go^d$ through the PDB is minimal, and assuming the PCS is properly slack-matched (as it is in the implementation discussed above), the behavior of the CTP_A2S guarantees that the L and go channels will both go valid during some bounded range surrounding the falling edge of CLK. The upper end of this range, accounting for the additional R:=1 latency of the DTU_A2S and the setup time on the R output signal, imposes an important lower bound on tau.

Figure 33:
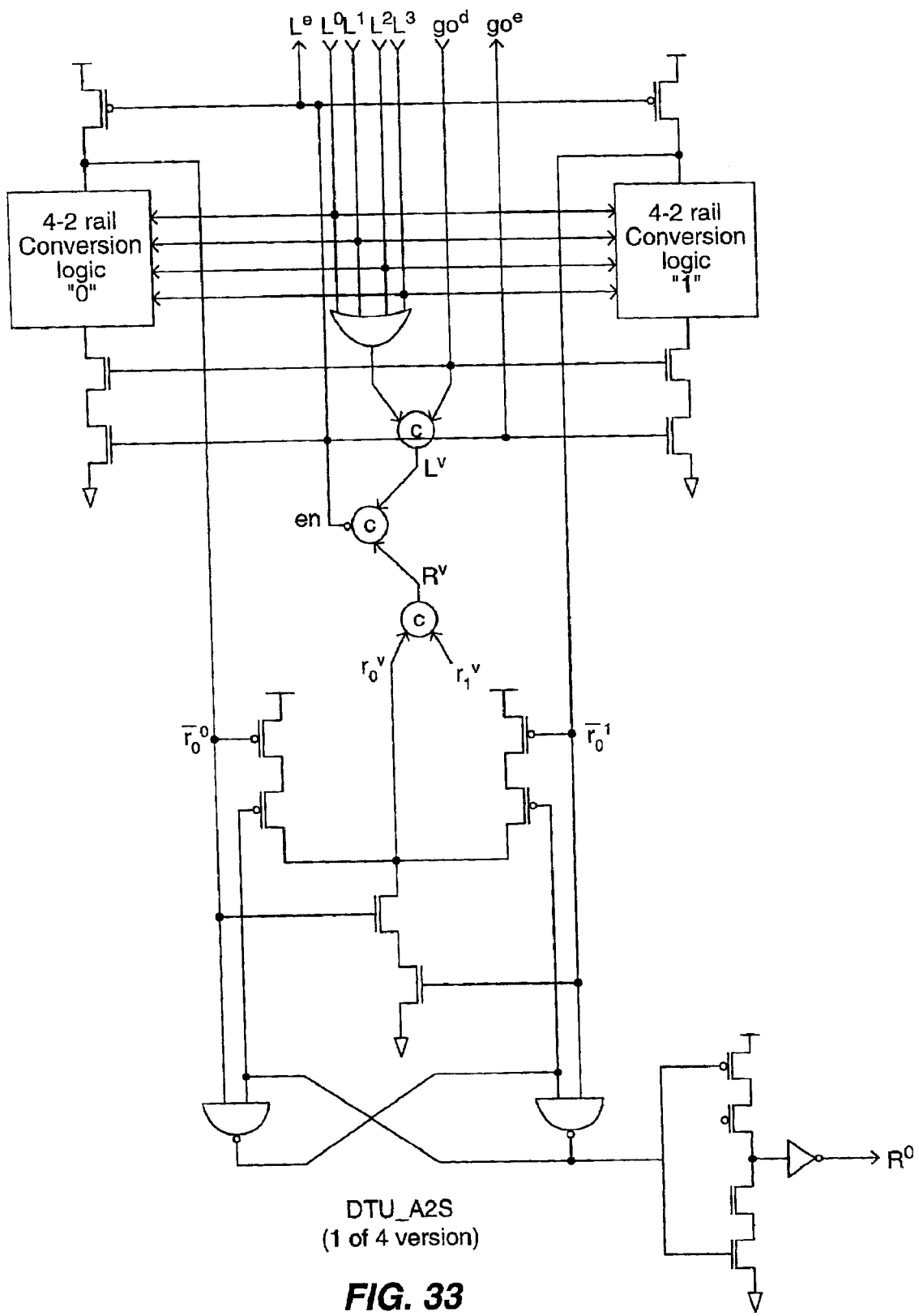

A specific circuit structure which implements the above CSP specification is given in FIG. 33. The x-to-R latch and xv circuitry is identical to that used for the $S^o$ signal in the CTP circuits. The timing constraint on x (that it not go valid too close to the falling edge of CLK) is satisfied here.

The CSP specification of a particular implementation of S2A datapath transfer unit 2614 is given by:

*[[~CLK];[CLK]; x:=L]||*[go?; R!x]

This implementation includes two parallel processes: one which captures the synchronous input L on every rising clock edge (and converts the single-rail data format into a 1ofN rail format), and another which writes the value to the asynchronous output channel (R) once a "go" transfer token is received. In the case that N is 4, the first process can be implemented using the S2Q sampler circuit 3700 shown in FIG. 34. S2Q circuit 3700 captures the values of its two synchronous inputs on every rising edge of CLK, and outputs their combined value on a 1of4 channel, x. x transitions through its all-low state immediately following the rising edge of CLK before asserting the selected data rail. Similar circuits for N other than 4 can be implemented by changing the input combinational logic.

Figure 35:
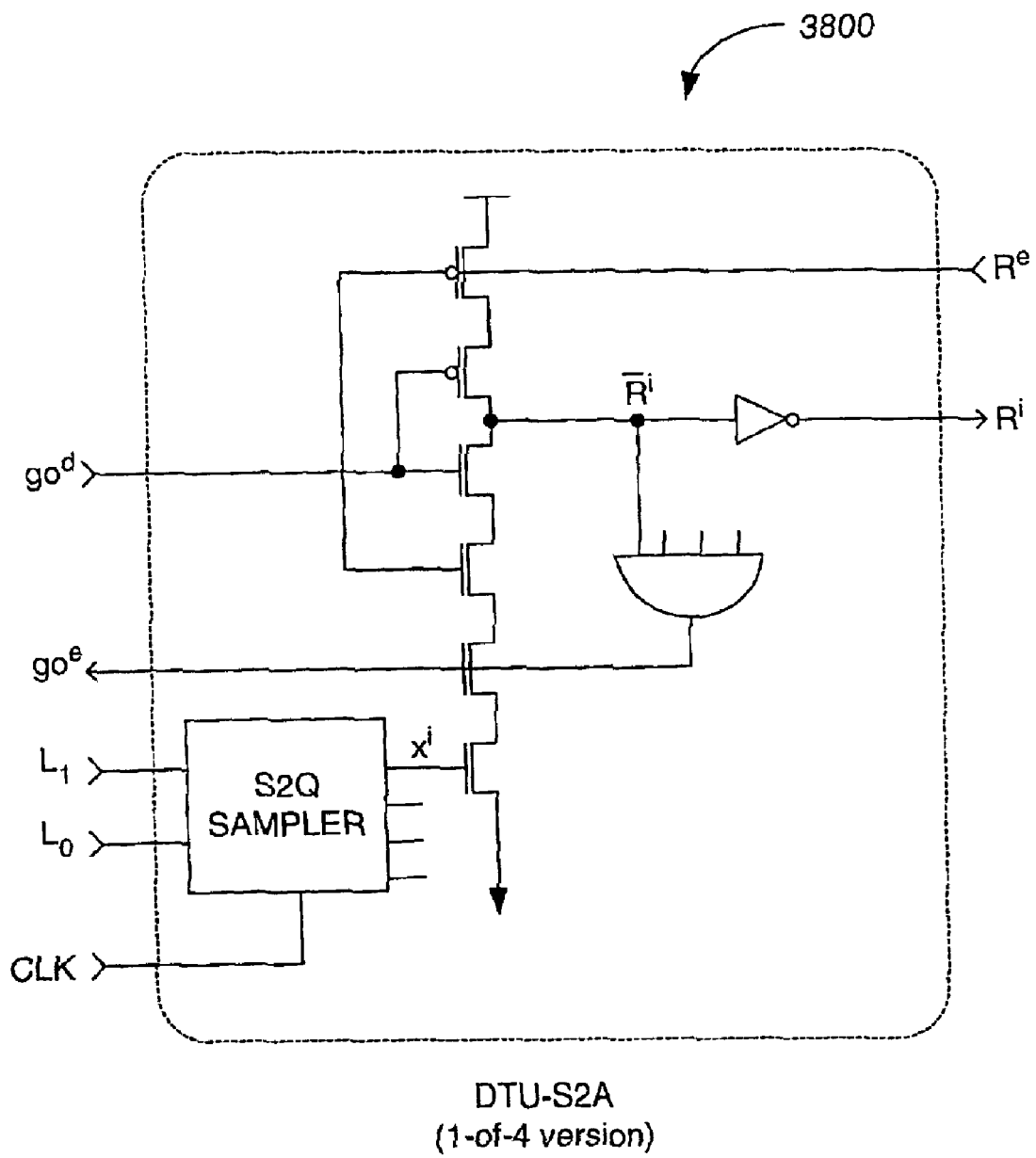

The second process in this DTU_S2A implementation is the circuit 3800 shown in FIG. 35. It is a WCHB stage (see "Synthesis of Asynchronous VLSI Circuits," by A. J. Martin incorporated herein by reference above) modified to accomodate its unstable x input. It treats x as an unacknowledged input, and writes its output R once go and x are valid. The inclusion of $R_1^e$ in the pull-down logic (a departure from the WCHB template) provides some protection if $R^e$ and $R_1^e$ do not transition low before the next validity phase of x (i.e., some time after the next rising edge of CLK), which might otherwise result in the assertion of multiple R rails. Doing so imposes less rigid synchronization of the transfer cycle to CLK.

The $x^i$ rails can be excluded from the $\overline{R^i}$ pull-up networks (another departure from the WCHB template) since the design guarantees that the $R_1^d$ low-to-high transition occurs during a range of the clock cycle surrounding the falling edge of CLK, excluding the rising edge of CLK. As long as the minimum time between the rising edge of CLK and the rising edge of $R_1^d$ is longer than the maximum x reset time (a timing assumption of the design), the unacknowledged x input poses no threat of destabilizing R.

A specific implementation of the pipelining of the "go" channel broadcast to the datapath is illustrated in FIG. 27. According to a specific embodiment, BUF element 3002 is a 1of1 channel PCHB buffer. For a 16-node broadcast tree, four transitions are added to the rising edge of $go^d$ broadcast. In return, the CTP $go^d$ positive transition is acknowledged in three transitions instead of a minimum of seven, and the rising edge of $go^e$ can follow the falling edge of $go^d$ in a single transition compared to a minimum of seven. Thus the pipelining saves 10 transitions to what would otherwise be the critical cycle of the design.

As mentioned above and according to various embodiments, S2A converter 2604 of FIG. 26 requires extra asynchronous buffering stages 2618 between its datapath output and its output PCS, and on the "A" channel output of the PCS (buffer 2620). According to one such embodiment, the "A" channel buffers must initialize "filled", i.e., with a number of tokens corresponding to the amount of slack available in the datapath. This slack is defined by the number of data tokens a DTU plus its output buffers plus the PCS can hold before the $go^e$ signal would stall, i.e., not transition high following the falling edge of $go^d$.

According to a more specific embodiment, at least one unit of slack (two half-buffer stages) is needed between the DTUs and the PCS to ensure that the PCS can never issue an "A" token when its subsequent transfer at the datapath might stall. Specifically, validity on the DTU output channels should not by itself result in an "A" token to be generated, since the $R^e$'s of the DTUs (implied directly by the environment) may stall high. If a DTU's $R^e$ stalls high, its $go^e$ into the PDB stalls low. In this case, the CTP's $go^d$ transaction will not complete within a clock cycle, which the CTP_S2A specification above assumes.

According to various embodiments, when the outer-loop forward latency (i.e., rising edge of CLK to rising edge of $A^d$) becomes too great (inevitable with large word sizes), an additional unit of slack can be added to the DTU R channels and the A channel (with another initialization token). Doing so amortizes the outer loop latency over two clock cycles. The benefit of additional slack on these channels diminishes as the backward "hole" propagation latency becomes the critical cycle, incurred when the environment drains the outermost token in a full (previously stalled) state.

According to various embodiments, the A2S and S2A converter architectures described above can be adapted to handle burst-mode transfers. It will be understood that, although one specific category of protocols is used herein to illustrate a specific implementation, various embodiments of the invention support a wide variety of burst transfer protocols. The following definitions are useful for understanding the described burst mode implementations.

Burst Transfer: A conversion (either A2S or S2A) allowing more than one data token transfer per request/grant control handshake. For example, in implementations described above, one data token is transferred per clock cycle with both $S^i$ and $S^o$ high. By contrast, a burst transfer might transfer two, four, or any number of data tokens per clock cycle with both $S^i$ and $S^o$ high. According to a particular implementation, a maximum burst size is imposed, a constant referred to below as MAX_LEN.

Figure 36:
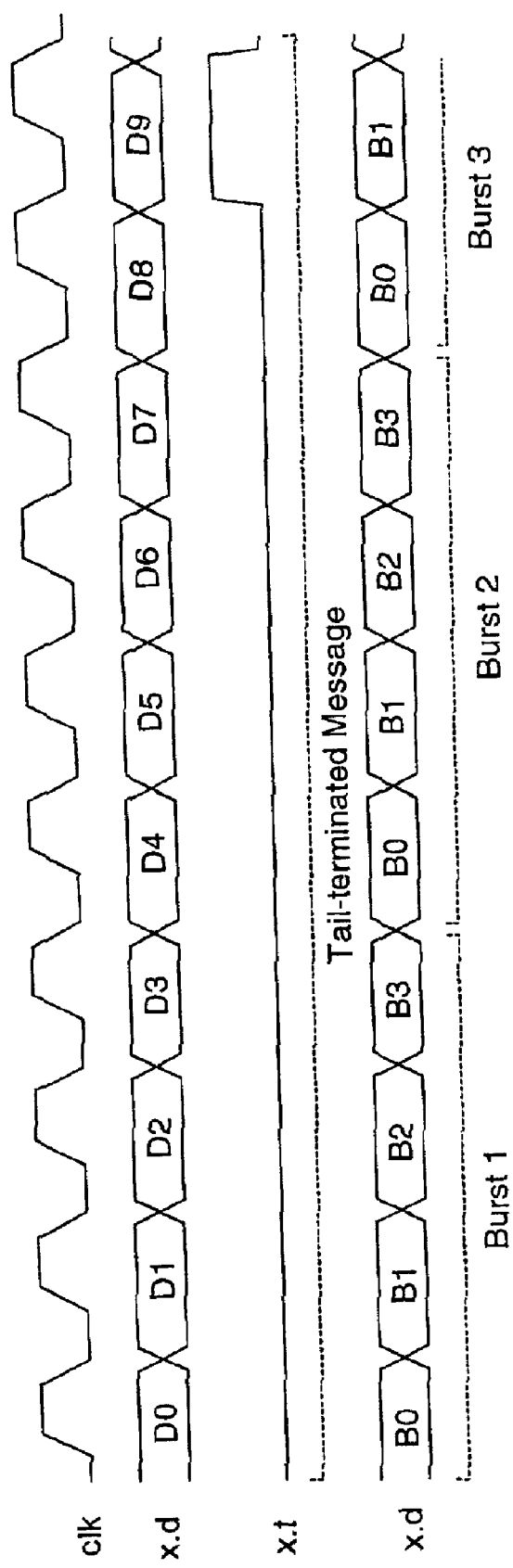

Message: A sequence of data tokens. According to a specific embodiment, each data token has an associated tail bit which is zero on every data phase except the last token in the sequence. In a particular implementation described below, a message may be of arbitrary length, and the converters segment the message into bursts of lengths up to MAX_LEN. FIG. 36 is a timing diagram which serves to illustrate such an implementation in which a message comprising data tokens D0–D9 is segmented into 3 bursts.

Figure 37:
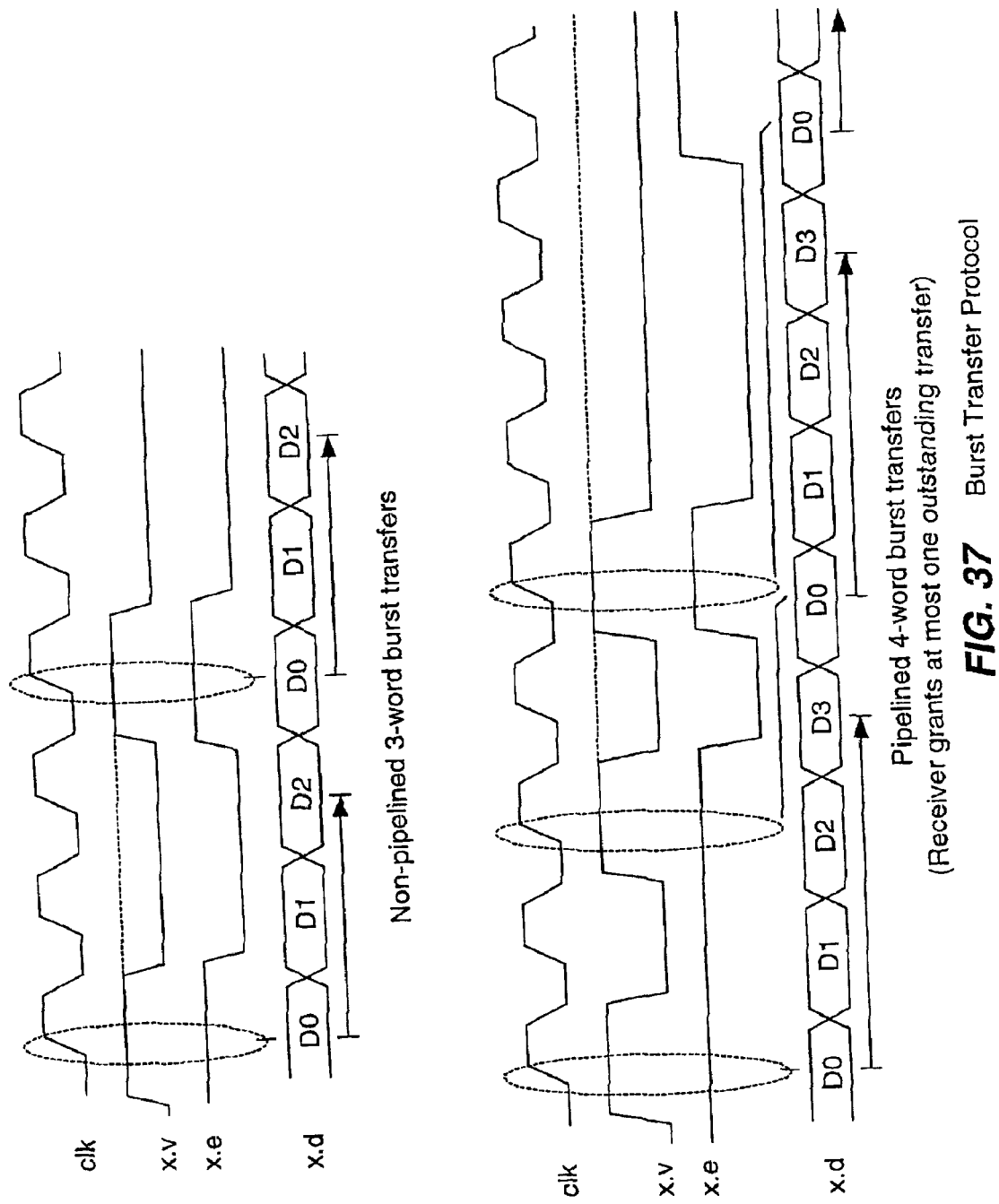

Pipelined Burst Transfer: A burst transfer protocol which allows the request/grant control phase of a burst transfer to take place during the transfer of a prior burst's message. The number of messages that the receiver will grant in advance of the communication of those messages is referred to herein as the number of grant control tokens in the sender-receiver loop. According to various embodiments, an arbitrary number of such tokens may be supported. A particular implementation imposes some finite maximum number of such outstanding granted bursts, a constant referred to as MAX_GRANT. FIG. 37 includes two timing diagrams, a first illustrating the signal timing for non-pipelined 3-word burst transfers, and a second illustrating signal timing for pipelined 4-word burst transfers.

Because a benefit of burst transfers arises from the receiver being able to commit to a sustained acceptance of data tokens, and therefore implying some finite amount of available buffer space, a limit to the length of each message is established (MAX_LEN). According to various embodiments, the message length may be fixed (e.g., as shown in FIG. 37) or, alternatively, messages can be allowed to have a variable length up to MAX_LEN.

A specific embodiment of a burst-mode converter designed according to the invention employs a message tail bit to support variable-length messages. Alternative embodiments employ other mechanisms for encoding variable message lengths (e.g., a burst count sent during the control handshake phase, or included in-band as a header word of the message). Alternative implementations eliminate such mechanisms where message sizes are fixed.

Figure 38:
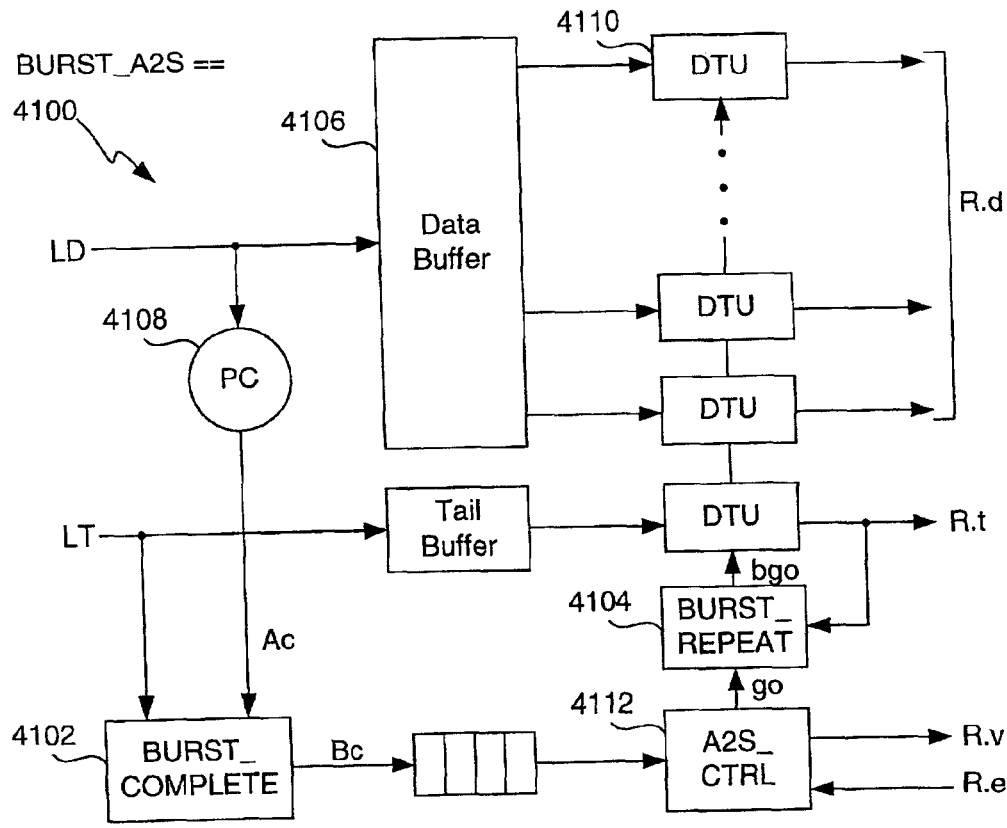

In order to support burst transfers, the A2S design described above with reference to FIGS. 26–35 includes two additional cells. Otherwise the general architecture is similar to that described above. FIG. 38 is a high level diagram showing such a burst mode A2S converter (BURST_A2S) 4100. The two new cells are burst complete logic (BURST_COMPLETE) 4102 and burst repeat cell (BURST_REPEAT) 4104.

According to one embodiment, burst complete logic 4102 is a simple asynchronous delay-insensitive logic unit with the following CSP specification:
BURST_COMPLETE==
i:=0;
*[Ac?,T?t;
[~t->i:=(i+1)%MAX_LEN
[ ]t->i:0];
[i==0->Bc![ ]else->skip
]]

The unit reads an input tail token per pipelined completion token from the datapath and whenever the tail token is "1," or when it has received MAX_LEN tokens without a "1" tail token, it sends a 1-of-1 "Burst Completion" token to its Bc output channel.

According to various embodiments, the implementation of the burst complete logic varies in relation to the value of MAX_LEN. For example, for small values of MAX_LEN (e.g., 2 to 4), the cell can be implemented in a single pipeline stage with internal state bits. For larger values, the cell may be decomposed into separate stages for incrementing the "i" internal variable and for comparing and reinitializing "i." A specific circuit implementation of the burst complete logic is described below for a fixed-size message variation of a burst mode A2S converter.

The burst repeat cell extends the "go" signal pulse to the datapath over several clock cycles corresponding to the length of the burst. According to various embodiments, the burst repeat cell may have the following specification:
BURST_REPEAT==
g:=0, bent:=0;
*[[CLK]; xgo:=go,t:=T;
[xgo&~t & (bcnt!=MAX_LEN-1)->g:=g+1
[ ]~xgo & g>0 & (t|(bent=MAX_LEN-1))->g:=g-1
[ ]else->skip
];
[~t & (xgo|g>0)->bcnt:=(bcnt+1)%MAX_LEN
[ ]t->bent:=0
[ ]else->skip
];
[~CLK];
]
||
*[bgo:=go|g>0]

According to specific embodiments, this cell may be implemented in a straightforward manner by applying standard synchronous design techniques. According to such embodiments, all of the cell's inputs and outputs are synchronous; that is, inputs are sampled on the rising edge of the clock and outputs (including state variables) can be expressed as combinational functions of its inputs (e.g., either registered, as for "g" and "cnt", or not, as for "bgo").

According to one embodiment, the burst repeat cell implements two counters: one tracking the number of outstanding bursts that have been granted by the control process (e.g., "g" incremented every time "go" is asserted within an active burst), and one tracking the length of the current active burst (e.g., "bcnt"). According to this embodiment, the "g" counter is required to support pipelined burst grants, and the "bcnt" counter is required to support segmentation of messages greater than MAX_LEN into multiple bursts. According to various implementations, the burst repeat cell may be simplified by eliminating either or both of these features.

Another difference in the burst mode A2S converter from the baseline A2S converter described above (e.g., A2S converter 802 of FIG. 9) is the amount of internal buffering on the LD and LT channels. That is, in a particular implementation of the baseline A2S converter, only a single input buffer (i.e., static slack 1) is required for correctness, although various implementations might use more for performance optimization (e.g., slack-matching to the control-to-datapath branch.) By contrast and according to a specific embodiment of the invention, for the burst mode A2S converter a single message (e.g., of MAX_LEN words) of buffering is required for correctness. Since now the control path is used only once per message, slack matching to it is less of a consideration.

According to one embodiment, two requirements are placed on the message buffer:
1. It must be able to receive and source tokens once per clock cycle regardless of how full it is.
2. The forward latency through the buffer must be less than the control path to DTU latency.

In an alternate embodiment which supports pipelined burst transfers, additional messages' worth of buffering are added. In general, in order to support the requesting of N burst transfers in advance, (N+1)*MAX_LEN amount of buffer space is provided.

It should be noted that as buffer slack needs increase, a linear array of PCHB/PCFB/WCHB buffers may become an inappropriate choice due to area implications and to difficulty satisfying the above timing constraints. Therefore, various such embodiments may employ a dual-ported FIFO memory implementation of this buffering.

According to a specific embodiment, the burst mode A2S converter of FIG. 38 has two asynchronous input channels: the datapath LD channel (a collection of N 1ofM channels), and an LT tail bit 1of2 channel. Each data token received by the burst mode A2S converter on LD is accompanied by a tail token on LT. For each data token except the last in a message, the LT token is "0." On the last data token, the value of LT is "1." The tail bit is also added to the burst mode A2S converter's synchronous output interface as another data bit (denoted "R.t" in the figure). As LD data words enter the burst mode A2S converter, they are copied to two units: message buffer 4106 and pipeline completion (PC) unit 4108. Message buffer 4106 stores the token until the array of data transfer units (DTUs) 4110 is ready to transfer it. PC unit 4108 consumes the LD token and outputs a single 1of1 Ac token to burst complete logic 4102.

The LT tail token associated with the LD data token is also copied to these two units: one copy is buffered with the data, and the other is sent to burst complete logic 4102.

Upon receiving both Ac and LT tokens, burst complete logic 4102 either increments its internal burst counter (if LT is "0" and the counter has not reached MAX_LEN), or else it sends a 1of1token on its Bc output channel to A2S control unit 4112 (if LT is "1" or its counter has reached MAX_LEN).

Control unit 4112 handles the "Bc" token just as it handles the "Ac" token in the non-burst A2S design. Namely, it asserts its "$S^o$" handshake signal synchronously with CLK, waiting for its "$S^i$" input to be asserted. Once both are asserted, it asserts its output "go" signal to the datapath for a single clock cycle. In the burst mode A2S converter design, the assertion of "go" represents the granting of an entire burst (up to MAX_LEN tokens) of data, rather than the single word it granted in the non-burst A2S design.

Burst repeat cell 4104 provides the appropriate translation between the per-burst "go" signal from control unit 4112 and the per-word "bgo" control from datapath. Simply stated, it extends the single-cycle assertion of "go" over a number of cycles matching the length of the burst. In order to know when to end the burst, burst repeat cell 4104 both watches the output tail bit (i.e., R.t) and maintains an internal counter in case the message is longer than MAX_LEN (i.e., in case it must terminate the burst and continue the message over a subsequent burst when "go" is reasserted). According to an embodiment in which pipelined burst transfers are support, burst repeat cell 4104 also increments a grant counter whenever it sees an asserted "go" from control unit 4112 while a burst is still in progress.

Figure 39:
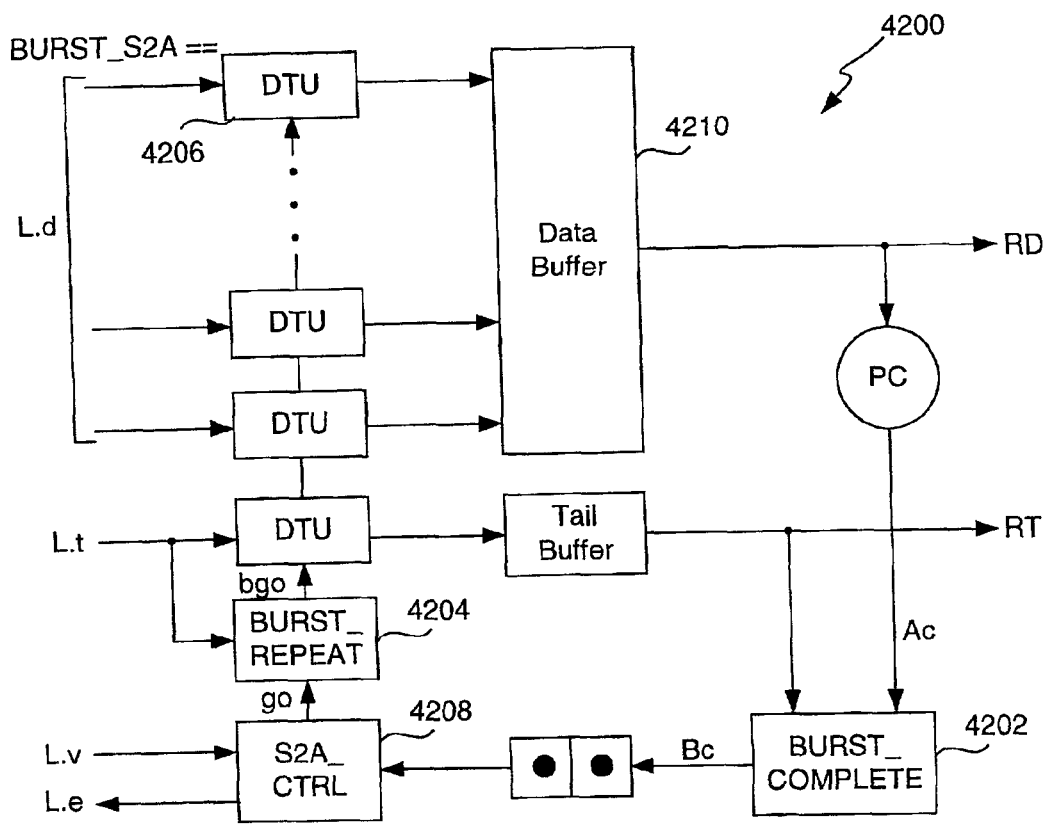

The modifications to the A2S design in order to implement the burst protocol described above may be applied in a symmetrical manner to the S2A converter. FIG. 39 is a high level diagram of such a burst mode S2A converter 4200 designed according to a specific embodiment of the present invention. According to a more specific embodiment, burst complete logic 4202 and burst repeat cell 4204 may be implemented as described above.

Burst mode S2A converter 4200 has the same synchronous interface as the baseline S2A converter (e.g., S2A converter 804 of FIG. 9) with the addition of an L.t tail bit which can be considered an additional bit of data, its state serving to segment the data sequence on L.d into messages. The asynchronous output interface also remains unchanged except for the addition of the output tail bit, RT (a 1of2 channel). The data output channel "R" in the baseline S2A becomes "RD" in the burst mode S2A converter.

For every burst grant cycle negotiated by L.e and L.v, up to MAX_LEN data tokens are transferred by the burst mode S2A converter's array of DTUs 4206. The extension of the "go" signal of control unit 4208 over multiple clock cycles corresponding to the length of each burst is handled by burst repeat cell 4204 in a manner similar to that described above with reference to burst mode A2S converter 4100. If the L.t bit stays low for MAX_LEN cycles, burst repeat cell 4204 terminates the burst, requiring an additional grant control token to be negotiated (which may have happened concurrently if the implementation supports pipelined grants).

As bursts are collected in data buffer 4210 their words are completed to "Ac" 1of1 tokens which are then further completed by burst complete logic 4202 to "Bc" 1of1 tokens. The "Bc" tokens are returned to control unit 4208 indicating that a burst's worth of buffer space has drained. According to a specific embodiment, the burst mode S2A converter design initializes with its data buffer completely empty and the "Bc" channel initialized with as many tokens as data buffer 4210 and burst repeat cell 4204 will support. The number of initial "Bc" tokens greater than one corresponds to the number of pipelined grant tokens control unit 4208 will issue. Thus, the internal "g" counter of burst repeat cell 4204 must support counts up to this number.

According to specific embodiments in which all burst messages are of a fixed length MAX_LEN, there is no need to include a tail bit in the design. In such embodiments, the fixed-length burst mode A2S converter always sends MAX_LEN tokens per transfer, and the recipient synchronous logic counts the number of tokens transferred following a cycle with both $S^i$ and $S^o$ asserted to know when the message ends.

Likewise, the synchronous logic feeding a fixed-length burst mode S2A converter always provides valid data for MAX_LEN cycles beginning from a cycle with both $S^i$ and $S^o$ asserted (or following the end of the prior transfer when the control phase is pipelined). The asynchronous recipient logic then counts the data tokens it receives to know when messages begin or end.

Figure 40:
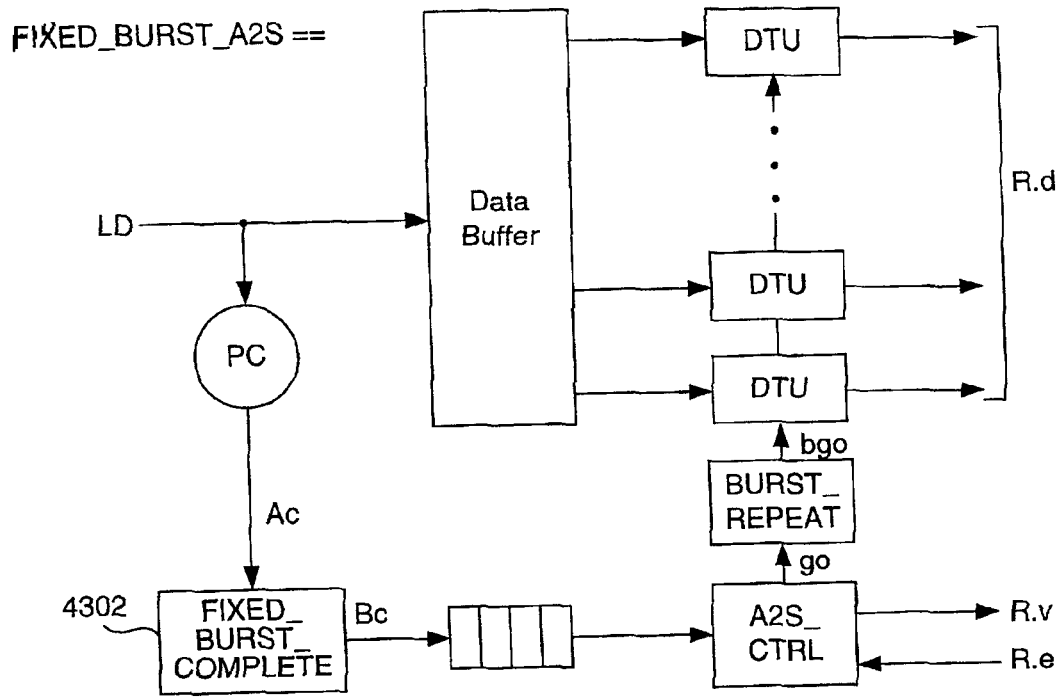
Figure 41:
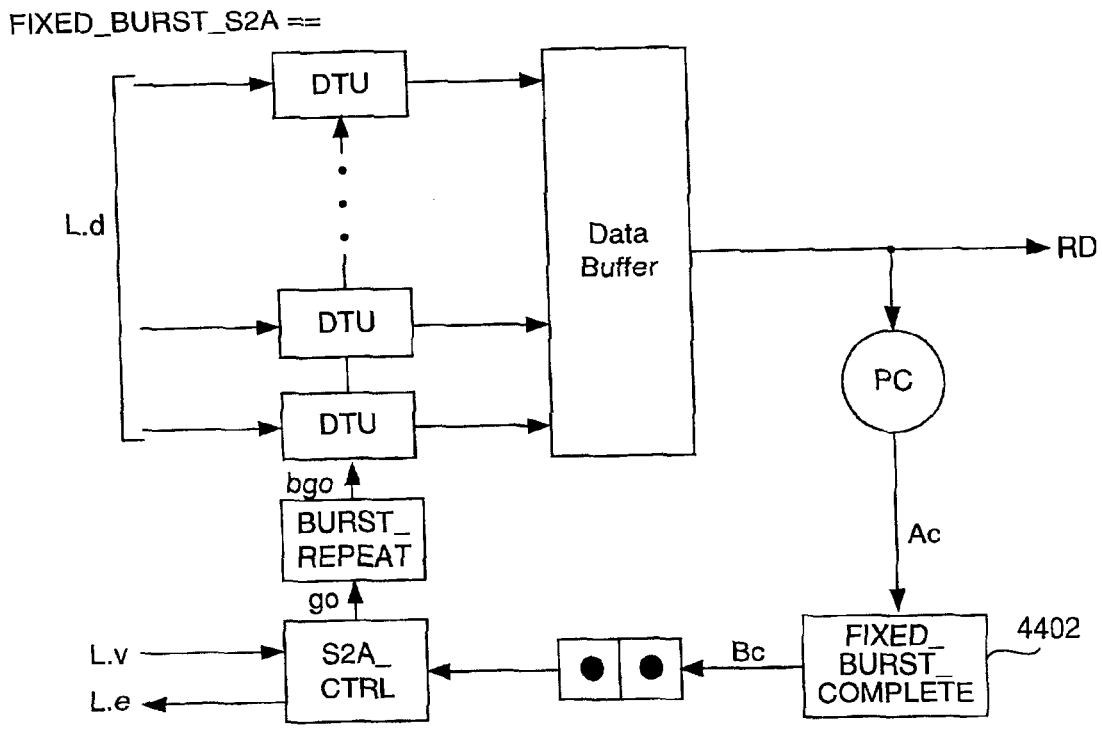

Block diagrams of these simpler burst converter designs are given in FIGS. 40 and 41 According to specific embodiments, fixed burst complete logic 4302 and 4402 are simply token counters which may be implemented as follows:

FIXED_BURST_COMPLETE==
i:=0;
*[Ac?; i:=(i+1)% MAX_LEN;
[i==0->Bc!
[ ]else->skip
]]

The remainder of the converter blocks operate as described above with reference to FIGS. 38 and 39.

An example implementation of fixed burst complete logic when MAX_LEN equals two is given in FIG. 42 (DECIMATE2_1of1). When MAX_LEN is any power of two ($2^N$), a cascade of N DECIMATE_2_1of1 units may be used to implement the fixed burst complete logic. When MAX_LEN is not a power of two, or when the forward latency through cascaded DECIMATE2_1of1 units becomes unacceptably high, a more general counter design may be used.

The fixed-length burst mode A2S and S2A converter designs may use the burst repeat cell described above by simply wiring the "T" tail bit input to logic zero. Alternatively, the unit may be simplified for this application by factoring out the tail bit logic from its implementation.

In certain applications it is desirable to transfer data tokens on both falling and rising edges of the synchronous clock, i.e., so-called double data rate (DDR) applications. As long as the application calls for an even number of data transfers per burst beginning on a rising edge of the clock, the only changes necessary to the burst mode A2S converter and burst mode S2A converters described above (e.g., in FIGS. 38–41) are to the respective Datapath Transfer Units.

According to a specific embodiment, the DDR version of the A2S Datapath Transfer Unit can be specified as follows:
A2S_DDR_DTU==
CLK0:=0;
*[[CLK!=CLK0];
[go->L?R[ ]else->skip],
CLK0:=CLK
]

The unit waits for a transition on CLK, and when "go" is asserted, it reads from its asynchronous input "L" to its synchronous output "R".

According to a similar embodiment, the DDR version of the S2A Datapath Transfer Unit has the following specification:

S2A_DDR_DTU==
CLK0:=0;
*[[CLK!=CLK0];
[go->R!L[ ]else->skip],
CLK0:=CLK
]

The unit waits for a transition on CLK, and when "go" is asserted, it sends its synchronous input "L" to its asynchronous output channel "R".

Figure 44:
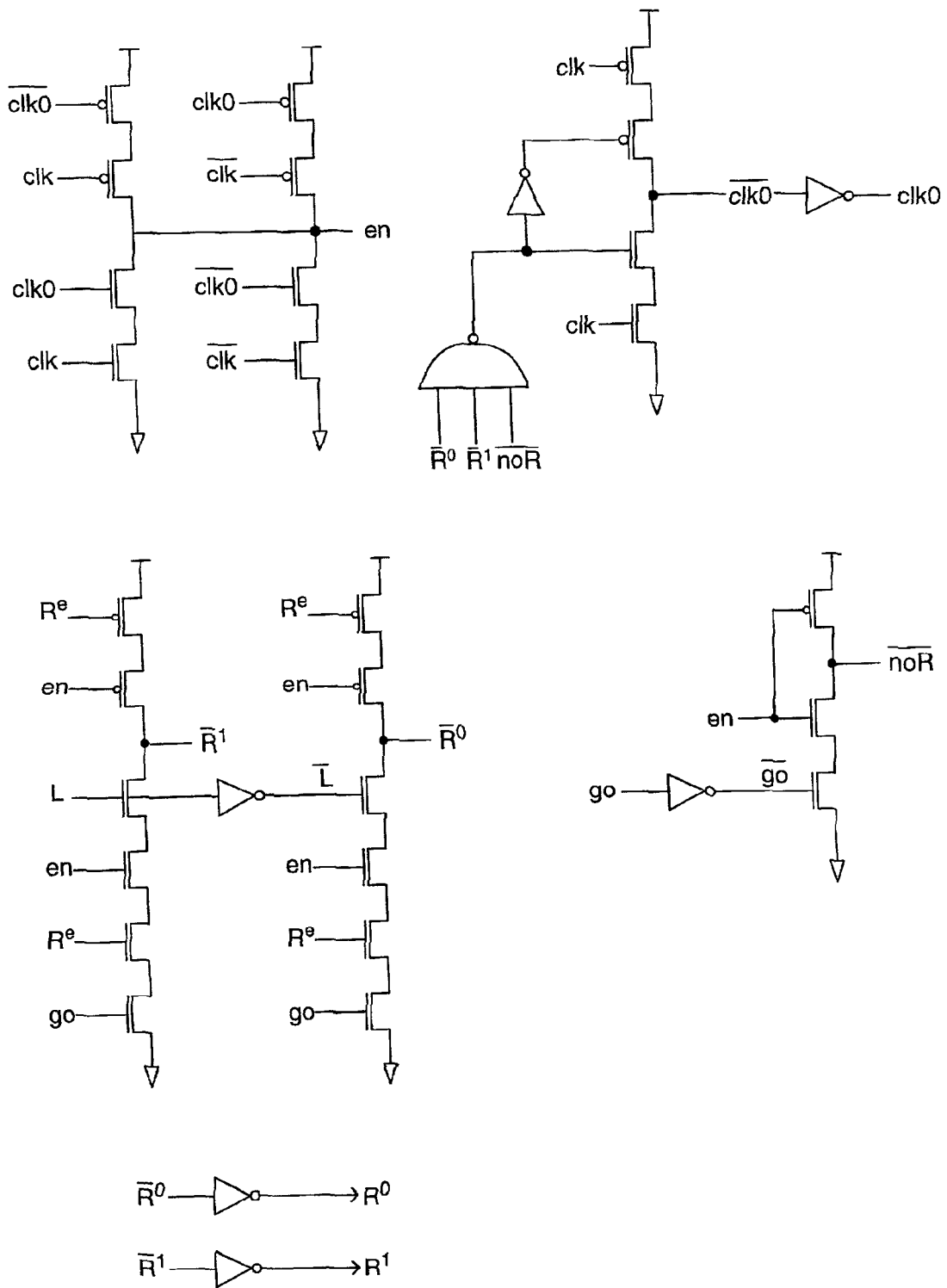

Circuit implementations of these DDR DTU variants are given in FIGS. 43 and 44. Note that when burst mode DDR A2S and S2A converters (and their fixed-length variants) are constructed using these datapath transfer units, the synchronous recipient or sender logic counts two tokens per clock cycle.

When using the variable-length burst designs (with tail bit control), the tail bit, like the synchronous handshake control signals $S^i$ and $S^o$, remains a single-data rate signal. Each tail bit value applies to the pair of data tokens transferred on that cycle.

According to yet other embodiments which will now be described with reference to FIGS. 45–49, A2S and S2A conversion circuits are used to implement a DDR-SDRAM interface. According to a specific embodiment, extensions to the circuits described above make such an implementation possible. These extensions include a master/slave converter system, which allows the conversion of different types of information to be linked, and a nop-counter, which can give increased performance when there are complex constraints on the minimum spacing between data items.

In one such embodiment, the SDRAM interface uses a master/slave design in which multiple slave converters are controlled by commands sent through a "master" A2S converter. Basically, the control process of each of the slave converters is replaced with a shared mechanism that generates "go" signals for each. Based on the command word transferred, the system may also trigger one or more of the slave converters, possibly after some number of clock cycles of delay.

As described here, the master converter is A2S. However, it will be understood that a similar system could be designed with a master S2A converter and still remain within the scope of the invention.

The DDR-SDRAM protocol specifies that data are transferred (read or write) in a continuous burst starting a specified number of clock cycles after the corresponding read or write command. Hence the asynchronous side must ensure that data are available for writing, or empty buffer space available for reading, before issuing the associated read or write command. This requires that the converters for commands and data be linked.

A slave A2S or S2A converter comprises a normal converter (such as any of those described above) with its control process removed. According to various embodiments, such normal converters may comprise, for example, single-word converters (e.g., FIG. 45), burst converters (e.g., FIG. 46), or fixed burst converters (e.g., FIG. 47). Such converters may also be double data rate (DDR) converters, but are not required to be so.

Deleting the control process leaves the slave converter with an input signal "go" and an output completion channel Ac. (For embodiments described above, the completion channel was called Ac for single-word converters and Bc for burst-mode converters). These channels will be referred to below as Ac for simplicity.

According to a particular implementation, a slave converter does not itself perform a synchronous handshake. Instead, it simply transfers data on every rising clock edge on which its input signal "go" is asserted. It is the responsibility of the larger system to satisfy the same conditions as are placed on the control unit of a standalone converter, i.e., to wait for a token on Ac, and perform any necessary synchronous flow control, before asserting the "go" signal. In a slave S2A converter, as described above with reference to a standalone S2A converter, the Ac channel is initialized with tokens to match the amount of datapath buffering.

Figure 48:
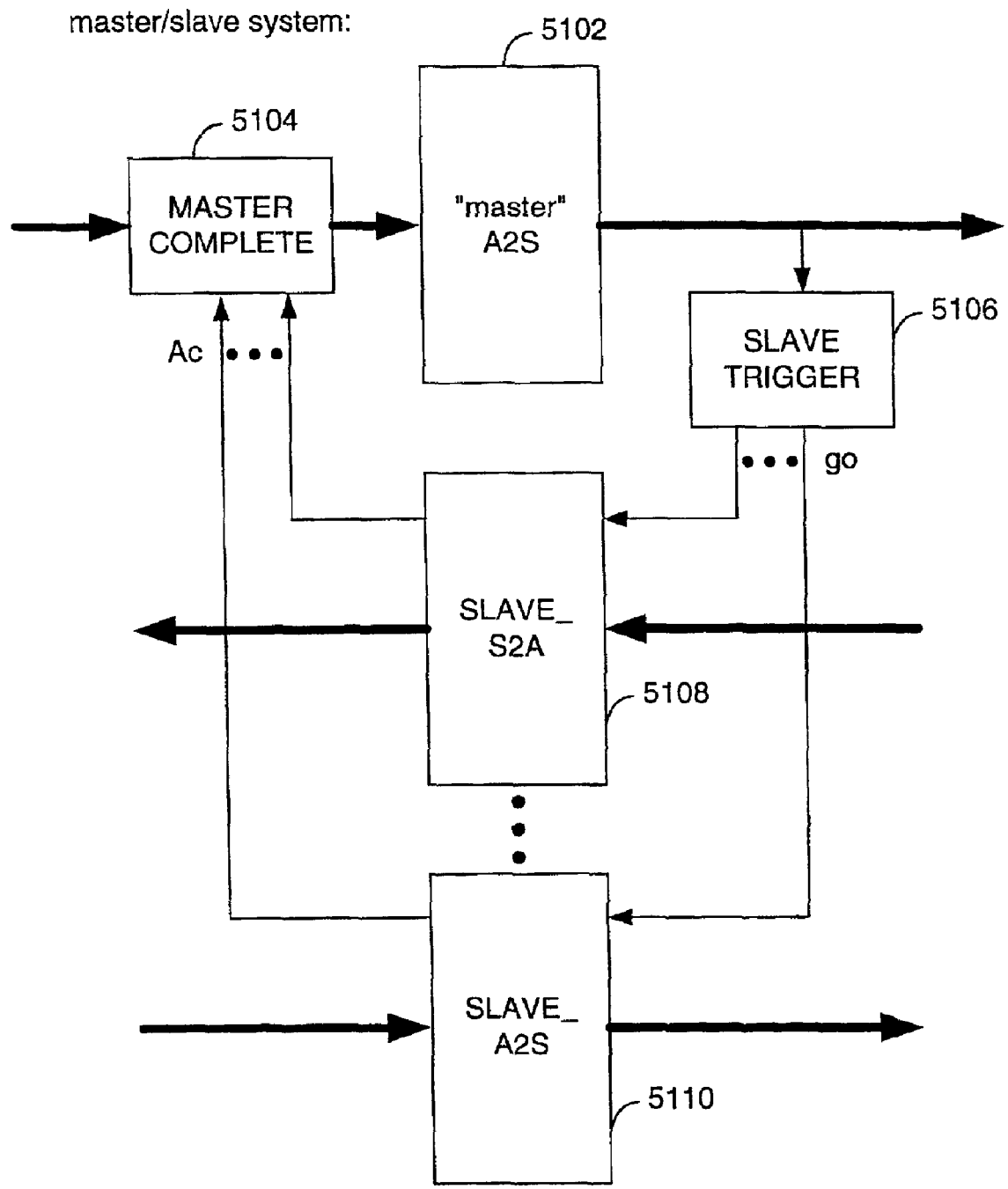

The general organization of an exemplary master/slave converter system is shown in FIG. 48. Before a command is sent to master A2S converter 5102, it passes through a control block MASTER_COMPLETE 5104 which checks that the necessary slave converters are ready. According to one embodiment, MASTER_COMPLETE 5104 executes the following operation, specified in pseudocode, for every command:

L?command;
for each slave converter S,
if command requires a transfer on S,
Ac[S]?; //receive completion token from S
R!command Once the command emerges from MASTER_COMPLETE 5104, it is passed through standalone A2S converter 5102 (the "master" converter).

On the synchronous side, a SLAVE_TRIGGER unit 5106 is responsible for raising the "go" signals of the appropriate slave converters at the appropriate times, depending on the command. A simple version of SLAVE_TRIGGER 5106 could observe the output channel C from master A2S converter 5102. On each rising clock edge, if C is valid (C.v and C.e both high) and the command C.d indicates a slave transfer, then the corresponding slave converter is triggered through a delay line. In a particular embodiment, the delay in each delay line is programmable and corresponds to an integer number of clock periods. In general, SLAVE_TRIGGER 5106 may be more complex including, for example, synchronous handshaking on the slave converters or other forms of synchronous control.

According to some embodiments, slave converters 5108 and 5110 have more datapath buffering than their standalone counterparts. That is, in place of the control process of the standalone converter, with its relatively small latency from Ac to "go", the control latency of the slave converter passes through MASTER_COMPLETE 5104, master A2S 5102, and SLAVE_TRIGGER 5106 (with the associated delays). Therefore, the datapath buffering of the slave converter is increased to match this greater latency. The number of initial tokens on the Ac channel of slave S2A converter 5108 (representing initial empty buffer space) may be increased accordingly.

According to various embodiment, the NOP_COUNTER is a synchronous unit the responsibility of which is to ensure that items sent through an A2S converter are separated by at least a minimum number of clock cycles. The number is given with each item, and specifies the minimum number of skipped cycles between that item and the previous one.

The DDR-SDRAM protocol has numerous requirements on the timing of commands which, for particular implementations, can all be expressed as minimums: before a certain command can be issued, there must have been at least a minimum number of cycles skipped (issuing null commands, or NOPs) since the previous command.

According to one embodiment, the required number of NOPs may be generated on the asynchronous side and passed through the A2S. According to such an implementation, it would then merely be necessary for the synchronous side to generate additional NOPs when no command was available. The disadvantage of this approach is that it may add unnecessary delay between commands that are already widely separated. The minimum number of NOPs is not known until the following command is known, so passing those explicit NOPs through the A2S before the following command would add extra delay even though more than enough delay may have already passed.

Figure 49:
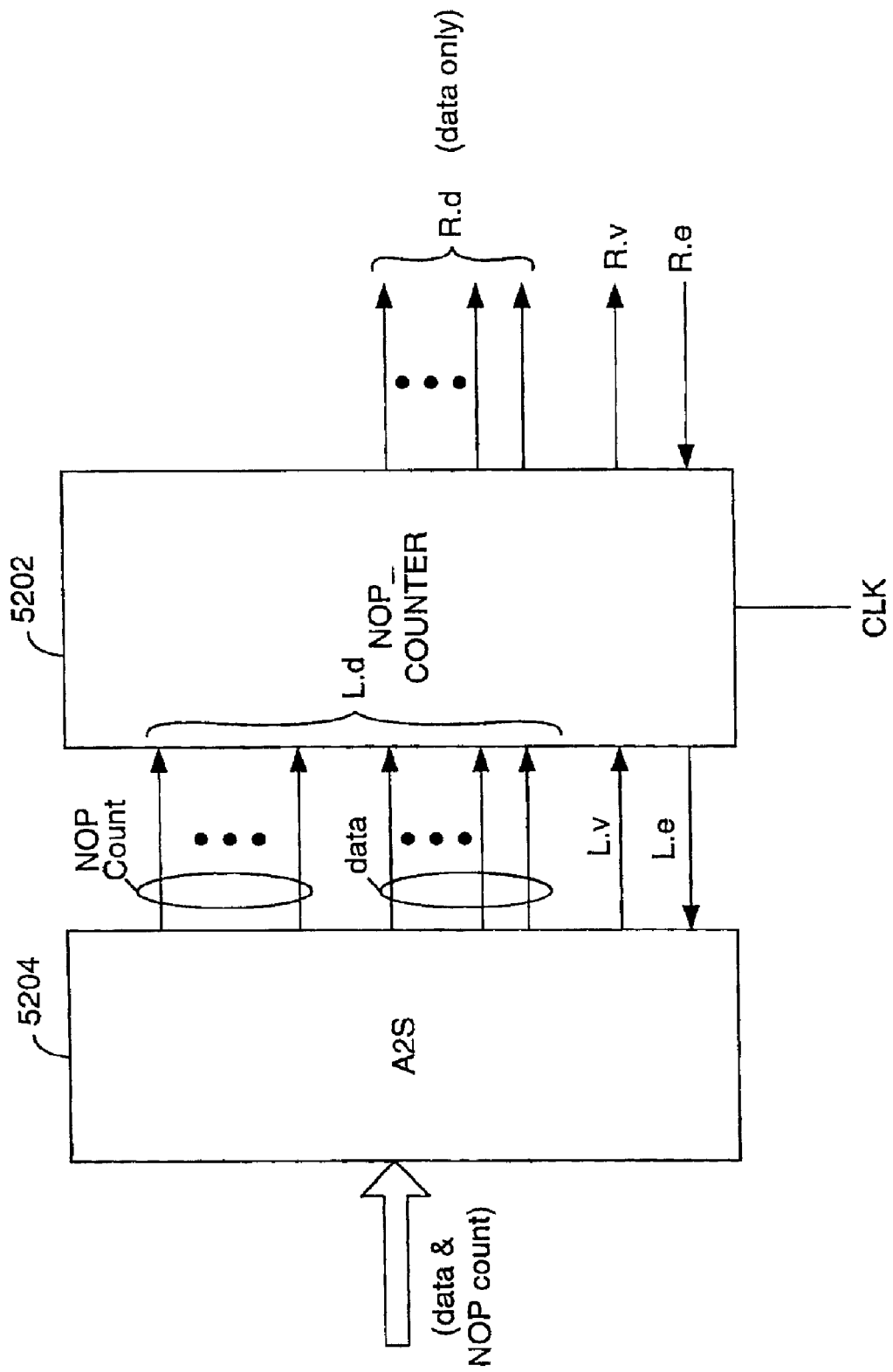

Referring now to FIG. 49, NOP_COUNTER 5202 is a synchronous block attached to the output of A2S 5204. Its input and output each comprise synchronous handshake channels. The input channel carries items (commands) with an associated minimum NOP count, and the output channel sends out those same items spaced by the required number of cycles. One possible CSP specification of this unit is the following:

```
count:=lcount:=rcount:=0;
has_l:=has_r:=false;
L.e:=R.v:=false;
*[[~CLK];
[has_r & (count>=rcount)->R.d:=r, R.v:=true
[ ]else->R.v:=false
],
(L.e:=~has_l);
[CLK];
[R.v & R.e->count:=1, has_r:=false
[ ]else->count:=count+1
]
[L.v & L.e->(l,lcount):=L.d, has_l:=true
[ ]else->skip
];
[has_l & ~has_r->has_l:=false, has_r:=true,(r,rcount):=(l,lcount)
[ ]else->skip
];
]
```

In this program, the variable "count" holds the number of cycles since the last output on R. The pair (l,lcount) holds the input data and associated minimum NOP count; this is copied to (r,rcount) for output. The booleans has_l and has_r indicate when each of these pairs hold valid tokens. Having two variable pairs allows the unit to input and output on the same clock cycle.

On each falling clock edge, NOP_COUNTER 5202 sets its output signals. When there is a token in r (has_r high), and the number of cycles since the last output is greater than rcount (count>=rcount), it sets R.d and R.v to send the value r; otherwise, it does not send. Also, if there is no token in l (has_l low), it raises L.e to enable input.

Data are transferred on the rising clock edge. If there is an output on R (R.v and R.e high), then the token is removed from r, and the count of cycles since the last output is reset to 0; otherwise, the count is incremented. If there is an input on L, the data and nop-count are read into a token in (l,lcount). Finally, if there is now a token in l but not one in r, the token is transferred from l to r.

The SDRAM interface uses a NOP_COUNTER in conjunction with the master/slave design above. The NOP_COUNTER is attached to the master converter and may be considered part of the master converter for purposes of the rest of the design. In a particular implementation, the SLAVE_TRIGGER unit observes the output channel of the NOP_COUNTER as though it were the output of the master converter. This keeps the timing of the slave converters consistent with the command stream that emerges from the NOP_COUNTER and is visible to the other synchronous circuitry.

While the invention has been particularly shown and described with reference to specific embodiments thereof, it will be understood by those skilled in the art that changes in the form and details of the disclosed embodiments may be made without departing from the spirit or scope of the invention. For example, various interfaces have been described herein with reference to a particular asynchronous design style. However, it will be understood that any of a variety of asynchronous domain types are within the scope of the invention. Moreover, the specific details of the circuits described herein are merely exemplary and should not be considered as limiting the invention. Rather, any circuits implementing the basic functionality of the circuits described herein are also within the scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. An interface for use between an asynchronous domain and a synchronous domain, the asynchronous domain being characterized by transmission of data in accordance with an asynchronous handshake protocol, the synchronous domain being characterized by transmission of data in accordance with transitions of a clock signal, the interface comprising a datapath operable to transfer a data token between the domains, the interface further comprising control circuitry operable to enable transfer of the data token via the datapath in response to at least one transition of the clock signal and at least one completion to of the asynchronous handshake protocol.

2. The interface of claim 1 wherein the datapath is operable to transfer the data token from the asynchronous domain to the synchronous domain, and the at least one completion of the asynchronous handshake protocol corresponds to the data token.

3. The interface of claim 2 wherein the data token comprises a plurality of parallel bits, and the at least one completion of the asynchronous handshake protocol comprises completion of the asynchronous handshake protocol for each of the bits.

4. The interface of claim 3 wherein the datapath comprises a buffer which is operable to store a plurality of data tokens including the data token, and a plurality of datapath transfer units which are operable to transfer the bits of the data token from the buffer to the synchronous domain in response to the transition of the clock signal and a transfer signal generated by the control circuitry in response to a synchronous handshake with the synchronous domain and completion of the asynchronous handshake protocol for all of the bits.

5. The interface of claim 4 wherein the buffer comprises a multi-stage, asynchronous, first-in-first-out (FIFO) buffer, each successive stage of which is operable to receive and transfer all of the bits of the data token in accordance with the asynchronous handshake protocol.

6. The interface of claim 4 wherein each datapath transfer unit comprises a latch which is operable to latch a respective bit of the data token into the synchronous domain after the transition of the clock signal and before a next transition of the clock signal.

7. The interface of claim 4 further comprising broadcasting circuitry which is operable to provide the transfer signal to each of the datapath transfer units.

8. The interface of claim 7 wherein the transfer signal comprises a token, and the broadcasting circuitry comprises a pipelined tree structure for distributing the token.

9. The interface of claim 8 wherein the pipelined tree structure comprises a plurality of Mueller C-elements.

10. The interface of claim 4 wherein the control circuitry comprises a pipelined completion stage for facilitating generation of the transfer signal.

11. The interface of claim 3 wherein each of the bits is encoded using 1ofN encoding where N is greater than or equal to one.

12. The interface of claim 2 wherein the synchronous domain requires a data transfer to comprise a block of consecutive data, the datapath further being operable to accumulate data tokens generated in the asynchronous domain to form the block of consecutive data, each data token comprising a plurality of bits, and wherein the control circuitry is operable to facilitate transfer of the accumulated data tokens to the synchronous domain via the datapath in response to a synchronous handshake with the synchronous domain and consecutive transitions of the clock signal, and after completion of the asynchronous handshake protocol for each of the bits of each of the data tokens.

13. An integrated circuit comprising the interface of claim 1.

14. The integrated circuit of claim 13 wherein the integrated circuit comprises a CMOS integrated circuit.

15. The integrated circuit of claim 13 wherein the integrated circuit comprises a system-on-a-chip which includes both the asynchronous and synchronous domains.

16. The interface of claim 1 wherein the datapath is operable to transfer the data token from the synchronous domain to the asynchronous domain, and the at least one completion of the asynchronous handshake protocol corresponds to a previously transferred data token.

17. The interface of claim 16 wherein each of the data token and the previously transferred data token comprises a plurality of parallel bits, and the at least one completion of the asynchronous handshake protocol comprises completion of the asynchronous handshake protocol for each of the bits of the previously transferred data token.

18. The interface of claim 17 wherein the datapath comprises a buffer which is operable to store a plurality of data tokens including the previously stored data token, and a plurality of datapath transfer units which are operable to transfer the bits of the data token from the synchronous domain to the buffer in accordance with the asynchronous handshake protocol and a transfer signal generated by the control circuitry in response to completion of a synchronous handshake with the synchronous domain and the asynchronous handshake protocol for all of the bits of the previously stored data token.

19. The interface of claim 18 wherein the buffer comprises a multi-stage, asynchronous, first-in-first-out (FIFO) buffer, each successive stage of which is operable to receive and transfer all of the bits of the data token in accordance with the asynchronous handshake protocol.

20. The interface of claim 18 wherein each datapath transfer unit comprises a latch which is operable to transfer a respective bit of the data token into the buffer on the transition of the clock signal.

21. The interface of claim 18 further comprising broadcasting circuitry which is operable to provide the transfer signal to each of the datapath transfer units.

22. The interface of claim 21 wherein the transfer signal comprises a token, and the broadcasting circuitry comprises a pipelined tree structure for distributing the transfer token.

23. The interface of claim 18 wherein the control circuitry comprises a pipelined completion stage for facilitating generation of the transfer signal.

24. The interface of claim 23 wherein the transfer signal comprises a transfer token, the control circuitry further comprising a transfer token buffer which is operable to store a plurality of transfer tokens each corresponding to completion of the asynchronous handshake protocol for a corresponding data token.

25. The interface of claim 17 wherein each of the bits is encoded using 1ofN encoding where N is greater than or equal to one.

26. The interface of claim 16 wherein the synchronous domain requires a data transfer to comprise a block of consecutive data, the control circuitry further being operable to facilitate transfer of a plurality of data tokens as the block of consecutive data to the asynchronous domain via the datapath in response to a synchronous handshake with the synchronous domain, consecutive transitions of the clock signal, and an enable signal generated in accordance with the asynchronous handshake protocol and indicating that the asynchronous domain has sufficient memory to receive the plurality of data tokens.

27. The interface of claim 1 wherein the control circuitry is operable to enable transfer of the data token on both positive and negative transitions of the clock signal.

28. The interface of claim 1 wherein the control circuitry is operable to enable transfer of the data token on only one of positive and negative transitions of the clock signal.

29. The interface of claim 1 wherein the control circuitry is operable to enable transfer of the data token only upon completion of a synchronous handshake with the synchronous domain.

30. The interface of claim 29 wherein the datapath is operable to transfer the data token from the asynchronous domain to the synchronous domain, the synchronous handshake comprising a first signal from the control circuitry indicating the data token is ready to be transferred, and a second signal from the synchronous domain indicating the synchronous domain is ready to receive the data token.

31. The interface of claim 29 wherein the datapath is operable to transfer the data token from the synchronous domain to the asynchronous domain, the synchronous handshake comprising a first signal from the control circuitry indicating the datapath is ready to receive the data token, and a second signal from the synchronous domain indicating the synchronous domain is ready to transfer the data token.

32. The interface of claim 29 wherein the control circuitry is further operable to operate as a zero-bit converter by converting between the asynchronous handshake protocol and the synchronous handshake without transferring data via the datapath.

33. The interface of claim 1 wherein the datapath is operable to transfer the data token from the asynchronous domain to the synchronous domain within one period of the clock signal upon completion of the asynchronous handshake protocol.

34. The interface of claim 1 wherein the control circuitry is operable to enable transfer of the data token without regard to flow control information from the synchronous domain.

35. An interface for use between an asynchronous domain and a synchronous domain, the asynchronous domain being characterized by transmission of data in accordance with an asynchronous handshake protocol, the synchronous domain being characterized by transmission of data in accordance with transitions of a clock signal, the interface comprising a datapath operable to receive a data token generated in the asynchronous domain and comprising a plurality of bits, the interface further comprising control circuitry operable to facilitate transfer of the data token to the synchronous domain via the datapath in response to a transition of the clock signal, completion of a synchronous handshake with the synchronous domain, and completion of the asynchronous handshake protocol for each of the bits, transfer of the data token to the synchronous domain occurring within one period of the clock signal after completion of the asynchronous handshake protocol.

36. An integrated circuit comprising the interface of claim 35.

37. The integrated circuit of claim 36 wherein the integrated circuit comprises a CMOS integrated circuit.

38. The integrated circuit of claim 36 wherein the integrated circuit comprises a system-on-a-chip which includes both the asynchronous and synchronous domains.

39. An interface for use between a synchronous domain and an asynchronous domain, the synchronous domain being characterized by transmission of data in accordance with transitions of a clock signal, the asynchronous domain being characterized by transmission of data in accordance with an asynchronous handshake protocol, the interface comprising a datapath operable to receive a data token generated in the synchronous domain and comprising a plurality of bits, the interface further comprising control circuitry operable to facilitate transfer of the data token to the asynchronous domain via the datapath in response to a transition of the clock signal, completion of a synchronous handshake with the synchronous domain, and an enable signal generated in accordance with the asynchronous handshake protocol and indicating that the asynchronous domain is ready to receive the data token, transfer of the data token to the synchronous domain occurring within one period of the clock signal after generation of the enable.

40. An integrated circuit comprising the interface of claim 39.

41. The integrated circuit of claim 40 wherein the integrated circuit comprises a CMOS integrated circuit.

42. The integrated circuit of claim 40 wherein the integrated circuit comprises a system-on-a-chip which includes both the asynchronous and synchronous domains.

43. At least one computer-readable medium having data structures stored therein representative of the interface of claim 1.

44. The at least one computer-readable medium of claim 43 wherein the data structures comprise a simulatable representation of the interface.

45. The at least one computer-readable medium of claim 44 wherein the simulatable representation comprises a netlist.

46. The at least one computer-readable medium of claim 43 wherein the data structures comprise a code description of the interface.

47. The at least one computer-readable medium of claim 46 wherein the code description corresponds to a hardware description language.

48. A set of semiconductor processing masks representative of at least a portion of the interface of claim 1.

49. An interface for use between an asynchronous domain and a synchronous domain, comprising:

a first datapath operable to transfer first data tokens generated in the asynchronous domain to the synchronous domain;

a second datapath operable to transfer second data tokens generated in the synchronous domain to the asynchronous domain;

control circuitry operable to control both the first and second datapaths in response to flow control signals indicating completion of a synchronous handshake with the synchronous domain, and completion of an asynchronous handshake protocol in the asynchronous domain.

50. The interface of claim 49 wherein the control circuitry comprises completion circuitry for transmitting the flow control signals in response to first and second completion signals from the first and second datapaths indicating whether the first and second datapaths are ready to transmit data.

51. The interface of claim 50 wherein the flow control signals transmitted by the completion circuitry correspond to the asynchronous handshake protocol.

52. The interface of claim 50 wherein the flow control signals transmitted by the completion circuitry correspond to the synchronous handshake.

53. The interface of claim 49 wherein the control circuitry further comprises trigger circuitry for generating first and second enable signals in response to the flow control signals for enabling the first and second datapaths to transmit data.

54. The interface of claim 53 wherein the flow control signals in response to which the first and second enable signals are generated correspond to the asynchronous handshake protocol.

55. The interface of claim 53 wherein the flow control signals in response to which the first and second enable signals are generated correspond to the synchronous handshake.

56. The interface of claim 49 wherein the control circuitry is operable to enable transfer of data via both of the first and second datapaths on both positive and negative transitions of a clock signal associated with the synchronous domain.

57. The interface of claim 49 wherein the first datapath is further operable to accumulate the first data tokens to form a first block of consecutive data, and wherein the control circuitry is operable to facilitate transfer of the first block of consecutive data to the asynchronous domain via the first datapath, and to facilitate transfer of a second block of consecutive data comprising the second data tokens to the asynchronous domain via the second datapath.

58. A synchronous dynamic random access memory (SDRAM) controller comprising the interface of claim 57.

59. The SDRAM controller of claim 58 wherein the control circuitry is operable to enable transfer of data via both of the first and second datapaths on both positive and negative transitions of a clock signal associated with the synchronous domain.

* * * * *